(12) United States Patent
Ho et al.

(10) Patent No.: US 10,422,414 B2
(45) Date of Patent: Sep. 24, 2019

(54) SPEED REDUCER

(71) Applicant: DELTA ELECTRONICS, INC., Taoyuan (TW)

(72) Inventors: Yi-Lun Ho, Taoyuan (TW); Ching-Hsiung Tsai, Taoyuan (TW); Jia-Ming Wu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 289 days.

(21) Appl. No.: 15/457,589

(22) Filed: Mar. 13, 2017

(65) Prior Publication Data

US 2017/0248195 A1 Aug. 31, 2017

Related U.S. Application Data

(63) Continuation-in-part of application No. 14/930,026, filed on Nov. 2, 2015, now Pat. No. 9,625,005.

(60) Provisional application No. 62/462,612, filed on Feb. 23, 2017.

(30) Foreign Application Priority Data

Apr. 14, 2015 (TW) ............................ 104112000 A

(51) Int. Cl.
*F16H 1/32* (2006.01)
*B60K 17/04* (2006.01)

(52) U.S. Cl.
CPC .............. *F16H 1/32* (2013.01); *B60K 17/04* (2013.01)

(58) Field of Classification Search
USPC .......................................................... 475/177
See application file for complete search history.

(56) References Cited

U.S. PATENT DOCUMENTS

| 3,192,799 | A | * | 7/1965 | Pamplin | .................... | F16H 1/32 |
| | | | | | | 464/75 |
| 3,846,051 | A | * | 11/1974 | McDermott | ............ | F04C 2/103 |
| | | | | | | 418/186 |
| 4,282,777 | A | * | 8/1981 | Ryffel | ........................ | F16H 1/32 |
| | | | | | | 418/61.3 |
| 9,625,005 | B2 | * | 4/2017 | Tsai | .......................... | F16H 1/32 |

* cited by examiner

*Primary Examiner* — Dirk Wright
(74) *Attorney, Agent, or Firm* — Kirton McConkie; Evan R. Witt

(57) ABSTRACT

A speed reducer includes a first transmission shaft, an eccentric wheel, a first roller assembly, a rotating wheel, a second roller assembly and a second transmission shaft. The rotating wheel includes a main body and an axle hole. The main body includes a convex structure and a concave structure. The convex structure is protruded from an outer periphery of the main body and has outer teeth. The outer teeth are contacted with the corresponding first rollers. The concave structure is concavely formed in a surface of the main body and includes inner teeth. The inner teeth are contacted with plural second rollers of the second roller assembly. The speed reducer of the present invention is an epicycloid-epicycloid speed reducer or a hypocycloid-hypocycloid speed reducer. Since the speed reducer is designed to have four operating situations, the speed reducer can have various reduction ratios.

20 Claims, 40 Drawing Sheets

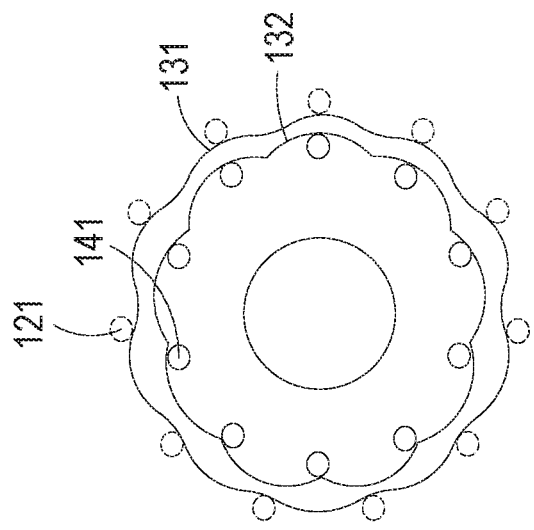
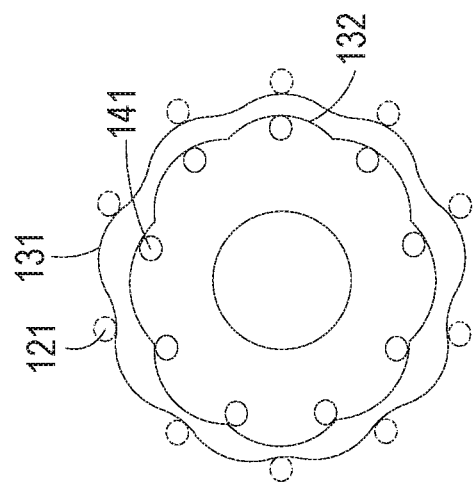
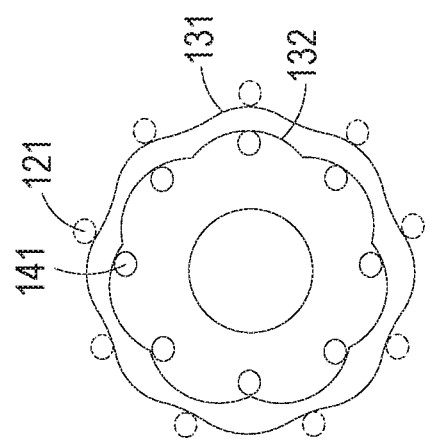
FIG. 6

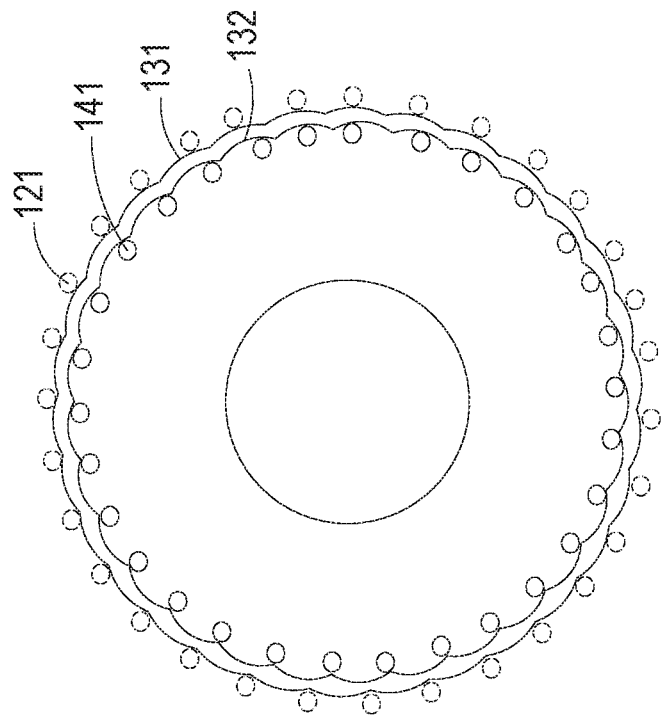
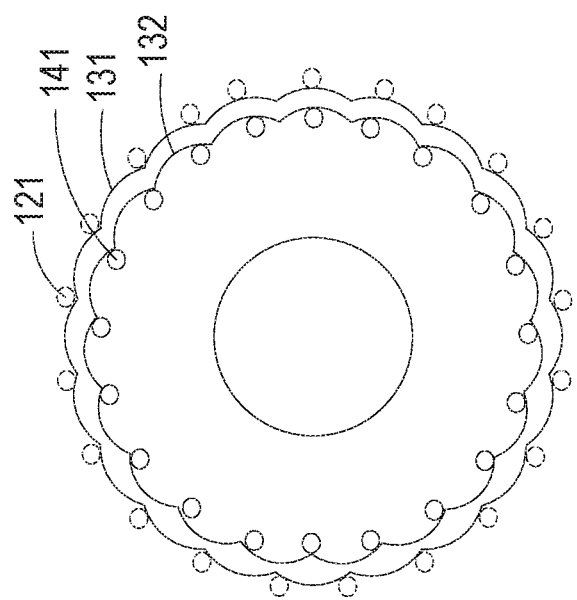
FIG. 7

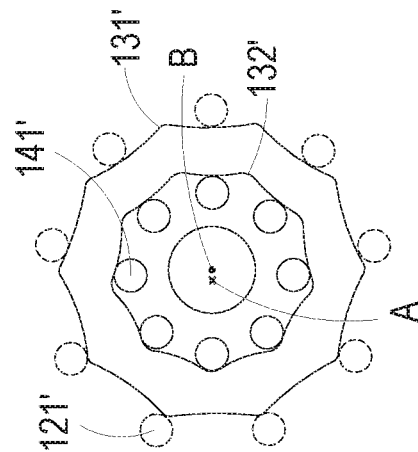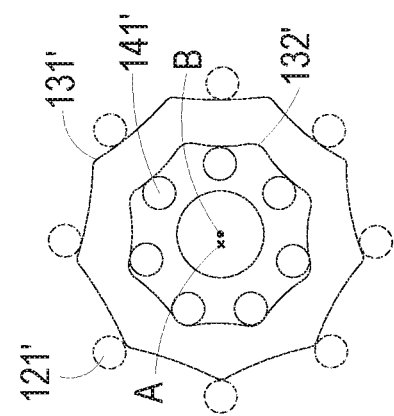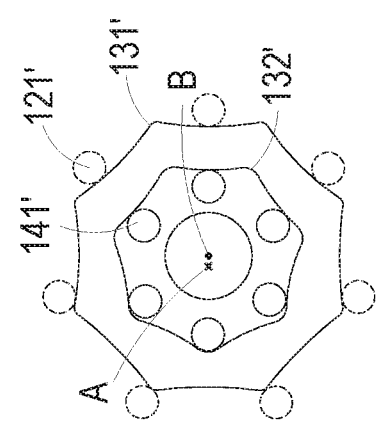
FIG. 26

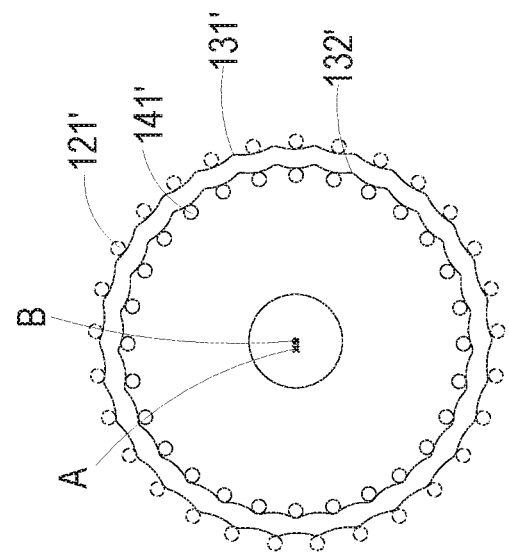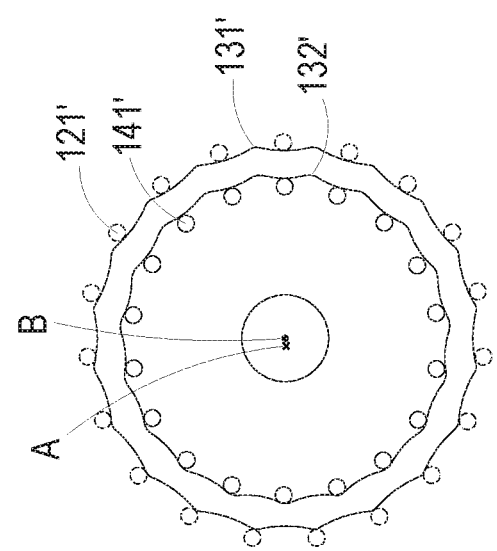
FIG. 27

SPEED REDUCER

CROSS-REFERENCE TO RELATED APPLICATION

This application claims the benefit of U.S. Provisional Application No. 62/462,612 filed on Feb. 23, 2017, and entitled "SPEED REDUCER", the entirety of which is hereby incorporated by reference. This application is also a continuation-in-part application of U.S. application Ser. No. 14/930,026 filed on Nov. 2, 2015, and entitled "SPEED REDUCER", the entirety of which is hereby incorporated by reference.

FIELD OF THE INVENTION

The present invention relates to a speed reducer, and more particularly to a speed reducer with the benefits of a RV reducer and a harmonic drive reducer and having a high reduction ratio.

BACKGROUND OF THE INVENTION

Generally, a motor is operated at a high speed and a low torsion force. In other words, it is difficult to drive a large-sized load. Consequently, for allowing the motor to drive a heavy object, a speed reducer is used for reducing the rotating speed of the motor and increasing the torsion force.

Conventionally, the speed reducers are classified into several types, including rotary vector (RV) reducers and harmonic drive reducers. For example, the RV-E series reducer is a two-stage speed reducer produced by Nabtesco. The RV-E series reducer comprises a first speed reduction stage with a spur gear and a second speed reduction stage with an epicyclic gear. The gears of the first speed reduction stage and the second speed reduction stage are made of metallic material. The RV-E series reducer is a two-stage reduction design to reduce vibration and inertia while increasing ratio capabilities. The RV-E series reducer provides high-end performance in highly rigid and high reduction ratio configurations, and the rolling contact elements of the RV-E series reducer have high efficiency and long life. However, since the RV-E series reducer has larger volume and weight and has many components, the cost of the RV-E series reducer is high.

The harmonic drive reducer comprises a wave generator, a flex element (e.g., a flex spline) and a rigid gear. The elastic deformation of the flexible element can be controlled to result in a pushing action so as to transmit motion and power of mechanical transmission. The harmonic drive reducer has smaller size, lighter weight and higher precision when compared with the RV reducer. However, since the rigidity of the flex element of the harmonic drive reducer is lower than the metallic element, the harmonic drive reducer is unable to withstand high impact and has a problem of causing teeth difference friction. In other words, the use life of the harmonic drive reducer is shorter. Moreover, since the input speed of the harmonic drive reducer is not high, the reduction ratio of the harmonic drive reducer is lower.

Therefore, there is a need of providing a speed reducer with the characteristics of a RV reducer and a harmonic drive reducer in order to the overcome the above drawbacks.

SUMMARY OF THE INVENTION

An object of the present invention provides a speed reducer. The speed reducer is an epicycloid-epicycloid speed reducer or a hypocycloid-hypocycloid speed reducer. The speed reducer comprises a rotating wheel, a first roller assembly and a second roller assembly. The rotating wheel comprises a convex structure and a concave structure. The convex structure is contacted with plural first rollers of the first roller assembly, and the concave structure is contacted with plural second rollers of the second roller assembly. The cooperation of the rotating wheel and associated components can achieve the speed reducing purpose. By the speed reducer of the present invention, the problems of the conventional RV reducer (e.g., high volume, weight and cost) and the problems of the conventional harmonic drive reducer (e.g., the deformation of the flex spline and the teeth difference friction) will be overcome.

In accordance with an aspect of the present invention, there is provided a speed reducer. The speed reducer includes a first transmission shaft, an eccentric wheel, a first roller assembly, a rotating wheel and a second roller assembly. The first transmission shaft has a first end and a second end. The eccentric wheel is eccentrically fixed on the second end of the first transmission shaft. The first roller assembly includes a first wheel disc and plural first rollers. The first wheel disc is arranged between the first end and the second end of the first transmission shaft. The plural first rollers are disposed on the first wheel disc. The rotating wheel includes a main body and an axle hole. The eccentric wheel is rotatably disposed within the axle hole. The main body includes a convex structure and a concave structure. The convex structure is protruded from an outer periphery of the main body and has at least one outer tooth. The at least one outer tooth is contacted with the corresponding first rollers. The concave structure is concavely formed in a surface of the main body and includes at least one inner tooth. The second roller assembly includes a second wheel disc and plural second rollers. The plural second rollers are disposed on the second wheel disc. The second rollers are contacted with the at least one corresponding inner tooth. The number of the at least one outer tooth and the number of the at least one inner tooth are different. The number of the first rollers is at least one more than the number of the at least one outer tooth. The number of the second rollers is at least one more than the number of the at least one inner tooth.

In accordance with another aspect of the present invention, there is provided a speed reducer. The speed reducer includes a first transmission shaft, an eccentric wheel, a first roller assembly, a rotating wheel and a second roller assembly. The first transmission shaft has a first end and a second end. The eccentric wheel is eccentrically fixed on the second end of the first transmission shaft. The first roller assembly includes a first wheel disc and at least one first roller. The first wheel disc is arranged between the first end and the second end of the first transmission shaft. The at least one first roller is disposed on the first wheel disc. The rotating wheel includes a main body and an axle hole. The eccentric wheel is rotatably disposed within the axle hole. The main body includes a convex structure and a concave structure. The convex structure is protruded from an outer periphery of the main body and has plural outer teeth. The plural outer teeth are contacted with the at least one corresponding first roller. The concave structure is concavely formed in a surface of the main body and includes plural inner teeth. The second roller assembly includes a second wheel disc and at least one second roller. The at least one second roller is disposed on the second wheel disc. The at least one second roller is contacted with the corresponding inner teeth. The number of the outer teeth and the number of the inner teeth are different. The number of the at least one first roller is at least one less than the number of the outer teeth. The number of the at least one second roller is at least one less than the number of the inner teeth.

In accordance with a further aspect of the present invention, there is provided a speed reducer. The speed reducer includes a first transmission shaft, a first roller assembly, a rotating wheel and a second roller assembly. The first roller assembly includes a first wheel disc and plural first rollers. The first wheel disc is disposed on the first transmission shaft. The plural first rollers are disposed on the first wheel disc. The rotating wheel includes a main body and an axle hole. An eccentric wheel is rotatably disposed within the axle hole. The rotating wheel includes plural outer teeth and plural inner teeth. The plural outer teeth are protruded from the main body. The plural inner teeth are concavely formed in a surface of the main body. The plural outer teeth are contacted with the corresponding first rollers. The second roller assembly includes a second wheel disc and plural second rollers. The plural second rollers are disposed on the second wheel disc. The second rollers are contacted with the corresponding inner teeth. The number of the outer teeth and the number of the inner teeth are different. The number of the first rollers is at least one more than the number of the outer teeth and the number of the second rollers is at least one more than the number of the inner teeth. Alternatively, the number of the first rollers is at least one less than the number of the outer teeth and the number of the second rollers is at least one less than the number of the inner teeth.

The above contents of the present invention will become more readily apparent to those ordinarily skilled in the art after reviewing the following detailed description and accompanying drawings, in which:

BRIEF DESCRIPTION OF THE DRAWINGS

FIG. 6 schematically illustrates three examples of the speed reducer of FIG. 1 in the first operating situation, in which the numbers of the outer teeth of the convex structure are 8, 9 and 10, respectively;

FIG. 7 schematically illustrates two examples of the speed reducer of FIG. 1 in the first operating situation, in which the numbers of the outer teeth of the convex structure are 20 and 30, respectively;

FIG. 26 schematically illustrates three examples of the speed reducer of FIG. 21 in the first operating situation, in which the numbers of the outer teeth of the convex structure are 8, 9 and 10, respectively;

FIG. 27 schematically illustrates two examples of the speed reducer of FIG. 21 in the first operating situation, in which the numbers of the outer teeth of the convex structure are 20 and 30, respectively;

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
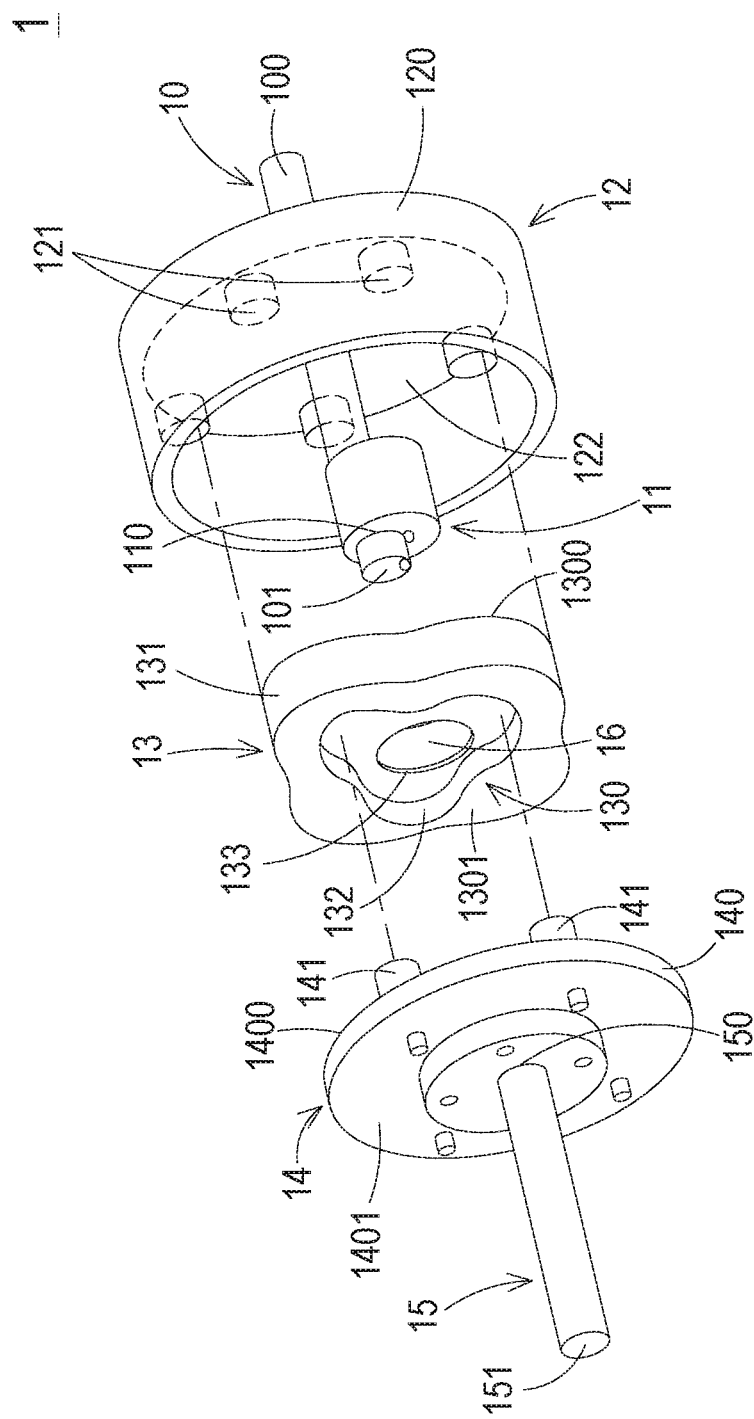
FIG. 1 is a schematic exploded view illustrating a speed reducer according to a first embodiment of the present invention.

FIG. 1 is a schematic exploded view illustrating a speed reducer according to an embodiment of the present invention. The speed reducer 1 can be applied to motors, machine tools, robotic arms, automobiles, motorcycles or other motive machines in order to provide a speed reducing function. As shown in FIG. 1, the speed reducer 1 comprises a first transmission shaft 10, an eccentric wheel 11, a first roller assembly 12, a rotating wheel 13, a second roller assembly 14, a second transmission shaft 15 and a bearing 16.

Preferably but not exclusively, the first transmission shaft 10 is a shaft lever that is made of metallic material or alloy. The first transmission shaft 10 has a first end 100 and a second end 101. The first end 100 is a power input end for receiving an input power from a motor (not shown). The eccentric wheel 11 is a circular disc structure that is made of metallic material or alloy. Moreover, the eccentric wheel 11 has an eccentric hole 110. The geometric center of the eccentric hole 110 is deviated from the geometric center of the eccentric wheel 11. The second end 101 of the first transmission shaft 10 is penetrated through the eccentric hole 110. Consequently, the eccentric wheel 11 is eccentrically fixed on the second end 101 of the first transmission shaft 10. When the input power received by the first end 100 of the first transmission shaft 10 results in rotation of the first transmission shaft 10, the eccentric wheel 11 is driven by the second end 101 of the first transmission shaft 10. Consequently, the eccentric wheel 11 is eccentrically rotated relative to an axle center of the first transmission shaft 10.

The first roller assembly 12 comprises a first wheel disc 120 and plural first rollers 121. The first wheel disc 120 is a circular disc structure or a hollow cylindrical structure that is made of metallic material or alloy. Moreover, a bearing (not shown) is disposed within a center hole (not shown) of the first wheel disc 120. The central hole is at the geometric center of the first wheel disc 120. An example of the bearing includes but is not limited to a ball bearing, a needle bearing or an oil-retaining bearing. The first end 100 of the first transmission shaft 10 is penetrated through the bearing that is disposed within the center hole of first wheel disc 120. Consequently, the first end 100 and the second end 101 of the first transmission shaft 10 are located at two opposite sides of the first wheel disc 120. Preferably but not exclusively, the plural first rollers 121 are circular posts, which are made of metallic material or alloy. Moreover, the plural first rollers 121 are circumferentially and discretely arranged on a mounting surface 122 of the first wheel disc 120 at regular intervals. That is, the plural first rollers 121 and the second end 101 of the first transmission shaft 10 are located at the same side of the first wheel disc 120. Optionally, the plural first rollers 121 are rotated about their own axles (i.e., self-rotation). That is, the plural first rollers 121 can be selectively rotated about fixed positions of the mounting surface 122.

The rotating wheel 13 is made of metallic material or alloy. In this embodiment, the rotating wheel 13 comprises a main body 130 and an axle hole 133. The axle hole 133 is located at the geometric center of the main body 130. The bearing 16 is disposed within the axle hole 133. Through the bearing 16, the eccentric wheel 11 is rotatably disposed within the axle hole 133. Consequently, when the eccentric wheel 11 is rotated, the rotating wheel 13 is synchronously rotated with the eccentric wheel 11. The main body 130 comprises a first surface 1300 and a second surface 1301, wherein the first surface 1300 and the second surface 1301 are opposed to each other. Moreover, the main body 130 comprises a convex structure 131 and a concave structure 132. The first surface 1300 of the main body 130 is arranged between the plural first rollers 121 and located beside the mounting surface 122 of the first wheel disc 120. The convex structure 131 is protruded from an outer periphery of the main body 130. Moreover, the convex structure 131 comprises at least one outer tooth. In this embodiment as shown in FIG. 1, the convex structure 131 comprises plural outer teeth. Due to the plural outer teeth, the convex structure 131 has a blunt teeth profile, a wavy profile or a petal profile. Moreover, the outer peripheries of the outer teeth are contactable with the corresponding first rollers 121. The concave structure 132 is concavely formed in a middle region of the second surface 1301 of the main body 130. Moreover, the concave structure 132 comprises at least one inner tooth. In this embodiment as shown in FIG. 1, the concave structure 132 comprises plural inner teeth. Due to the plural inner teeth, the concave structure 132 has a wavy profile or a petal profile. An example of the bearing 16 includes but is not limited to a ball bearing, a needle bearing or an oil-retaining bearing. Moreover, the region between the concave structure 132 and the convex structure 131 is defined as a wall region.

The second roller assembly 14 comprises a second wheel disc 140 and plural second rollers 141. The second wheel disc 140 is a circular disc structure that is made of metallic material or alloy. The second wheel disc 140 comprises a third surface 1400 and a fourth surface 1401, wherein the third surface 1400 and the fourth surface 1401 are opposed to each other. The third surface 1400 is located beside the second surface 1301 of the rotating wheel 13. Moreover, a fixing hole (not shown) is located at a geometric center of the second wheel disc 140. Preferably but not exclusively, the plural second rollers 141 are circular posts, which are made of metallic material or alloy. The plural second rollers 141 are circumferentially and discretely arranged on the third surface 1400 of the second wheel disc 140 at regular intervals. Moreover, the plural second rollers 141 are partially accommodated within the concave structure 132 and contacted with the corresponding inner teeth of the concave structure 132 of the rotating wheel 13. Consequently, when the rotating wheel 13 is synchronously rotated with the eccentric wheel 11, the plural second rollers 141 are pushed by the corresponding inner teeth of the concave structure 132 and thus rotated. Optionally, the plural second rollers 141 are rotated about their own axles. That is, the plural second rollers 141 can be selectively rotated about fixed positions of the third surface 1400.

Preferably but not exclusively, the second transmission shaft 15 is a shaft lever that is made of metallic material or alloy. The second transmission shaft 15 has a third end 150 and a fourth end 151. The third end 150 of the second transmission shaft 15 is fixed in the fixing hole of the second wheel disc 140 of the second roller assembly 14. Consequently, when the second wheel disc 140 of the second roller assembly 14 is rotated, the second transmission shaft 15 is synchronously rotated with the second wheel disc 140. Moreover, the fourth end 151 of the second transmission shaft 15 is a power output end.

Figure 2:
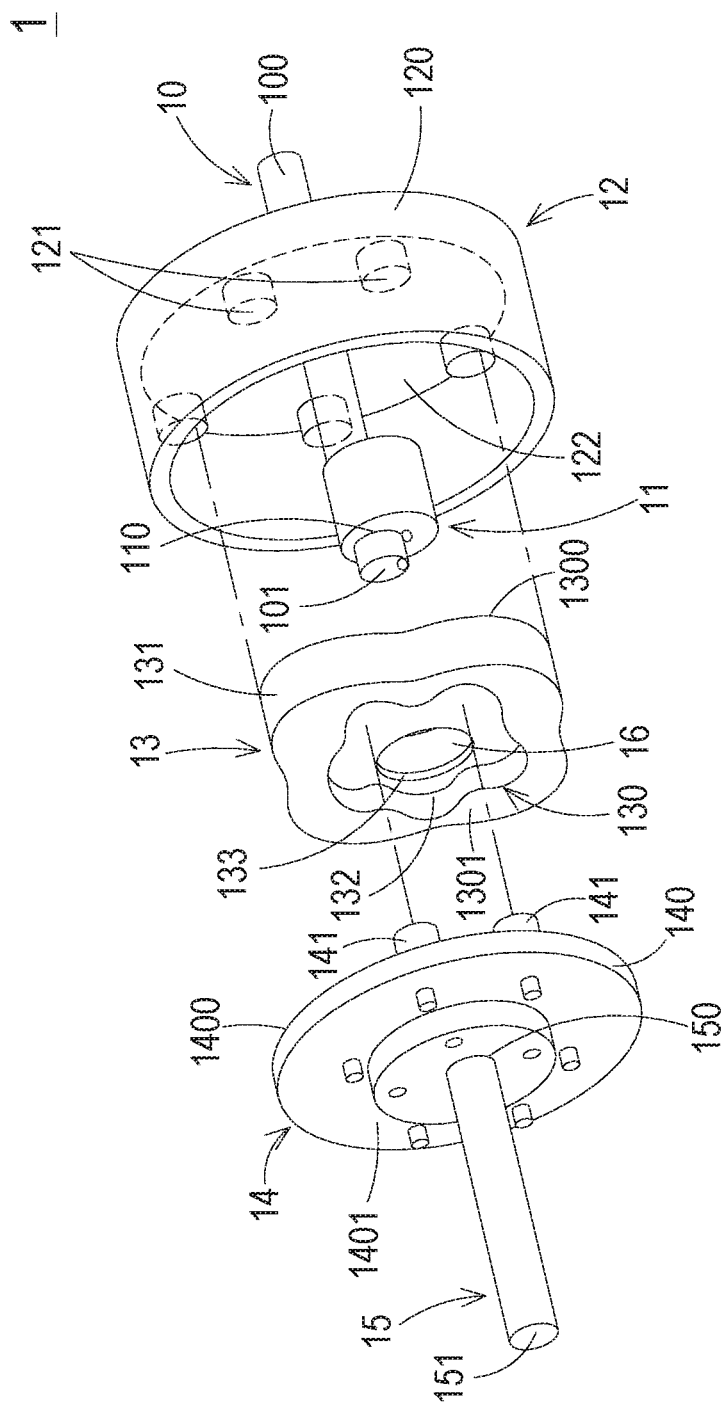
FIG. 2 is a schematic exploded view illustrating a variant example of the speed reducer of FIG. 1.

In this embodiment, the number of the first rollers 121 is at least one more than the number of the outer teeth of the convex structure 131 of the rotating wheel 13, and the number of the second rollers 141 is more than the number of the inner teeth of the concave structure 132 of the rotating wheel 13. In case that the plural first rollers 121 are rotated about the fixed positions of the mounting surface 122, the plural second rollers 141 are not rotated about the fixed positions of the third surface 1400 of the second wheel disc 140. Whereas, in case that the plural second rollers 141 are rotated about the fixed positions of the third surface 1400 of the second wheel disc 140, the plural first rollers 121 are not rotated about the fixed positions of the mounting surface 122. Moreover, the number of the outer teeth of the convex structure 131 and the number of the inner teeth of the concave structure 132 are different. In the embodiment of FIG. 1, the number of the outer teeth of the convex structure 131 is at least one more than the number of the inner teeth of the concave structure 132. Alternatively, in another embodiment, the number of the inner teeth of the concave structure 132 is at least one more than the number of the outer teeth of the convex structure 131. For example, as shown in FIG. 2, the number of the outer teeth of the convex structure 131 is four, and the number of the inner teeth of the concave structure 132 is five.

Since the reduction ratio of the speed reducer 1 is determined according to the difference between the number of the outer teeth and the number of the inner teeth and the self-rotation of plural first rollers 121 or the plural second rollers 141. According to the above designing concepts, the speed reducer 1 can be designed to have four operating situations. For understanding the present invention, the following presuppositions are made: (a) the number difference between the number of the outer teeth of the convex structure 131 and the number of the inner teeth of the concave structure 132 is one, (b) the number of the first rollers 121 is at least one more than the number of the outer teeth of the convex structure 131 of the rotating wheel 13, and (c) the number of the second rollers 141 is at least one more than the number of the inner teeth of the concave structure 132 of the rotating wheel 13. In the following drawings, the dotted circles indicate that the first rollers 121 or the second rollers 141 are not self-rotated, and the solid circles indicate that the first rollers 121 or the second rollers 141 are self-rotated.

In the first operating situation of the speed reducer 1, the number of the outer teeth of the convex structure 131 is one more than the number of the inner teeth of the concave structure 132, the plural first rollers 121 are not rotated about the fixed positions of the mounting surface 122, and the plural second rollers 141 are rotated about the fixed positions of the third surface 1400 of the second wheel disc 140. For example, in case that the number of the outer teeth of the convex structure 131 is N, the number of the inner teeth of the concave structure 132 is equal to (N−1), the number of the first rollers 121 is equal to (N+1), and the number of the second rollers 141 is equal to N. In the first operating situation, the rotating direction of the first transmission shaft 10 and the rotating direction of the second transmission shaft 15 are identical. Moreover, the reduction ratio of the speed reducer 1 is equal to N×N, wherein N is an integer greater than 1.

Figure 3:
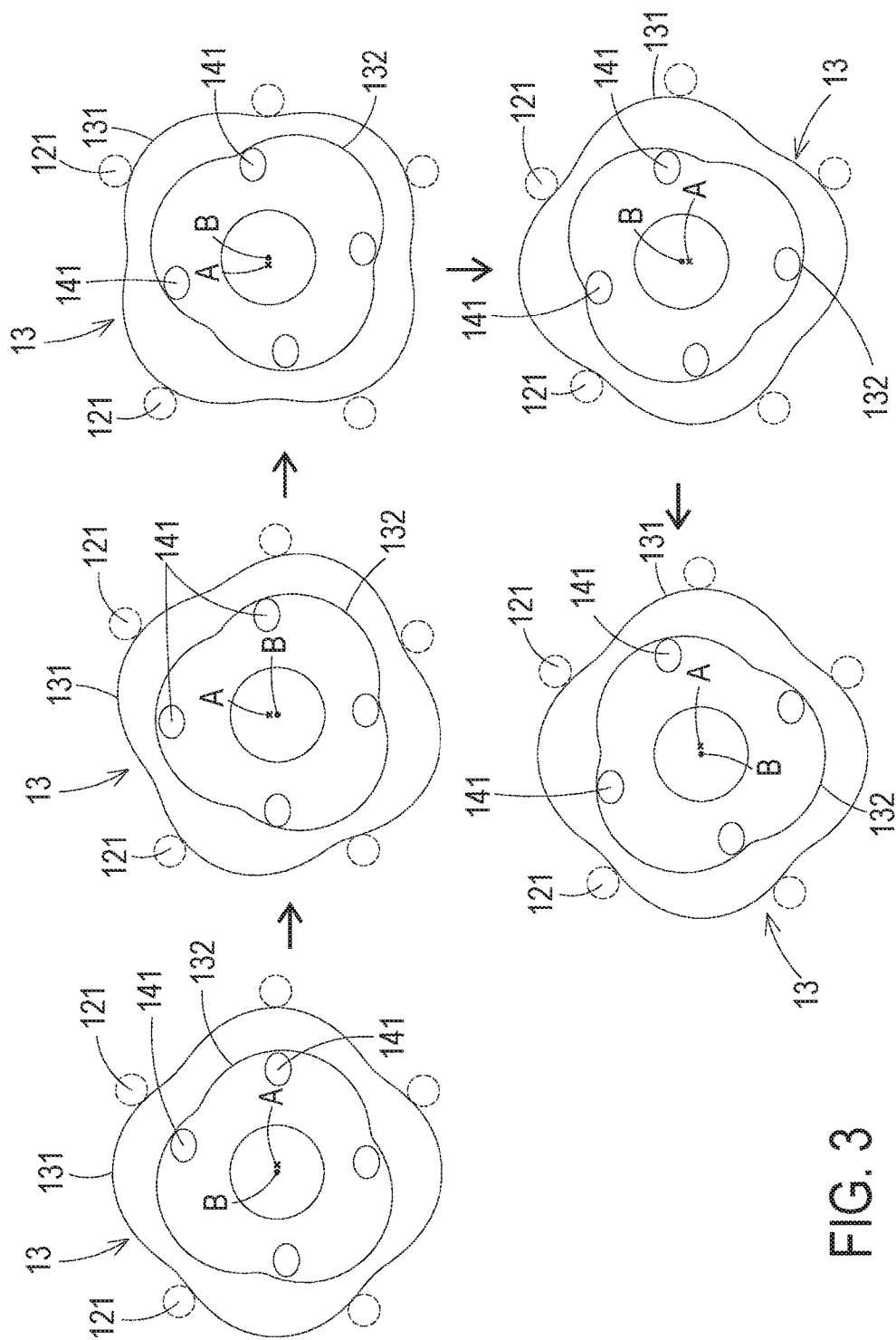
FIG. 3 schematically illustrates the sequential actions of the speed reducer of FIG. 1 in the first operating situation.

Hereinafter, the operating principles of the speed reducer 1 in the first operating situation will be illustrated with reference to FIGS. 3~7. FIG. 3 schematically illustrates the sequential actions of the speed reducer of the present invention in the first operating situation. For example, the number of the outer teeth of the convex structure 131 is 4, and the number of the inner teeth of the concave structure 132 is 3. In FIG. 3, the time interval between every two adjacent actions is equal to the time period of rotating one-fourth turn of the first transmission shaft 10. When the first transmission shaft 10 is driven by an external driving mechanism (e.g., the shaft lever of the motor) and rotated in a counterclockwise direction, the eccentric wheel 11 is synchronously rotated with the first transmission shaft 10 in the counterclockwise direction. In FIG. 3 and the following drawings, the symbol A denotes the axle center of the first transmission shaft 10, and the symbol B denotes the axle center of the eccentric wheel 11. When the first transmission shaft 10 is rotated one turn, the eccentric wheel 11 is eccentrically rotated one turn. Since the eccentric wheel 11 is rotatably disposed within the bearing 16, the eccentric rotation of the eccentric wheel 11 will result in a pushing force to push the rotating wheel 13 to be slowly rotated in a clockwise direction. Moreover, since the plural first rollers 121 are not rotated about the fixed positions of the mounting surface 122, the inner teeth of the concave structure 132 and the plural second rollers 141 of the second roller assembly 14 are pushed against each other. Under this circumstance, the plural second rollers 141 are self-rotated in the clockwise direction and rotated about the common axis in the counterclockwise direction so as to result in an epicyclic motion. In response to the epicyclic motion of the plural second rollers 141, the second wheel disc 140 is correspondingly rotated in the counterclockwise direction. Consequently, the second transmission shaft 15 is synchronously rotated with the second wheel disc 140 in the counterclockwise direction. As the second transmission shaft 15 is rotated, an external driven mechanism (e.g., a belt pulley or a gear) is driven to be rotated at a reduced speed. In this embodiment, the number of the outer teeth of the convex structure 131 is 4, and the number of the inner teeth of the concave structure 132 is 3. In response to one-fourth turn of the first transmission shaft 10 in the counterclockwise direction, the epicyclic motion of the plural second rollers 141 results in one-sixteenth turn of the second transmission shaft 15. Consequently, the reduction ratio of the speed reducer 1 is 16.

Figure 4:
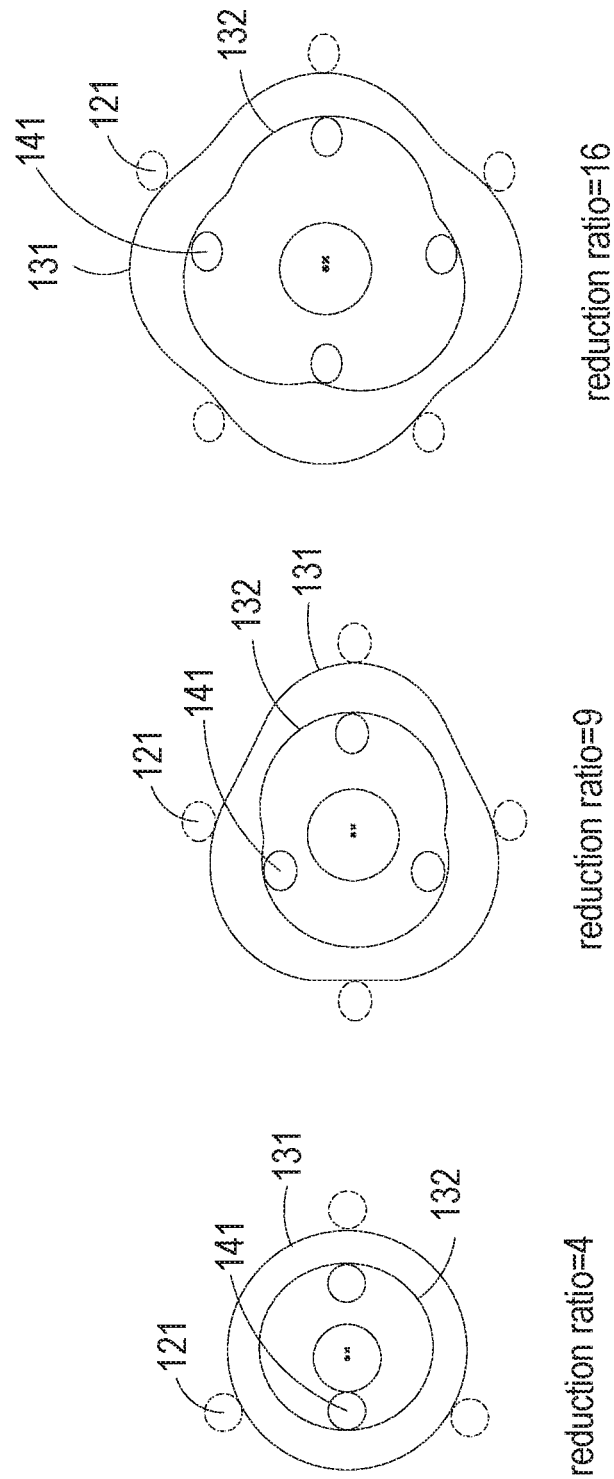
FIG. 4 schematically illustrates three examples of the speed reducer of the FIG. 1 in the first operating situation, in which the numbers of the outer teeth of the convex structure are 2, 3 and 4, respectively.
Figure 5:
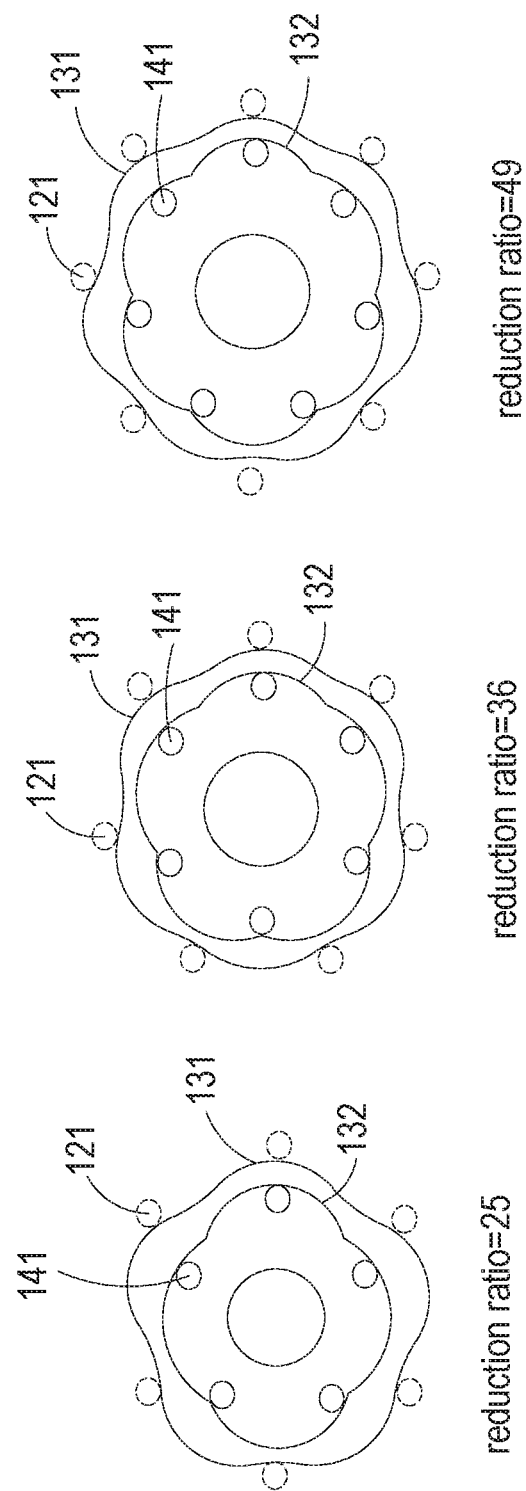
FIG. 5 schematically illustrates three examples of the speed reducer of FIG. 1 in the first operating situation, in which the numbers of the outer teeth of the convex structure are 5, 6 and 7, respectively.

In the first operating situation, if the number of the outer teeth of the convex structure 131 is N, the reduction ratio of the speed reducer 1 is equal to N×N. FIG. 4 schematically illustrates three examples of the speed reducer of the present invention in the first operating situation, in which the numbers of the outer teeth of the convex structure are 2, 3 and 4, respectively. If the number of the outer teeth is 2 and the number of the inner teeth is 1, the reduction ratio of the speed reducer 1 is equal to 4 (i.e., 2×2=4). If the number of the outer teeth is 3 and the number of the inner teeth is 2, the reduction ratio of the speed reducer 1 is equal to 9 (i.e., 3×3=9). If the number of the outer teeth is 4 and the number of the inner teeth is 3, the reduction ratio of the speed reducer 1 is equal to 16 (i.e., 4×4=16). FIG. 5 schematically illustrates three examples of the speed reducer of the present invention in the first operating situation, in which the numbers of the outer teeth of the convex structure are 5, 6 and 7, respectively. If the number of the outer teeth is 5 and the number of the inner teeth is 4, the reduction ratio of the speed reducer 1 is equal to 25 (i.e., 5×5=25). If the number of the outer teeth is 6 and the number of the inner teeth is 5, the reduction ratio of the speed reducer 1 is equal to 36 (i.e., 6×6=36). If the number of the outer teeth is 7 and the number of the inner teeth is 6, the reduction ratio of the speed reducer 1 is equal to 25 (i.e., 7×7=49). FIG. 6 schematically illustrates three examples of the speed reducer of the present invention in the first operating situation, in which the numbers of the outer teeth of the convex structure are 8, 9 and 10, respectively. If the number of the outer teeth is 8 and the number of the inner teeth is 7, the reduction ratio of the speed reducer 1 is equal to 64 (i.e., 8×8=64). If the number of the outer teeth is 9 and the number of the inner teeth is 8, the reduction ratio of the speed reducer 1 is equal to 81 (i.e., 9×9=81). If the number of the outer teeth is 10 and the number of the inner teeth is 9, the reduction ratio of the speed reducer 1 is equal to 100 (i.e., 10×10=100). FIG. 7 schematically illustrates two examples of the speed reducer of the present invention in the first operating situation, in which the numbers of the outer teeth of the convex structure are 20 and 30, respectively. If the number of the outer teeth is 20 and the number of the inner teeth is 19, the reduction ratio of the speed reducer 1 is equal to 400 (i.e., 20×20=400). If the number of the outer teeth is 30 and the number of the inner teeth is 29, the reduction ratio of the speed reducer 1 is equal to 900 (i.e., 30×30=900).

From the above descriptions, the pushing action of the speed reducer 1 of the present invention is similar to the conventional harmonic drive reducer. Consequently, in comparison with the RV reducer, the speed reducer 1 of the present invention has simplified structure and less number of components, and is easily assembled and cost-effective. Moreover, for achieving a high reduction ratio (e.g., 900), the gap between every two adjacent teeth of the gear of the conventional harmonic drive reducer is very small. Consequently, it is difficult to produce the conventional harmonic drive reducer with high reduction ratio. In other words, the reduction ratio cannot be largely increased. In contrast, if the number of the outer teeth of the convex structure 131 is 30 and the number of the inner teeth of the concave structure 132 is 29, the speed reducer 1 of the present invention can achieve the reduction ratio of 900. Moreover, the rotating wheel 13 can be easily produced, and the reduction ratio of the speed reducer 1 is largely increased. Moreover, due to the wall region between the concave structure 132 and the convex structure 131 of the rotating wheel 13 of the speed reducer 1, the overall rigidity of the speed reducer 1 is increased to withstand high impact and the use life of the speed reducer 1 is prolonged. Consequently, the problems of the conventional harmonic drive reducer (e.g., the deformation of the flex spline and the teeth difference friction).

Figure 8:
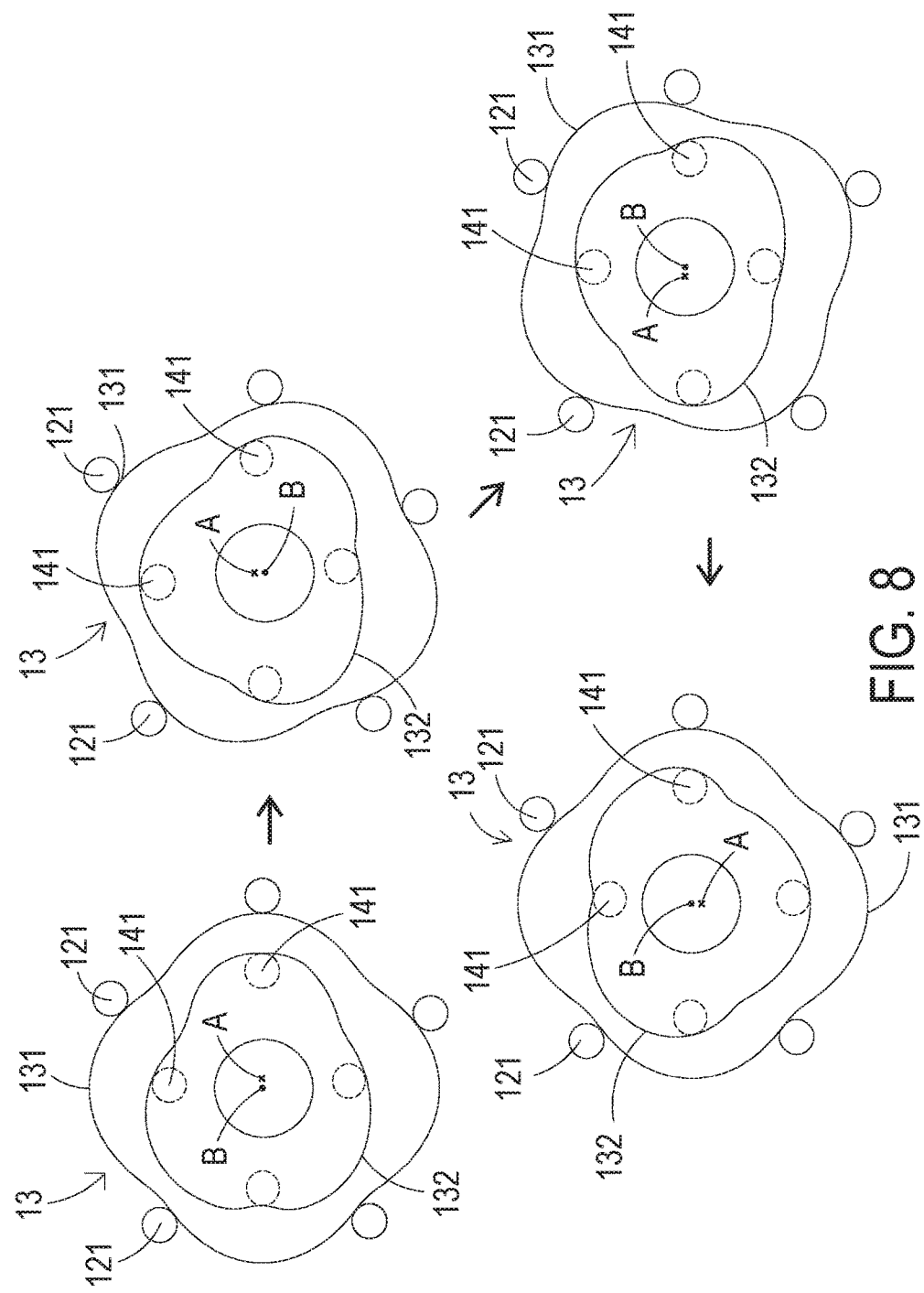
FIG. 8 schematically illustrates the sequential actions of the speed reducer of FIG. 1 in the second operating situation.

In the second operating situation of the speed reducer 1, the number of the outer teeth of the convex structure 131 is at least one more than the number of the inner teeth of the concave structure 132, the plural first rollers 121 are rotated about the fixed positions of the mounting surface 122, and the plural second rollers 141 are not rotated about the fixed positions of the third surface 1400 of the second wheel disc 140. For example, in case that the number of the outer teeth of the convex structure 131 is N, the number of the inner teeth of the concave structure 132 is equal to (N−1), the number of the first rollers 121 is equal to (N+1), and the number of the second rollers 141 is equal to N. In the second operating situation, the rotating direction of the first transmission shaft 10 and the rotating direction of the second transmission shaft 15 are different. Moreover, the reduction ratio of the speed reducer 1 is equal to (N+1)×(N−1), wherein N is an integer greater than 1. FIG. 8 schematically illustrates the sequential actions of the speed reducer of the present invention in the second operating situation. For example, the number of the outer teeth of the convex structure 131 is 4, and the number of the inner teeth of the concave structure 132 is 3. In FIG. 8, the time interval between every two adjacent actions is equal to the time period of rotating one-fourth turn of the first transmission shaft 10. Under this circumstance, the reduction ratio of the speed reducer 1 is (4+1)×(4−1)=15.

Figure 9:
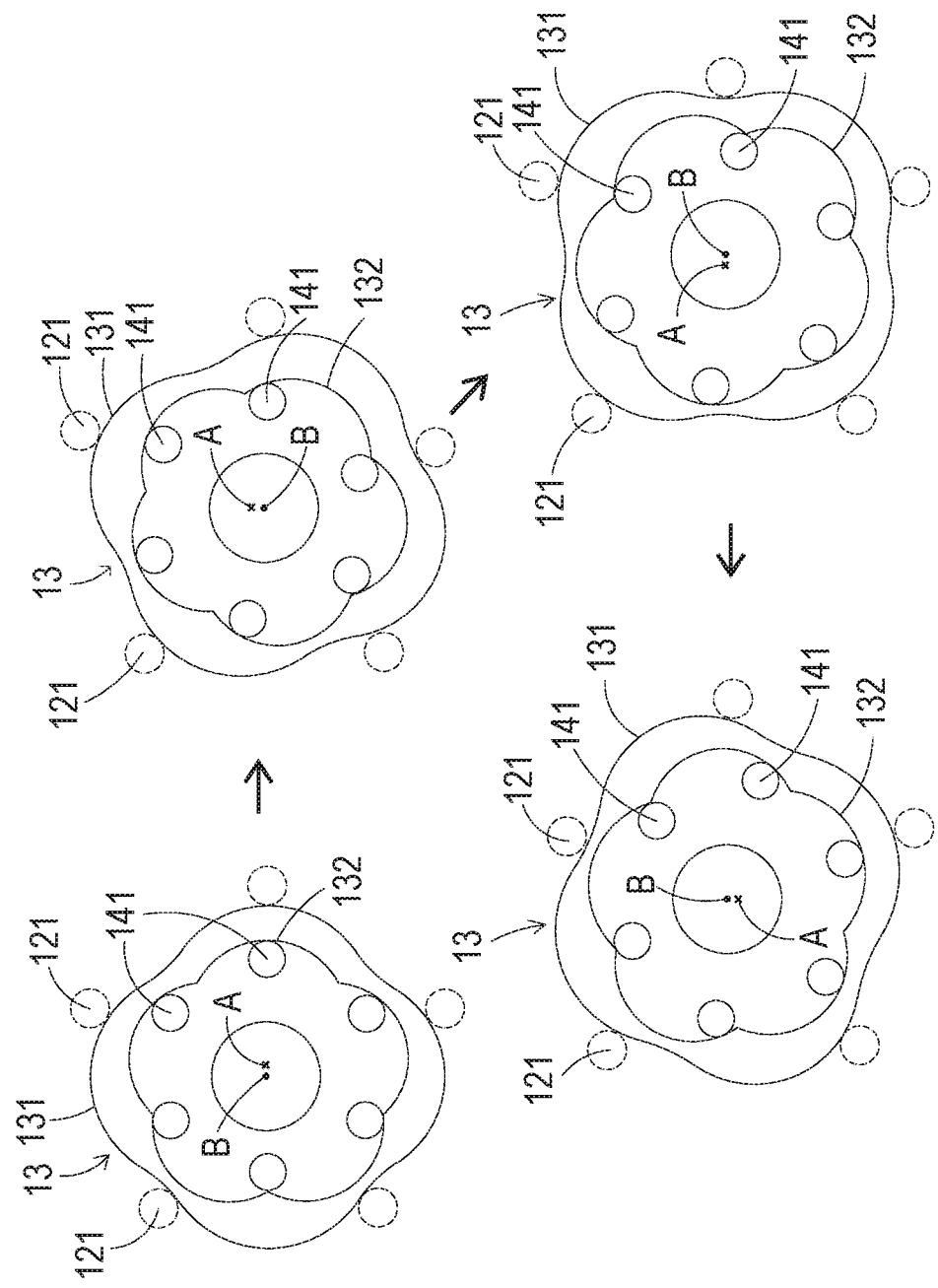
FIG. 9 schematically illustrates the sequential actions of the speed reducer of FIG. 1 in the third operating situation.

In the third operating situation of the speed reducer 1, the number of the inner teeth of the concave structure 132 is at least one more than the number of the outer teeth of the convex structure 131, the plural first rollers 121 are not rotated about the fixed positions of the mounting surface 122, and the plural second rollers 141 are rotated about the fixed positions of the third surface 1400 of the second wheel disc 140. For example, in case that the number of the outer teeth of the convex structure 131 is N, the number of the inner teeth of the concave structure 132 is equal to (N+1), the number of the first rollers 121 is equal to (N+1), and the number of the second rollers 141 is equal to (N+2). In the third operating situation, the rotating direction of the first transmission shaft 10 and the rotating direction of the second transmission shaft 15 are different. Moreover, the reduction ratio of the speed reducer 1 is equal to N×(N+2), wherein N is an integer greater than 1. FIG. 9 schematically illustrates the sequential actions of the speed reducer of the present invention in the third operating situation. For example, the number of the outer teeth of the convex structure 131 is 4, and the number of the inner teeth of the concave structure 132 is 5. In FIG. 9, the time interval between every two adjacent actions is equal to the time period of rotating one-fourth turn of the first transmission shaft 10. Under this circumstance, the reduction ratio of the speed reducer 1 is 4×(4+2)=24.

Figure 10:
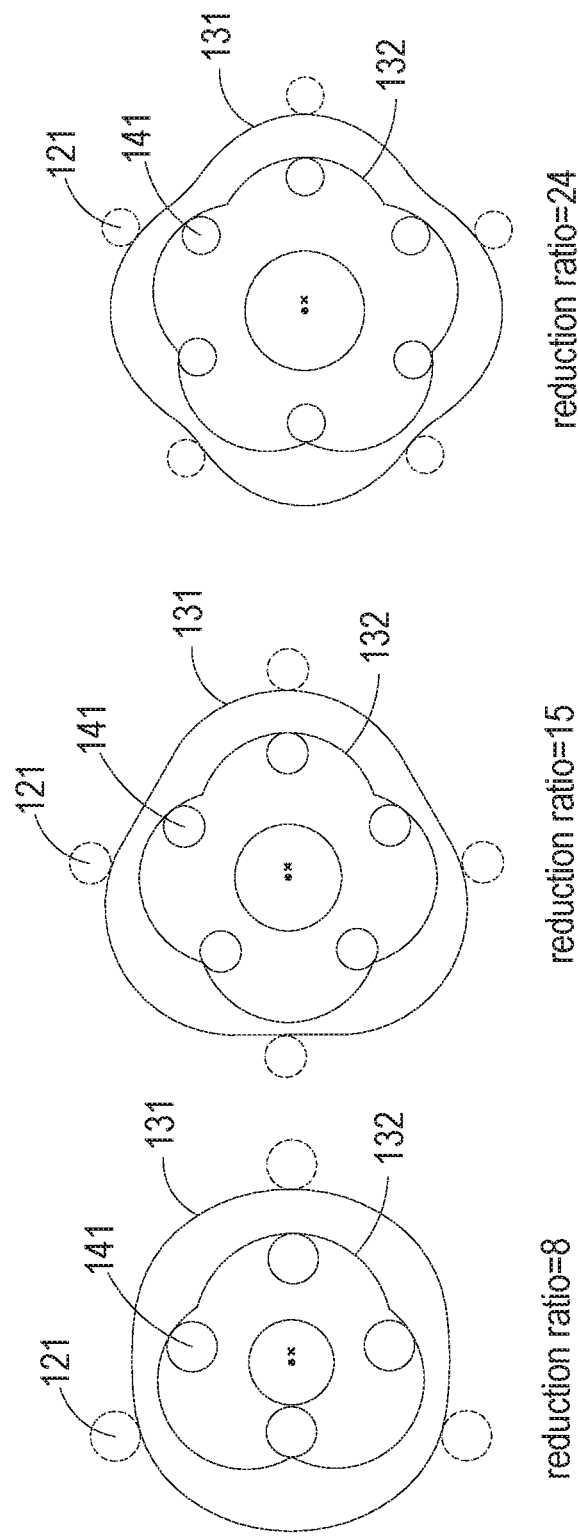
FIG. 10 schematically illustrates three examples of the speed reducer of FIG. 1 in the third operating situation, in which the numbers of the outer teeth of the convex structure are 2, 3 and 4, respectively.
Figure 11:
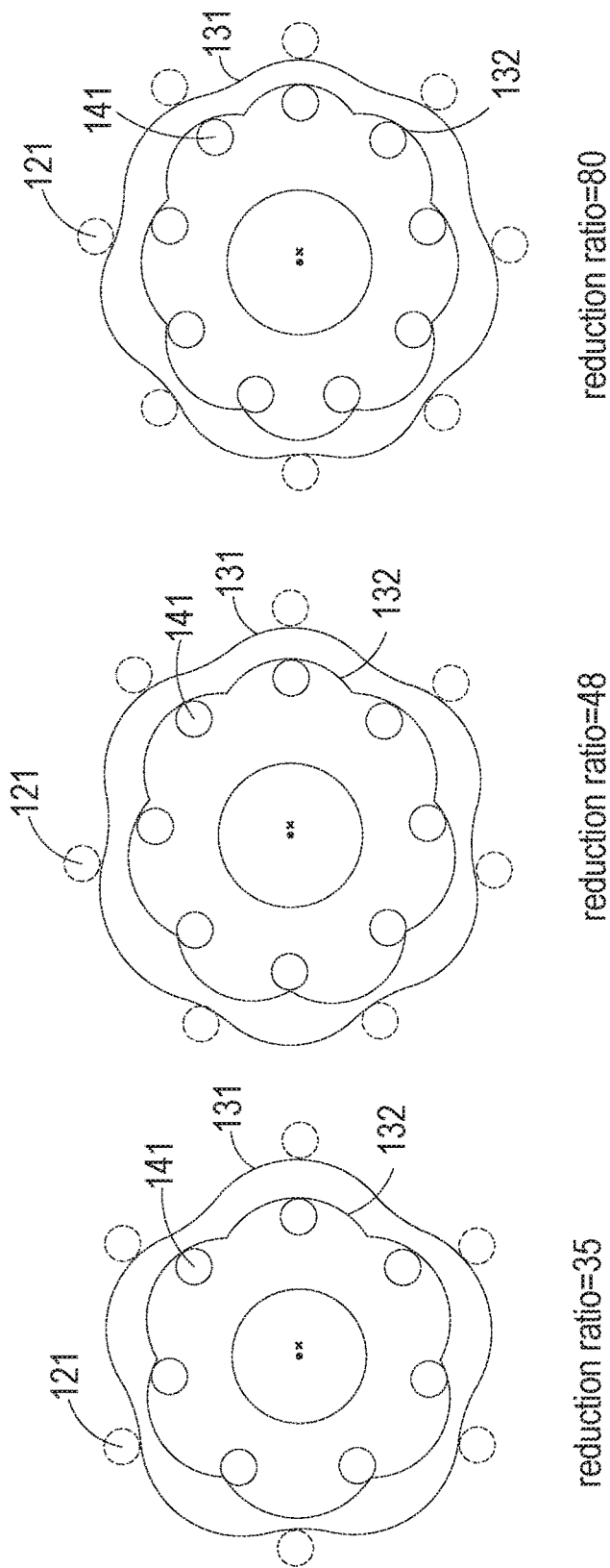
FIG. 11 schematically illustrates three examples of the speed reducer of FIG. 1 in the third operating situation, in which the numbers of the outer teeth of the convex structure are 5, 6 and 7, respectively.

In the third operating situation, if the number of the outer teeth of the convex structure 131 is N, the reduction ratio of the speed reducer 1 is equal to N×(N+2). FIG. 10 schematically illustrates three examples of the speed reducer of the present invention in the third operating situation, in which the numbers of the outer teeth of the convex structure are 2, 3 and 4, respectively. For example, if the number of the outer teeth is 2 and the number of the inner teeth is 3, the reduction ratio of the speed reducer 1 is equal to 8 (i.e., 2×4=8). If the number of the outer teeth is 3 and the number of the inner teeth is 4, the reduction ratio of the speed reducer 1 is equal to 15 (i.e., 3×5=15). If the number of the outer teeth is 4 and the number of the inner teeth is 5, the reduction ratio of the speed reducer 1 is equal to 24 (i.e., 4×6=24). FIG. 11 schematically illustrates three examples of the speed reducer of the present invention in the third operating situation, in which the numbers of the outer teeth of the convex structure are 5, 6 and 8, respectively. If the number of the outer teeth is 5 and the number of the inner teeth is 6, the reduction ratio of the speed reducer 1 is equal to 35 (i.e., 5×7=35). If the number of the outer teeth is 6 and the number of the inner teeth is 7, the reduction ratio of the speed reducer 1 is equal to 35 (i.e., 6×8=48). If the number of the outer teeth is 8 and the number of the inner teeth is 9, the reduction ratio of the speed reducer 1 is equal to 80 (i.e., 8×10=80).

Figure 12:
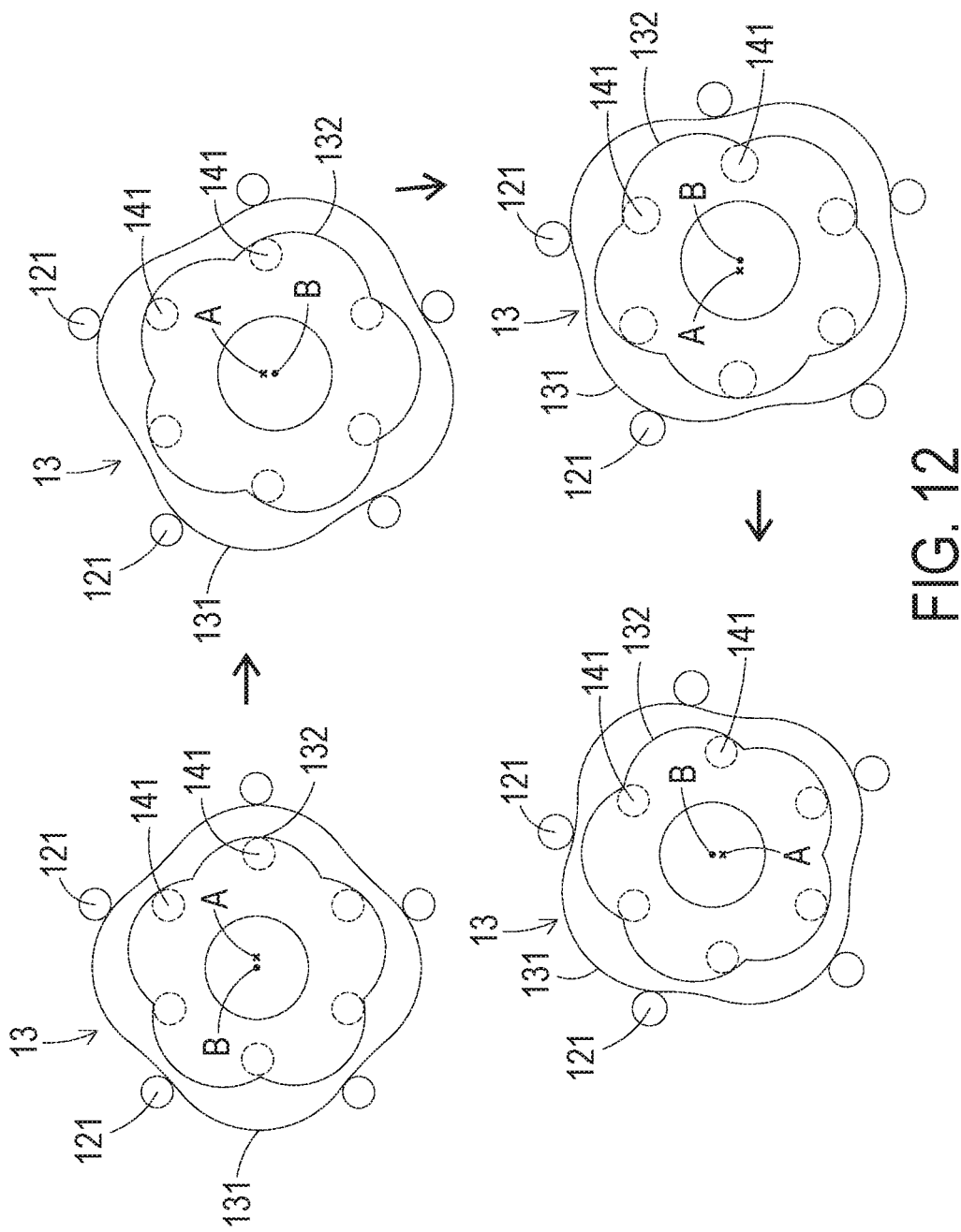
FIG. 12 schematically illustrates the sequential actions of the speed reducer of FIG. 1 in the fourth operating situation.

In the fourth operating situation of the speed reducer 1, the number of the inner teeth of the concave structure 132 is at least one more than the number of the outer teeth of the convex structure 131, the plural first rollers 121 are rotated about the fixed positions of the mounting surface 122, and the plural second rollers 141 are not rotated about the fixed positions of the third surface 1400 of the second wheel disc 140. For example, in case that the number of the outer teeth of the convex structure 131 is N, the number of the inner teeth of the concave structure 132 is equal to (N+1), the number of the first rollers 121 is equal to (N+1), and the number of the second rollers 141 is equal to (N+2). In the fourth operating situation, the rotating direction of the first transmission shaft 10 and the rotating direction of the second transmission shaft 15 are identical. Moreover, the reduction ratio of the speed reducer 1 is equal to (N+1)×(N+1), wherein N is an integer greater than 1. FIG. 12 schematically illustrates the sequential actions of the speed reducer of the present invention in the fourth operating situation. For example, the number of the outer teeth of the convex structure 131 is 4, and the number of the inner teeth of the concave structure 132 is 5. In FIG. 12, the time interval between every two adjacent actions is equal to the time period of rotating one-fourth turn of the first transmission shaft 10. Under this circumstance, the reduction ratio of the speed reducer 1 is (4+1)×(4+1)=25.

As mentioned above, the number difference between the number of the outer teeth of the convex structure 131 and the number of the inner teeth of the concave structure 132 is one. The parameters of the speed reducer 1 in the four operating situations are listed in the following table.

reducer 1 can be designed to have the above four operating situations. Consequently, the speed reducer 1 can have various reduction ratios.

In the first operating situation of the speed reducer 1, the following presuppositions are made: the plural first rollers 121 are not rotated about the fixed positions of the mounting surface 122, the plural second rollers 141 are rotated about the fixed positions of the third surface 1400 of the second wheel disc 140, and the number of the outer teeth of the convex structure 131 minus the number of the inner teeth of the concave structure 132 is K. Under this circumstance, the rotating direction of the first transmission shaft 10 and the rotating direction of the second transmission shaft 15 are identical. In case that the number of the outer teeth of the convex structure 131 is N, the reduction ratio is equal to |N×(N−K+1)/K|, wherein N is an integer greater than 1 and the difference (N−K) is greater than 1.

Figure 13:
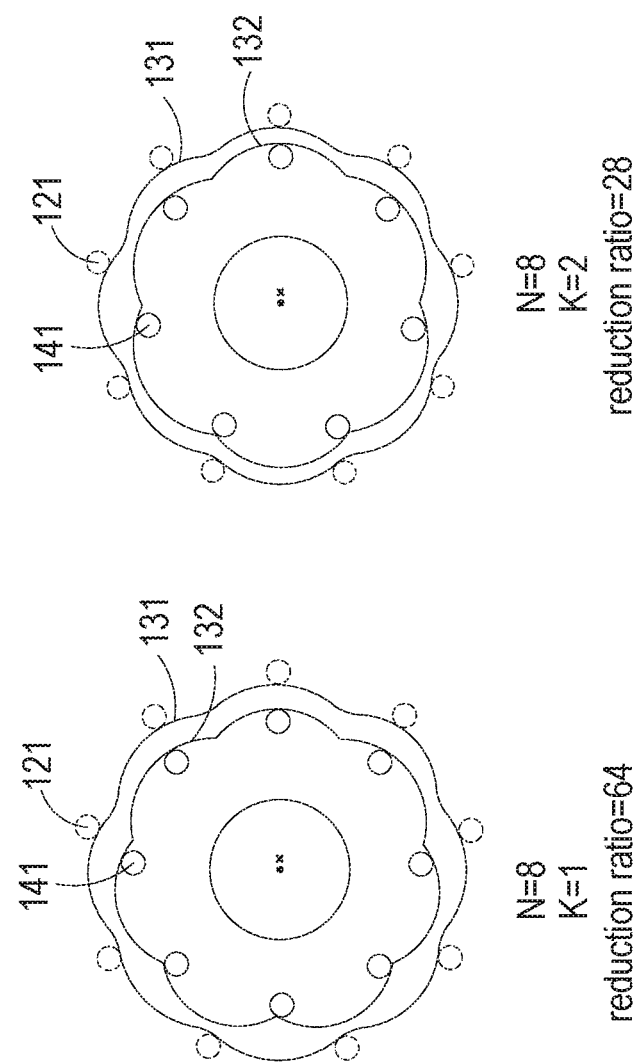
FIG. 13 schematically illustrates two examples of the speed reducer of FIG. 1 in the first operating situation, in which N=8 (K=1, 2)
Figure 14:
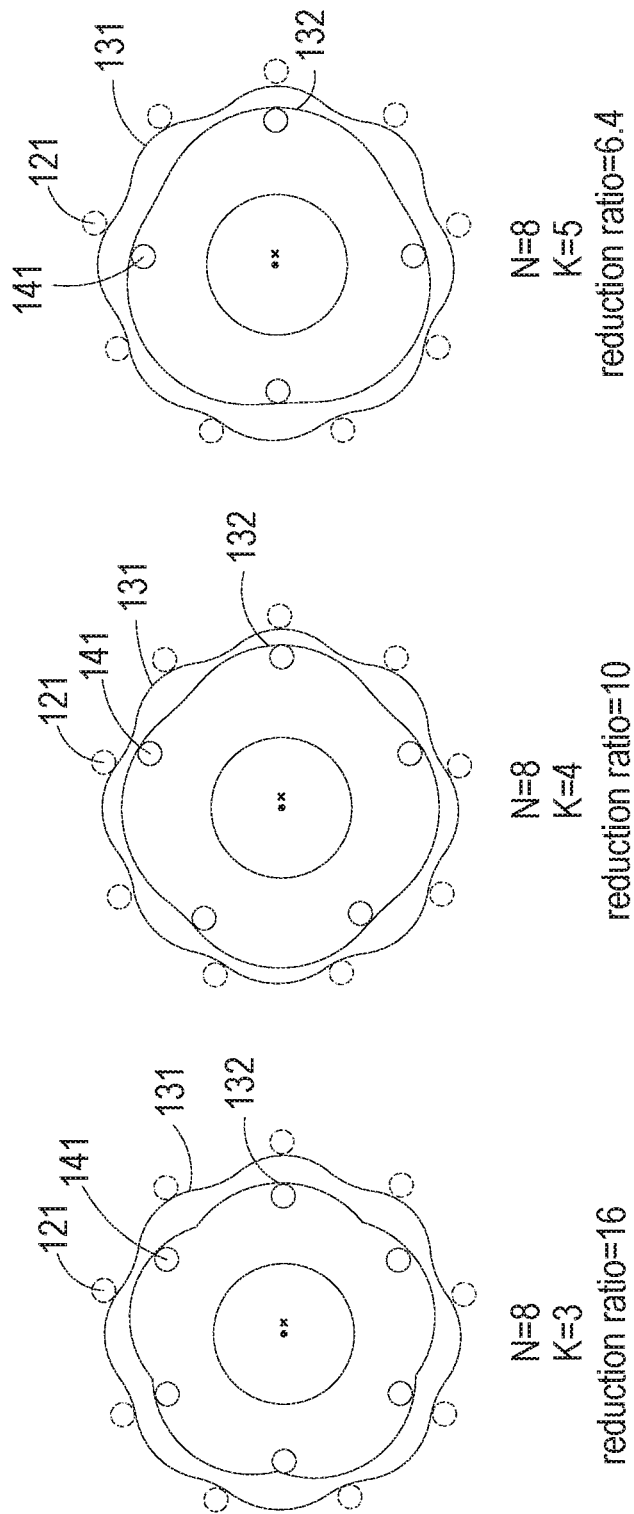
FIG. 14 schematically illustrates three examples of the speed reducer of FIG. 1 in the first operating situation, in which N=8 (K=3, 4, 5)

FIG. 13 schematically illustrates two examples of the speed reducer of the present invention in the first operating situation, in which N=8 (K=1, 2). If the number N of the outer teeth is 8 and the number difference between the outer teeth and the inner teeth is 1 (i.e., K=1), the reduction ratio of the speed reducer 1 is equal to 8×(8−1+1)/1=64. If the number N of the outer teeth is 8 and the number difference between the outer teeth and the inner teeth is 2 (i.e., K=2), the reduction ratio of the speed reducer 1 is equal to 8×(8−2+1)/2=28. FIG. 14 schematically illustrates three examples of the speed reducer of the present invention in the first operating situation, in which N=8 (K=3, 4, 5). If the number N of the outer teeth is 8 and the number difference between the outer teeth and the inner teeth is 3 (i.e., K=3), the reduction ratio of the speed reducer 1 is equal to 8×(8−3+1)/3=16. If the number N of the outer teeth is 8 and the number difference between the outer teeth and the inner teeth is 4 (i.e., K=4), the reduction ratio of the speed reducer 1 is equal to 8×(8−4+1)/4=10. If the number N of the outer teeth is 8 and the number difference between the outer teeth and the inner teeth is 5 (i.e., K=5), the reduction ratio of the speed reducer 1 is equal to 8×(8−5+1)/5=6.4.

In the third operating situation of the speed reducer 1, the following presuppositions are made: the plural first rollers 121 are not rotated about the fixed positions of the mounting surface 122, the plural second rollers 141 are rotated about the fixed positions of the third surface 1400 of the second wheel disc 140, and the number of the outer teeth of the convex structure 131 minus the number of the inner teeth of the concave structure 132 is equal to K, wherein K is

|  | Situation 1 | Situation 2 | Situation 3 | Situation 4 |
|---|---|---|---|---|
| Number of outer teeth | N | N | N | N |
| Number of inner teeth | N − 1 | N − 1 | N + 1 | N + 1 |
| Number of first rollers | N + 1 | N + 1 (self-rotation) | N + 1 (self-rotation) | N + 1 |
| Number of second rollers | N (self-rotation) | N | N + 2 (self-rotation) | N + 2 |
| Reduction ratio | N × N | (N + 1) × (N − 1) | N × (N + 2) | (N + 1) × (N + 1) |
| Rotating directions of first and second transmission shafts | Identical | Different | Different | Identical |

It is noted that the number difference between the number of the outer teeth of the convex structure 131 and the number of the inner teeth of the concave structure 132 may be more than one. Regardless of the number difference, the speed negative. Under this circumstance, the rotating direction of the first transmission shaft 10 and the rotating direction of the second transmission shaft 15 are different. In case that the number of the outer teeth of the convex structure 131 is N, the reduction ratio is equal to $|N*(N-K+1)/K|$, wherein N is an integer greater than 1 and the difference (N−K) is greater than 1.

Figure 15:
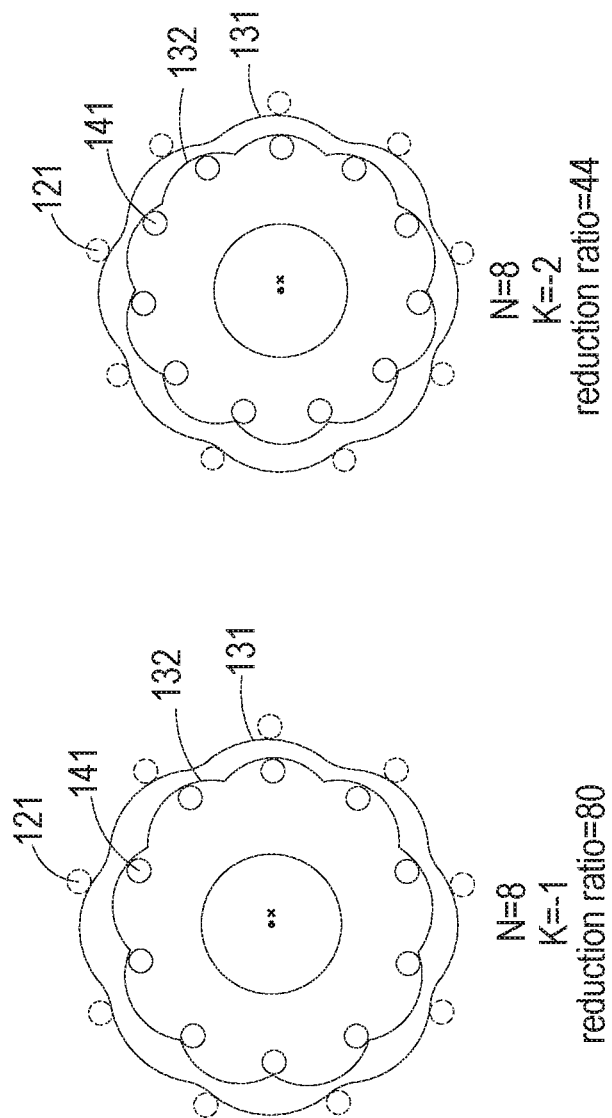
FIG. 15 schematically illustrates two examples of the speed reducer of FIG. 1 in the third operating situation, in which N=8 (K=−1, −2)
Figure 16:
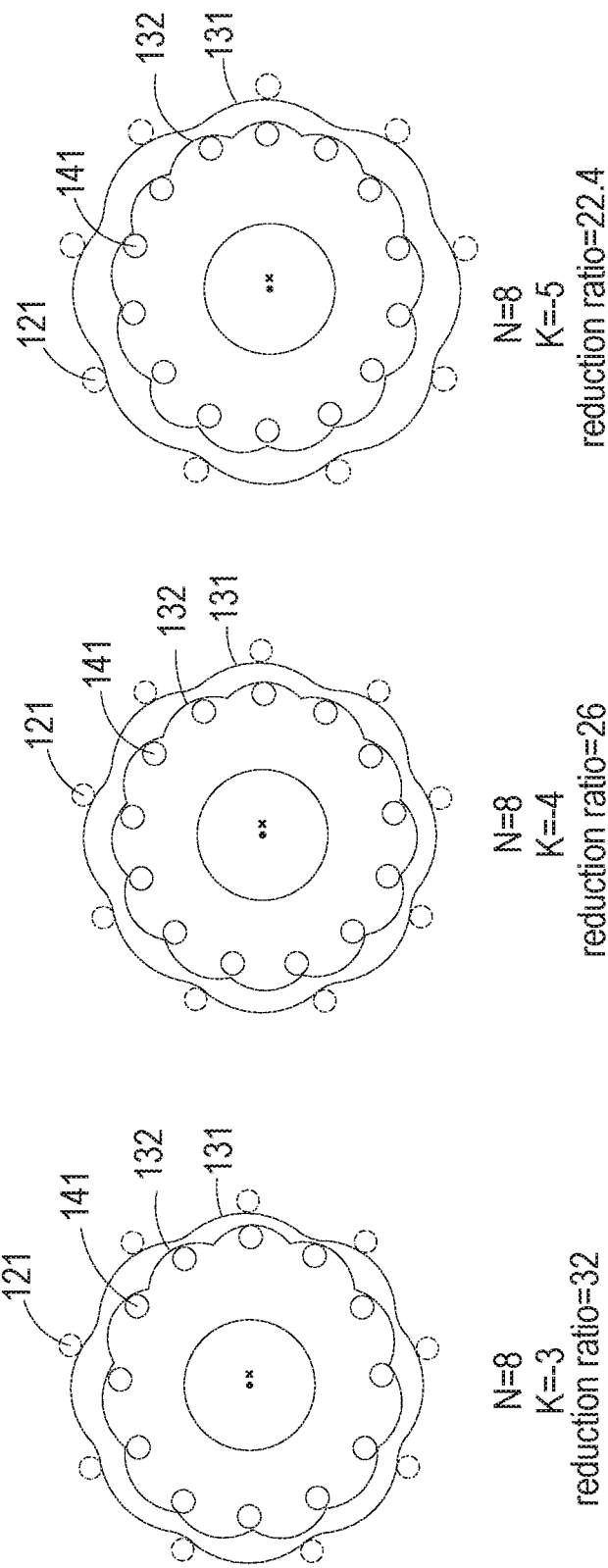
FIG. 16 schematically illustrates three examples of the speed reducer of FIG. 1 in the third operating situation, in which N=8 (K=−3, −4, −5)

FIG. 15 schematically illustrates two examples of the speed reducer of the present invention in the third operating situation, in which N=8 (K=−1, −2). If the number N of the outer teeth is 8 and the number difference between the outer teeth and the inner teeth is −1 (i.e., K=−1), the reduction ratio of the speed reducer 1 is equal to $|8\times(8+1+1)/(-1)|=80$. If the number N of the outer teeth is 8 and the number difference between the outer teeth and the inner teeth is −2 (i.e., K=−2), the reduction ratio of the speed reducer 1 is equal to $|8\times(8+2+1)/(-2)|=44$. FIG. 16 schematically illustrates three examples of the speed reducer of the present invention in the third operating situation, in which N=8 (K=−3, −4, −5). If the number N of the outer teeth is 8 and the number difference between the outer teeth and the inner teeth is −3 (i.e., K=−3), the reduction ratio of the speed reducer 1 is equal to $|8\times(8+3+1)/(-3)|=32$. If the number N of the outer teeth is 8 and the number difference between the outer teeth and the inner teeth is −4 (i.e., K=−4), the reduction ratio of the speed reducer 1 is equal to $|8\times(8+4+1)/(-4)|=26$. If the number N of the outer teeth is 8 and the number difference between the outer teeth and the inner teeth is −5 (i.e., K=−5), the reduction ratio of the speed reducer 1 is equal to $|8\times(8+5+1)/(-5)|=22.4$.

In the first operating situation or the third operating situation of the speed reducer 1, the reduction ratio is equal to $|N\times(N-K+1)/K|$, wherein N is an integer greater than 1. Since the number of the outer teeth of the convex structure 131 and the number of the inner teeth of the concave structure 132 are different, K is an integer that is not equal to 0. Moreover, the number difference (N−K) is greater than 1. In case that the term $N\times(N-K+1)/K$ is positive, the rotating direction of the first transmission shaft 10 and the rotating direction of the second transmission shaft 15 are identical. Whereas, in case that the term $N\times(N-K+1)/K$ is negative, the rotating direction of the first transmission shaft 10 and the rotating direction of the second transmission shaft 15 are different.

In the second operating situation of the speed reducer 1, the following presuppositions are made: the plural first rollers 121 are rotated about the fixed positions of the mounting surface 122, the plural second rollers 141 are not rotated about the fixed positions of the third surface 1400 of the second wheel disc 140, and the number of the outer teeth of the convex structure 131 minus the number of the inner teeth of the concave structure 132 is K. Under this circumstance, the rotating direction of the first transmission shaft 10 and the rotating direction of the second transmission shaft 15 are different. In case that the number of the outer teeth of the convex structure 131 is N, the reduction ratio is equal to $|(N+1)\times(N-K)/K|$, wherein N is an integer greater than 1 and the difference (N−K) is greater than 1.

Figure 17:
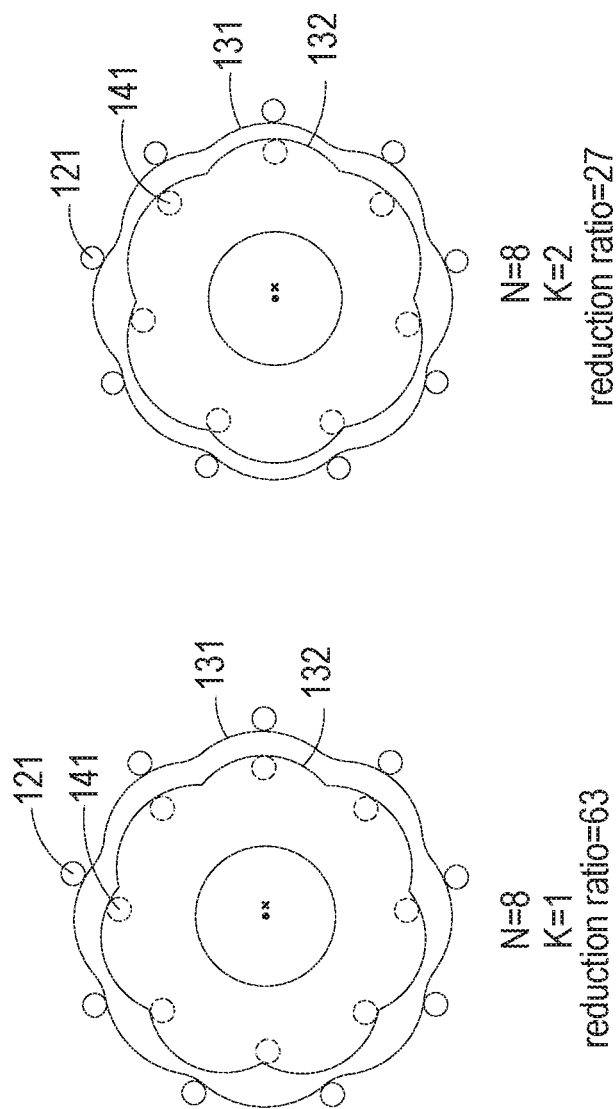
FIG. 17 schematically illustrates two examples of the speed reducer of FIG. 1 in the second operating situation, in which N=8 (K=1, 2)
Figure 18:
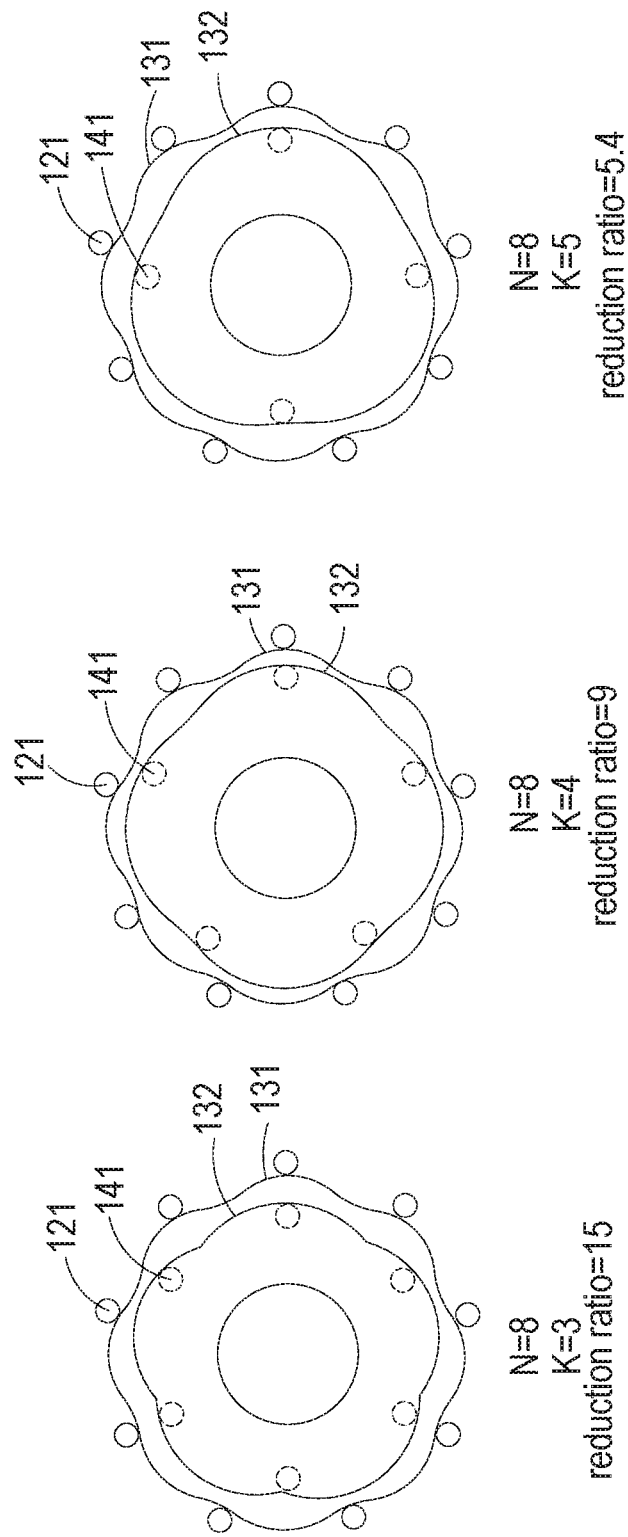
FIG. 18 schematically illustrates three examples of the speed reducer of FIG. 1 in the second operating situation, in which N=8 (K=3, 4, 5)

FIG. 17 schematically illustrates two examples of the speed reducer of the present invention in the second operating situation, in which N=8 (K=1, 2). If the number N of the outer teeth is 8 and the number difference between the outer teeth and the inner teeth is 1 (i.e., K=1), the reduction ratio of the speed reducer 1 is equal to $(8+1)\times(8-1)/1=63$. If the number N of the outer teeth is 8 and the number difference between the outer teeth and the inner teeth is 2 (i.e., K=2), the reduction ratio of the speed reducer 1 is equal to $(8+1)\times(8-2)/2=27$. FIG. 18 schematically illustrates three examples of the speed reducer of the present invention in the second operating situation, in which N=8 (K=3, 4, 5). If the number N of the outer teeth is 8 and the number difference between the outer teeth and the inner teeth is 3 (i.e., K=3), the reduction ratio of the speed reducer 1 is equal to $(8+1)\times(8-3)/3=15$. If the number N of the outer teeth is 8 and the number difference between the outer teeth and the inner teeth is 4 (i.e., K=4), the reduction ratio of the speed reducer 1 is equal to $(8+1)\times(8-4)/4=9$. If the number N of the outer teeth is 8 and the number difference between the outer teeth and the inner teeth is 5 (i.e., K=5), the reduction ratio of the speed reducer 1 is equal to $(8+1)\times(8-5)/5=5.4$.

In the fourth operating situation of the speed reducer 1, the following presuppositions are made: the plural first rollers 121 are rotated about the fixed positions of the mounting surface 122, the plural second rollers 141 are not rotated about the fixed positions of the third surface 1400 of the second wheel disc 140, and the number of the outer teeth of the convex structure 131 minus the number of the inner teeth of the concave structure 132 is equal to K, wherein K is negative. Under this circumstance, the rotating direction of the first transmission shaft 10 and the rotating direction of the second transmission shaft 15 are identical. In case that the number of the outer teeth of the convex structure 131 is N, the reduction ratio is equal to $|(N+1)\times(N-K)/K|$, wherein N is an integer greater than 1 and the difference (N−K) is greater than 1.

Figure 19:
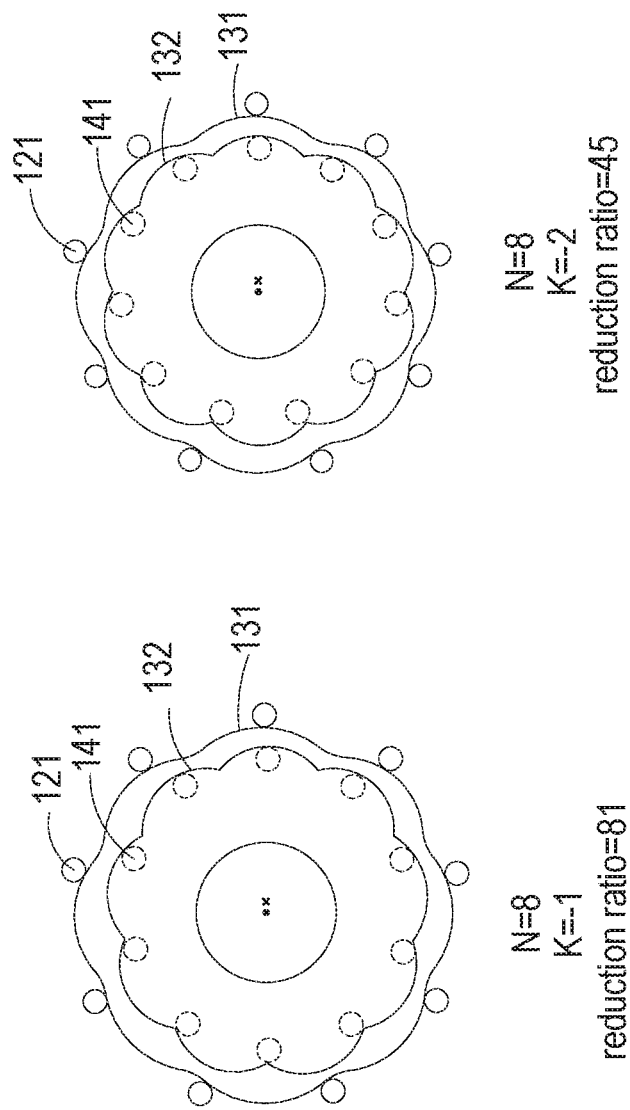
FIG. 19 schematically illustrates two examples of the speed reducer of FIG. 1 in the fourth operating situation, in which N=8 (K=−1, −2)
Figure 20:
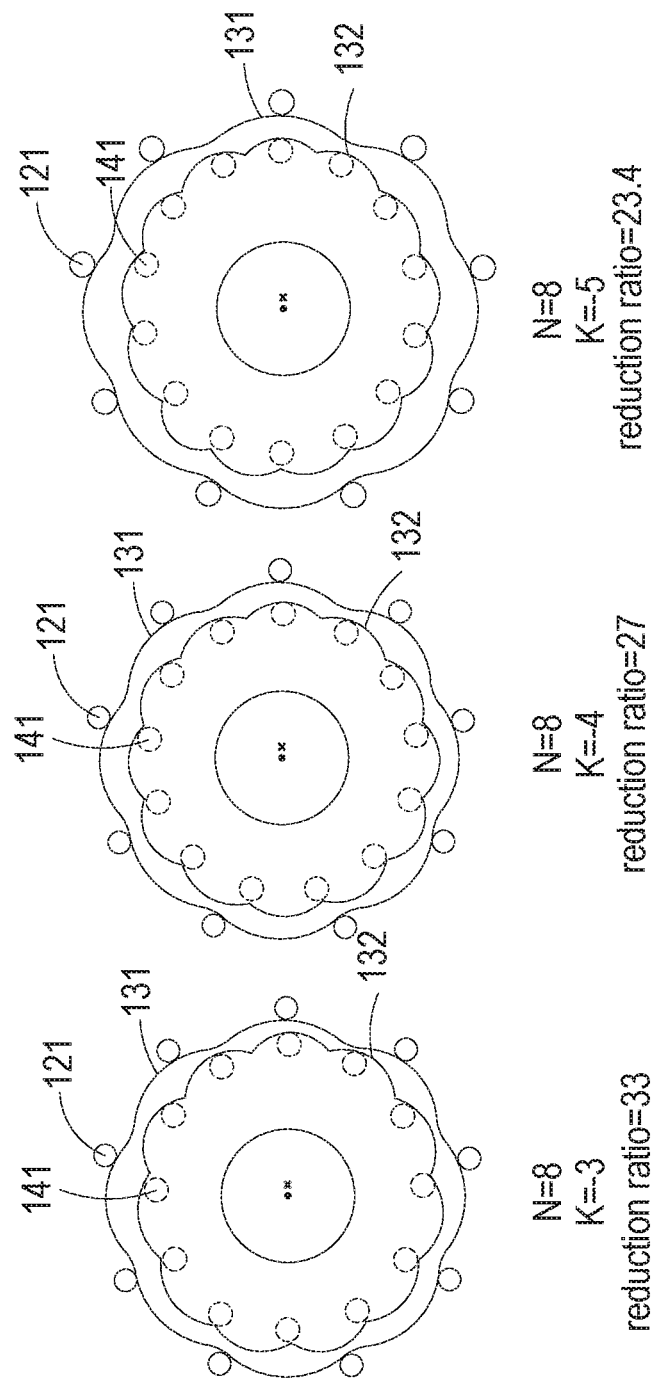
FIG. 20 schematically illustrates three examples of the speed reducer of FIG. 1 in the fourth operating situation, in which N=8 (K=−3, −4, −5)

FIG. 19 schematically illustrates two examples of the speed reducer of the present invention in the fourth operating situation, in which N=8 (K=−1, −2). If the number N of the outer teeth is 8 and the number difference between the outer teeth and the inner teeth is −1 (i.e., K=−1), the reduction ratio of the speed reducer 1 is equal to $|(8+1)\times(8+1)/(-1)|=81$. If the number N of the outer teeth is 8 and the number difference between the outer teeth and the inner teeth is −2 (i.e., K=−2), the reduction ratio of the speed reducer 1 is equal to $|(8+1)\times(8+2)/(-2)|=45$. FIG. 20 schematically illustrates three examples of the speed reducer of the present invention in the fourth operating situation, in which N=8 (K=−3, −4, −5). If the number N of the outer teeth is 8 and the number difference between the outer teeth and the inner teeth is −3 (i.e., K=−3), the reduction ratio of the speed reducer 1 is equal to $|(8+1)\times(8+2)/(-3)|=33$. If the number N of the outer teeth is 8 and the number difference between the outer teeth and the inner teeth is −4 (i.e., K=−4), the reduction ratio of the speed reducer 1 is equal to $|(8+1)\times(8+2)/(-4)|=27$. If the number N of the outer teeth is 8 and the number difference between the outer teeth and the inner teeth is −5 (i.e., K=−5), the reduction ratio of the speed reducer 1 is equal to $|(8+1)\times(8+2)/(-5)|=23.4$.

In the second operating situation or the fourth operating situation of the speed reducer 1, the reduction ratio is equal to $|(N+1)\times(N-K)/K|$, wherein N is an integer greater than 1. Since the number of the outer teeth of the convex structure 131 and the number of the inner teeth of the concave structure 132, K is an integer that is not equal to 0. Moreover, the number difference (N−K) is greater than 1. In case that the term $(N+1)\times(N-K)/K$ is positive, the rotating direction of the first transmission shaft 10 and the rotating direction of the second transmission shaft 15 are different. Whereas, in case that the term $(N+1)\times(N-K)/K$ is negative, the rotating direction of the first transmission shaft 10 and the rotating direction of the second transmission shaft 15 are identical.

In some embodiments, the eccentric wheel 11 and the second transmission shaft 15 are connected with each other through a coupling (not shown). Moreover, the wall region between the concave structure 132 and the convex structure 131 may have cavities. Due to the cavities, the dynamic balance of the rotating wheel 13 during rotation can be achieved. Moreover, the dynamic balance of the speed reducer may be achieved by adjusting the weight of the first transmission shaft 10 or providing an eccentric design of the rotating wheel 13.

In the above embodiment, the first transmission shaft 10 is the power input end, and the second transmission shaft 15 is the power output end. It is noted that those skilled in the art will readily observe that numerous modifications and alterations may be made while retaining the teachings of the invention. For example, in another embodiment, the first transmission shaft 10 is the power output end, and the second transmission shaft 15 is the power input end. Under this circumstance, the speed reducer 1 is a speed increaser in fact.

In an embodiment, the plural first rollers 121 of the first roller assembly 12 can be rotated about the axle center of the first transmission shaft 10. Namely, the first wheel disc 120 can carry the plural first rollers 121 to rotate about the axle center of the first transmission shaft 10. In addition, the plural second rollers 141 of the second roller assembly 14 can be rotated about the axle center of the second transmission shaft 15. Namely, the second wheel disc 140 can carry the plural second rollers 141 to rotate about the axle center of the second transmission shaft 15. When the plural first rollers 121 of the first roller assembly 12 are rotated about the axle center of the first transmission shaft 10, the plural second rollers 141 of the second roller assembly 14 are not rotated about the axle center of the second transmission shaft 15. In addition, when the plural first rollers 121 of the first roller assembly 12 are not rotated about the axle center of the first transmission shaft 10, the plural second rollers 141 of the second roller assembly 14 are rotated about the axle center of the second transmission shaft 15.

Therefore the speed reducer 1 can be designed to have four operating situations according to the difference between the number of the outer teeth and the number of the inner teeth and the rotation of the first rollers 121 of the first roller assembly 12 or the second rollers 141 of the second roller assembly 14, wherein the situation 1 indicates that the first roller assembly 12 is not rotated, the second roller assembly 14 is rotated and the number of the outer teeth of the convex structure 131 is one more than the number of the inner teeth of the concave structure 132, the situation 2 indicates that the first roller assembly 12 is rotated, the second roller assembly 14 is not rotated and the number of the outer teeth of the convex structure 131 is at least one more than the number of the inner teeth of the concave structure 132, the situation 3 indicates that the first roller assembly 12 is not rotated, the second roller assembly 14 is rotated and the number of the inner teeth of the concave structure 132 is at least one more than the number of the outer teeth of the convex structure 131, and the situation 4 indicates that the first roller assembly 12 is rotated, the second roller assembly 14 is not rotated and the number of the inner teeth of the concave structure 132 is at least one more than the number of the outer teeth of the convex structure 131.

Moreover, when the speed reducer 1 is operated in the first operating situation (i.e. situation 1) and the third operating situation (i.e. situation 3), the first end 100 of the first transmission shaft 10 is employed as a power input end, and the fourth end 151 of the second transmission shaft 15 is employed as a power output end. However, it is noted that the power output end is not limited to the fourth end 151 of the second transmission shaft 15. In some embodiments, when the speed reducer 1 is operated in the second operating situation (i.e. situation 2) and the fourth operating situation (i.e. situation 4), the first end 100 of the first transmission shaft 10 is employed as a power input end, and the fourth end 151 of the second transmission shaft 15 isn't a power output end. Due to that the second roller assembly 14 is not rotated when the speed reducer 1 is operated in the second operating situation and the fourth operating situation, the rotation of the rotating wheel 13 can push the first rollers 121 of the first roller assembly 12 to rotate about the axle center of the first transmission shaft 10. Under this circumstance, the first wheel disc 120 is rotated. Consequently, the first roller assembly 12 is used as a power output end.

As mentioned above, the number difference between the number of the outer teeth of the convex structure 131 and the number of the inner teeth of the concave structure 132 is one. The operations of the speed reducer 1 are according to the rotation conditions between the first roller assembly 12 and the second roller assembly 14. The parameters of the speed reducer 1 in the four operating situations are listed in the following table.

| | Situation 1 | Situation 2 | Situation 3 | Situation 4 |
|---|---|---|---|---|
| Number of outer teeth | N | N | N | N |
| Number of inner teeth | N − 1 | N − 1 | N + 1 | N + 1 |
| Number of first rollers | N + 1 | N + 1 | N + 1 | N + 1 |
| Number of second rollers | N | N | N + 2 | N + 2 |
| Reduction ratio | N × N | (N + 1) × (N − 1) | N × (N + 2) | (N + 1) × (N + 1) |
| Rotating directions of power input end and power output end | Identical | Different | Different | Identical |

As mentioned above, the first rollers 121 and the outer teeth of the convex structure 131 cooperate with each other, and the second rollers 141 and the inner teeth of the concave structure 132 cooperate with each other. Consequently, the speed reducer 1 is a two-stage cycloid speed reducer. Moreover, both of the convex structure 131 and the concave structure 132 are formed on the single rotating wheel 13. In comparison with the conventional two-stage speed reducer comprising two rotating wheels, the volume of the speed reducer 1 is reduced. In the architecture of the two-stage cycloid speed reducer, the first rollers 121 and the outer teeth of the convex structure 131 are collaboratively formed as the first-stage cycloid structure of the speed reducer 1, and the second rollers 141 and the inner teeth of the concave structure 132 are collaboratively formed as the second-stage cycloid structure of the speed reducer 1. Since the number of the first rollers 121 is at least one more than the number of the outer teeth of the convex structure 131 of the rotating wheel 13, the first-stage cycloid structure of the speed reducer 1 is an epicycloid structure. Moreover, since the number of the second rollers 141 is at least one more than the number of the inner teeth of the concave structure 132 of the rotating wheel 13, the second-stage cycloid structure of the speed reducer 1 is also an epicycloid structure. In other words, the speed reducer 1 of the first embodiment is an epicycloid-epicycloid speed reducer. Moreover, the reduction ratio is equal to $|N \times (N-K+1)/K|$ or $-(N+1) \times (N-K)/K|$, wherein K is the difference between the number of the outer teeth of the convex structure 131 and the number of the inner teeth of the concave structure 132, and the minus sign within the absolute value indicates that the relations between the rotation direction of the power input end and the rotation direction of the power output end.

It is noted that numerous modifications and alterations may be made while retaining the teachings of the invention. For example, the concepts of the present invention can be applied to an epicycloid-hypocycloid speed reducer or a hypocycloid-epicycloid speed reducer. In the first-stage cycloid structure of the epicycloid-hypocycloid speed reducer, the number of the first rollers 121 is more than the number of the outer teeth of the convex structure 131 of the rotating wheel 13. In the second-stage cycloid structure of the epicycloid-hypocycloid speed reducer, the number of the second rollers 141 is less than the number of the inner teeth of the concave structure 132 of the rotating wheel 13. In the first-stage cycloid structure of the hypocycloid-epicycloid speed reducer, the number of the first rollers 121 is less than the number of the outer teeth of the convex structure 131 of the rotating wheel 13. In the second-stage cycloid structure of the hypocycloid-epicycloid speed reducer, the number of the second rollers 141 is more than the number of the inner teeth of the concave structure 132 of the rotating wheel 13.

According to calculation, the reduction ratio of the epicycloid-hypocycloid speed reducer is equal to |M×(M−P+1)/P|, and the reduction ratio of the hypocycloid-epicycloid speed reducer is equal to |(M+1)×(P−M)/P|. In the above formulae, M is the number of the outer teeth of the convex structure, and the denominator P is the number of the outer teeth of the convex structure plus the number of the inner teeth of the concave structure. In the above formulae for calculating the reduction ratio of the epicycloid-epicycloid speed reducer, the denominator is equal to the difference between the number of the outer teeth of the convex structure and the number of the inner teeth of the concave structure. In the above formula for calculating the reduction ratio of the epicycloid-hypocycloid speed reducer or the hypocycloid-epicycloid speed reducer, the denominator is equal to the sum between the number of the outer teeth of the convex structure and the number of the inner teeth of the concave structure. In the same condition where these three kinds of speed reducers have the same number of the outer teeth of the convex structure and the same number of the inner teeth of the concave structure, the epicycloid-epicycloid speed reducer has the highest reduction ratio. Consequently, the epicycloid-hypocycloid speed reducer or the hypocycloid-epicycloid speed reducer will not be described in more detail.

Moreover, the concepts of the present invention can be applied to a hypocycloid-hypocycloid speed reducer. The reduction ratio of the hypocycloid-hypocycloid speed reducer is higher than that of the epicycloid-hypocycloid speed reducer or the hypocycloid-epicycloid speed reducer. The reason will be described in more detail as follows.

In some embodiments, the speed reducer 1 includes a first transmission shaft 10, an eccentric wheel 11, a first roller assembly 12, a rotating wheel 13 and a second roller assembly 14. The first transmission shaft 10 has a first end 100 and a second end 101. The eccentric wheel 11 is eccentrically fixed on the second end 101 of the first transmission shaft 10. The first roller assembly 12 includes a first wheel disc 120 and plural first rollers 121. The first wheel disc 120 is arranged between the first end 100 and the second end 101 of the first transmission shaft 10. The plural first rollers 121 are disposed on the first wheel disc 120. The rotating wheel 13 includes a main body 130 and an axle hole 133. The eccentric wheel 11 is rotatably disposed within the axle hole 133. The main body 130 includes a convex structure 131 and a concave structure 132. The convex structure 131 is protruded from an outer periphery of the main body 130 and has at least one outer tooth. The concave structure 132 is concavely formed in a surface of the main body 130 and includes at least one inner tooth. The second roller assembly 14 includes a second wheel disc 140 and plural second rollers 141. The plural second rollers 141 are disposed on the second wheel disc 140. The at least one outer tooth of the rotating wheel 13 are contacted with the corresponding second rollers 141 of the second roller assembly 14. The first rollers 121 of the first roller assembly 12 are contacted with the at least one corresponding inner tooth of the rotating wheel 13. The number of the at least one outer tooth and the number of the at least one inner tooth are different. The number of the first rollers 121 is at least one more than the number of the at least one outer tooth. The number of the second rollers 141 is at least one more than the number of the at least one inner tooth. Due to that the structures, operation and functions of this embodiment are the same as that of the above embodiments (see FIGS. 1 to 20), it is not redundantly described hereinafter.

Figure 21:
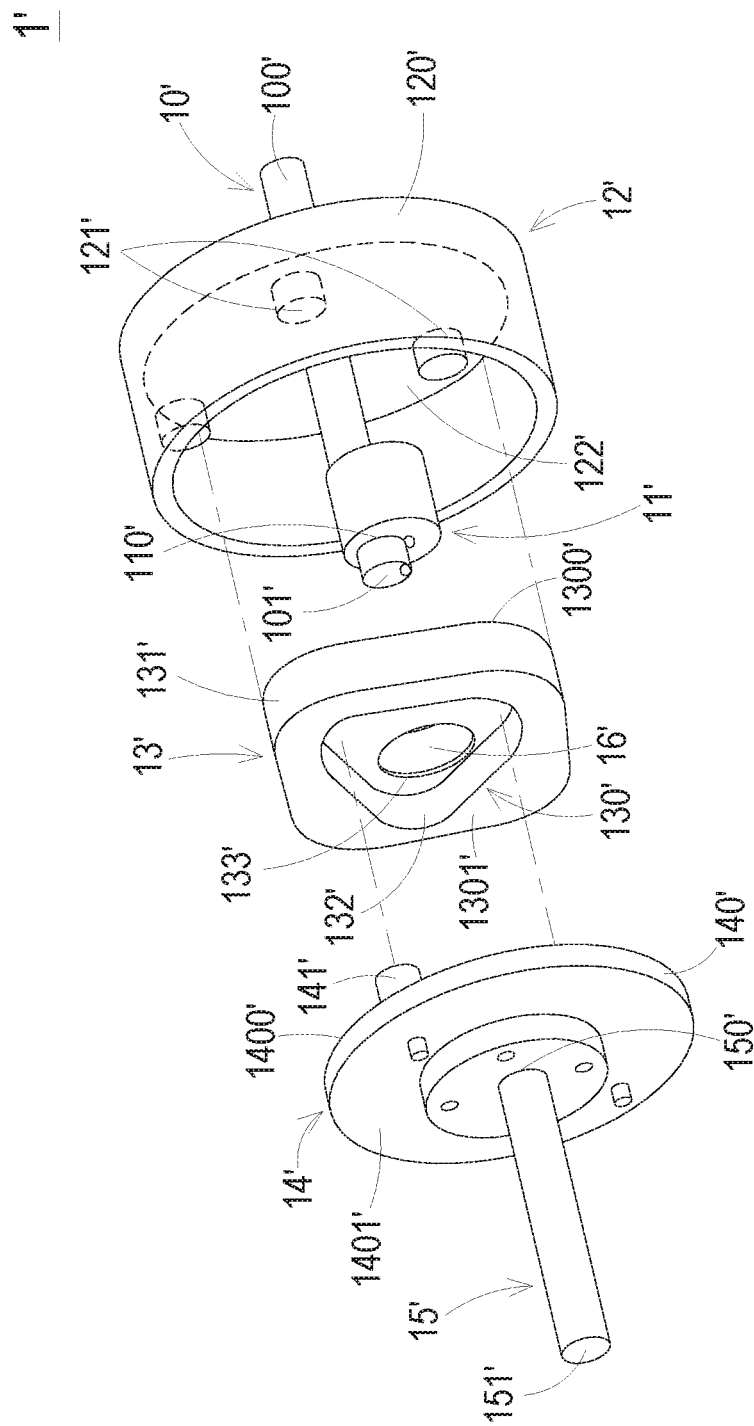
FIG. 21 is a schematic exploded view illustrating a speed reducer according to a second embodiment of the present invention.

FIG. 21 is a schematic exploded view illustrating a speed reducer according to a second embodiment of the present invention. The speed reducer 1' can be applied to motors, machine tools, robotic arms, automobiles, motorcycles or other motive machines in order to provide a speed reducing function, wherein the speed reducer 1' is a two-stage cycloid speed reducer. As shown in FIG. 21, the speed reducer 1' comprises a first transmission shaft 10', an eccentric wheel 11', a first roller assembly 12', a rotating wheel 13', a second roller assembly 14', a second transmission shaft 15' and a bearing 16'.

Preferably but not exclusively, the first transmission shaft 10' is a shaft that is made of metallic material or alloy. The first transmission shaft 10' has a first end 100' and a second end 101'. The first end 100' is a power input end for receiving an input power from a motor (not shown). The eccentric wheel 11' is a circular disc structure that is made of metallic material or alloy. Moreover, the eccentric wheel 11' has an eccentric hole 110'. The geometric center of the eccentric hole 110' is deviated from the geometric center of the eccentric wheel 11'. The second end 101' of the first transmission shaft 10' is penetrated through the eccentric hole 110'. Consequently, the eccentric wheel 11' is eccentrically fixed on the second end 101' of the first transmission shaft 10'. When the input power received by the first end 100' of the first transmission shaft 10' results in rotation of the first transmission shaft 10', the eccentric wheel 11' is driven by the second end 101' of the first transmission shaft 10'. Consequently, the eccentric wheel 11' is eccentrically rotated relative to an axle center of the first transmission shaft 10'.

The first roller assembly 12' comprises a first wheel disc 120' and one or plural first rollers 121'. The first wheel disc 120' is a circular disc structure or a hollow cylindrical structure that is made of metallic material or alloy. Moreover, a bearing (not shown) is disposed within a center hole (not shown) of the first wheel disc 120'. The central hole is at the geometric center of the first wheel disc 120'. An example of the bearing includes but is not limited to a ball bearing, a needle bearing or an oil-retaining bearing. The first end 100' of the first transmission shaft 10' is penetrated through the bearing that is disposed within the center hole of first wheel disc 120'. Consequently, the first end 100' and the second end 101' of the first transmission shaft 10' are located at two opposite sides of the first wheel disc 120'. Preferably but not exclusively, the plural first rollers 121' are circular posts, which are made of metallic material or alloy. Moreover, the plural first rollers 121' are circumferentially and discretely arranged on a mounting surface 122' of the first wheel disc 120' at regular intervals. That is, the plural first rollers 121' and the second end 101' of the first transmission shaft 10' are located at the same side of the first wheel disc 120'. Optionally, the plural first rollers 121' are rotated about their own axles. In this embodiment, the one or plural first rollers 121' of the first roller assembly 12' can be rotated or not be rotated about the axle center of the first transmission shaft 10'. Namely, if the first wheel disc 120' is rotated, the first wheel disc 120' can carry the plural first rollers 121' to rotate about the axle center of the first transmission shaft 10'.

The rotating wheel 13' is made of metallic material or alloy. In this embodiment, the rotating wheel 13' comprises a main body 130' and an axle hole 133'. The axle hole 133' is located at the geometric center of the main body 130'. The bearing 16' is disposed within the axle hole 133'. Through the bearing 16', the eccentric wheel 11' is rotatably disposed within the axle hole 133'. Consequently, when the eccentric wheel 11' is rotated, the rotating wheel 13' is synchronously rotated with the eccentric wheel 11'. The main body 130' comprises a first surface 1300' and a second surface 1301', wherein the first surface 1300' and the second surface 1301' are opposed to each other. Moreover, the main body 130' comprises a convex structure 131' and a concave structure 132'. The first surface 1300' of the main body 130' is arranged between the plural first rollers 121' and located beside the mounting surface 122' of the first wheel disc 120'. The convex structure 131' is protruded from an outer periphery of the main body 130'. Moreover, the convex structure 131' comprises plural outer teeth. Due to the plural outer teeth, the convex structure 131' has a blunt teeth profile, a wavy profile or a petal profile. Moreover, the outer peripheries of the outer teeth are contactable with the corresponding first rollers 121'. The concave structure 132' is concavely formed in a middle region of the second surface 1301' of the main body 130'. Moreover, the concave structure 132' comprises plural inner teeth. Due to the plural inner teeth, the concave structure 132' has a wavy profile or a petal profile. An example of the bearing 16' includes but is not limited to a ball bearing, a needle bearing or an oil-retaining bearing. Moreover, the region between the concave structure 132' and the convex structure 131' is defined as a wall region.

The second roller assembly 14' comprises a second wheel disc 140' and one or plural second rollers 141'. The second wheel disc 140' is a circular disc structure that is made of metallic material or alloy. The second wheel disc 140' comprises a third surface 1400' and a fourth surface 1401', wherein the third surface 1400' and the fourth surface 1401' are opposed to each other. The third surface 1400' is located beside the second surface 1301' of the rotating wheel 13'. Moreover, a fixing hole (not shown) is located at a geometric center of the second wheel disc 140'. Preferably but not exclusively, the plural second rollers 141' are circular posts, which are made of metallic material or alloy. The plural second rollers 141' are circumferentially and discretely arranged on the third surface 1400' of the second wheel disc 140' at regular intervals. Moreover, the plural second rollers 141' are partially accommodated within the concave structure 132' and contacted with the corresponding inner teeth of the concave structure 132' of the rotating wheel 13'. Consequently, when the rotating wheel 13' is synchronously rotated with the eccentric wheel 11', the plural second rollers 141' are pushed by the corresponding inner teeth of the concave structure 132' and thus rotated. Optionally, the plural second rollers 141' are rotated about their own axles. In this embodiment, the plural second rollers 141' of the second roller assembly 14' can be rotated or not be rotated about the axle center of the second transmission shaft 15'. Namely, if the second roller assembly 14' is rotated, the second wheel disc 140' can carry the plural second rollers 141' to rotate about the axle center of the second transmission shaft 15'. When one or plural first rollers 121' of the first roller assembly 12' are rotated about the axle center of the first transmission shaft 10', the plural second rollers 141' of the second roller assembly 14' are not rotated. In addition, when one or plural first rollers 121' of the first roller assembly 12' are not rotated, the plural second rollers 141' of the second roller assembly 14' are rotated. Preferably but not exclusively, the second transmission shaft 15' is a shaft that is made of metallic material or alloy. The second transmission shaft 15' has a third end 150' and a fourth end 151'. The third end 150' of the second transmission shaft 15' is fixed in the fixing hole of the second wheel disc 140' of the second roller assembly 14'. Consequently, when the second wheel disc 140' of the second roller assembly 14' is rotated, the second transmission shaft 15' is synchronously rotated with the second wheel disc 140'.

Similarly, the first rollers 121' and the outer teeth of the convex structure 131' are collaboratively formed as the first-stage cycloid structure of the speed reducer 1', and the second rollers 141' and the inner teeth of the concave structure 132' are collaboratively formed as the second-stage cycloid structure of the speed reducer 1'. Since the number of the first rollers 121' is at least one less than the number of the outer teeth of the convex structure 131' of the rotating wheel 13', the first-stage cycloid structure of the speed reducer 1' is a hypocycloid structure. Moreover, since the number of the second rollers 141' is at least one less than the number of the inner teeth of the concave structure 132' of the rotating wheel 13', the second-stage cycloid structure of the speed reducer 1' is also a hypocycloid structure. In other words, the speed reducer 1' of this embodiment is a hypocycloid-hypocycloid speed reducer.

Figure 22:
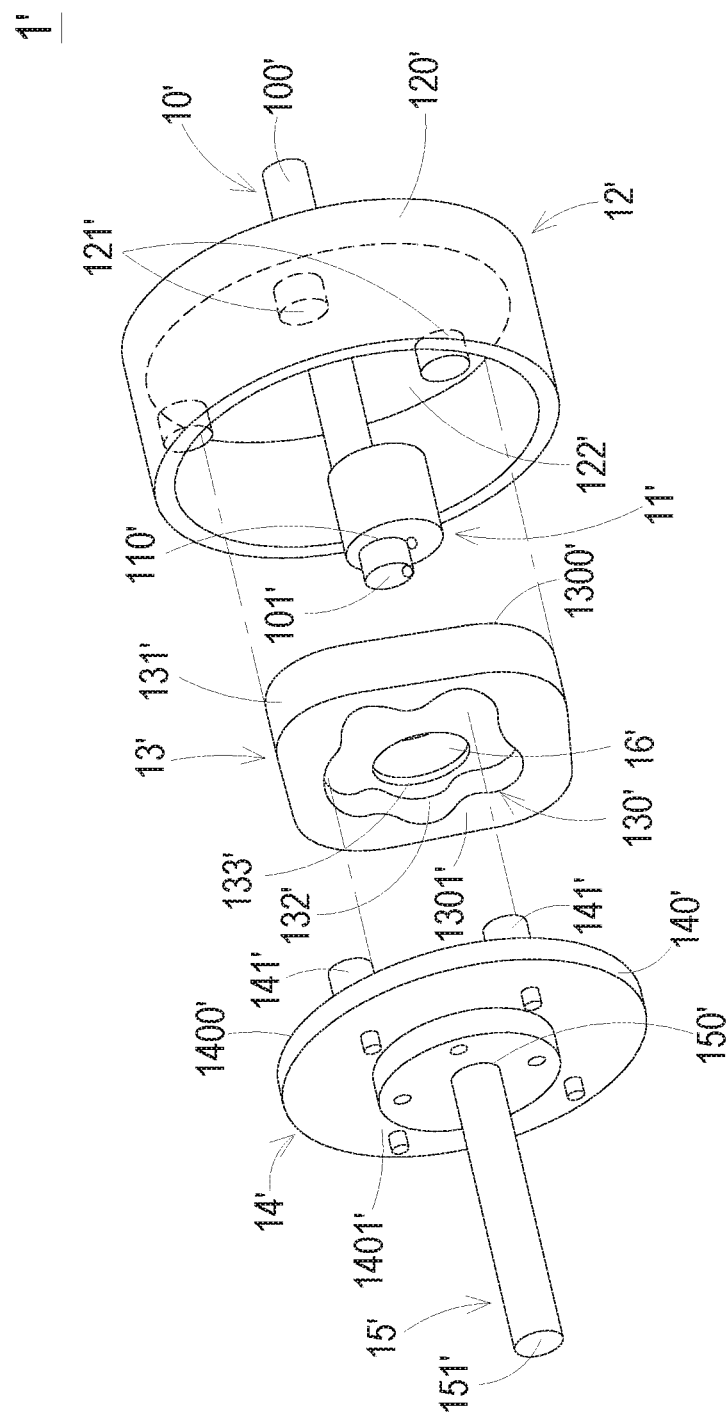
FIG. 22 is a schematic exploded view illustrating a variant example of the speed reducer of FIG. 21.

Moreover, the number of the outer teeth of the convex structure 131' and the number of the inner teeth of the concave structure 132' are different. In an embodiment, the number of the outer teeth of the convex structure 131' is at least one more than the number of the inner teeth of the concave structure 132'. For example, as shown in FIG. 21, the number of the inner teeth of the concave structure 132' is three, and the number of the outer teeth of the convex structure 131' is four. Alternatively, in another embodiment, the number of the inner teeth of the concave structure 132' is at least one more than the number of the outer teeth of the convex structure 131'. For example, as shown in FIG. 22, the number of the outer teeth of the convex structure 131' is four, and the number of the inner teeth of the concave structure 132' is five.

As mentioned above, the reduction ratio of the speed reducer 1' is determined according to the difference between the number of the outer teeth and the number of the inner teeth and the rotation of the first rollers 121' of the first roller assembly 12' or the second rollers 141' of the second roller assembly 14'. According to the above designing concepts, the speed reducer 1' can be designed to have four operating situations, wherein the situation 1 indicates that the first roller assembly 12' is not rotated and the second roller assembly 14' is rotated, the situation 2 indicates that the first roller assembly 12' is rotated and the second roller assembly 14' is not rotated, the situation 3 indicates that the first roller assembly 12' is not rotated and the second roller assembly 14' is rotated, and the situation 4 indicates that the first roller assembly 12' is rotated and the second roller assembly 14' is not rotated.

In the above embodiments, when the speed reducer 1' is operated at the first operating situation (i.e. situation 1) and the third operating situation (i.e. situation 3), the first end 100' of the first transmission shaft 10' is employed as a power input end, and the fourth end 151' of the second transmission shaft 15' is employed as a power output end. However, it is noted that the power output end is not limited to the fourth end 151' of the second transmission shaft 15'. In some embodiments, when the speed reducer 1' is operated at the second operating situation (i.e. situation 2) and the fourth operating situation (i.e. situation 4), the first end 100' of the first transmission shaft 10' is employed as a power input end, and the fourth end 151' of the second transmission shaft 15' isn't a power output end. Due to that the second roller assembly 14' is not rotated when the speed reducer 1' is operated at the second operating situation and the fourth operating situation, the rotation of the rotating wheel 13' can push the first rollers 121' of the first roller assembly 12' to rotate. Under this circumstance, the first wheel disc 120' is rotated. Consequently, the first roller assembly 12' is used as a power output end.

For understanding the present invention, the following presuppositions are made: (a) the number difference between the number of the outer teeth of the convex structure 131' and the number of the inner teeth of the concave structure 132' is one, (b) the number of the first rollers 121' is at least one less than the number of the outer teeth of the convex structure 131' of the rotating wheel 13', and (c) the number of the second rollers 141' is at least one less than the number of the inner teeth of the concave structure 132' of the rotating wheel 13'. In the following drawings, the dotted circles indicate that the first rollers 121' of the first roller assembly 12' are not rotated or the second rollers 141' of 'the second roller assembly 14' are not rotated. The solid circles indicate that the first rollers 121' of the first roller assembly 12' are rotated about the axle center of the first transmission shaft 10' or the second rollers 141' of the second roller assembly 14' are rotated about the axle center of the second transmission shaft 15'.

In the first operating situation of the speed reducer 1', the number of the outer teeth of the convex structure 131' is one more than the number of the inner teeth of the concave structure 132', the first roller assembly 12' is not rotated, and the second roller assembly 14' is rotated. For example, in case that the number of the outer teeth of the convex structure 131' is N, the number of the inner teeth of the concave structure 132' is equal to (N−1), the number of the first rollers 121' is equal to (N−1), and the number of the second rollers 141' is equal to (N−2). In the first operating situation, the rotating direction of the power input end and the rotating direction of the power output end are different. Moreover, the reduction ratio of the speed reducer 1' is equal to N×(N−2), wherein N is an integer greater than 2.

Figure 23:
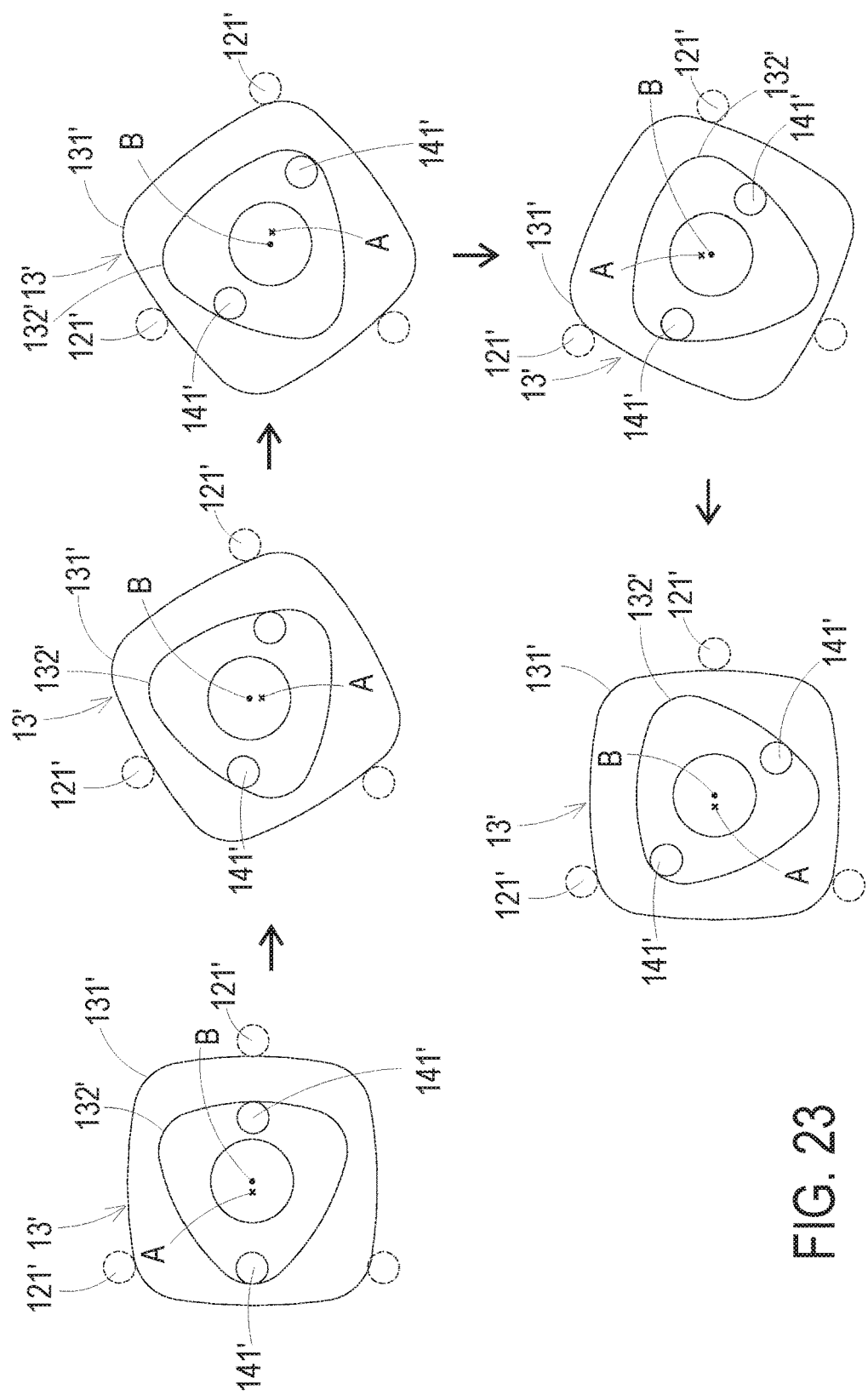
FIG. 23 schematically illustrates the sequential actions of the speed reducer of FIG. 21 in the first operating situation.

Hereinafter, the operating principles of the speed reducer 1' in the first operating situation will be illustrated with reference to FIGS. 23~27. FIG. 23 schematically illustrates the sequential actions of the speed reducer of FIG. 21 in the first operating situation. For example, the number of the outer teeth of the convex structure 131' is 4, and the number of the inner teeth of the concave structure 132' is 3. In FIG. 23, the time interval between every two adjacent actions is equal to the time period of rotating one-fourth turn of the first transmission shaft 10'. When the first transmission shaft 10' is driven by an external driving mechanism (e.g., the shaft lever of the motor) and rotated in a counterclockwise direction, the eccentric wheel 11' is synchronously rotated with the first transmission shaft 10' in the counterclockwise direction. In FIG. 23 and the following drawings, the symbol A denotes the axle center of the first transmission shaft 10', and the symbol B denotes the axle center of the eccentric wheel 11'. When the first transmission shaft 10' is rotated one turn, the eccentric wheel 11' is eccentrically rotated one turn. Since the eccentric wheel 11' is rotatably disposed within the bearing 16', the eccentric rotation of the eccentric wheel 11' will result in a pushing force to push the rotating wheel 13' to be slowly rotated in a counterclockwise direction. Moreover, since the first roller assembly 12' is not rotated, the inner teeth of the concave structure 132' and the plural second rollers 141' of the second roller assembly 14' are pushed against each other. Under this circumstance, the plural second rollers 141' are rotated in the clockwise direction about the axle center of the second transmission shaft 15'. In response to the motion of the plural second rollers 141', the second roller assembly 14' is correspondingly rotated in the clockwise direction since the second wheel disc 140' is driven to rotate in the clockwise direction by the plural second rollers 141'. Consequently, the second transmission shaft 15' is synchronously rotated with the second wheel disc 140' in the clockwise direction. As the second transmission shaft 15' is rotated, an external driven mechanism (e.g., a belt pulley or a gear) is driven to be rotated at a reduced speed. In this embodiment, the number of the outer teeth of the convex structure 131' is 4, and the number of the inner teeth of the concave structure 132' is 3. In response to one turn of the first transmission shaft 10' in the counterclockwise direction, the rotating wheel 13' is rotated in the counterclockwise direction for one-fourth turn and the motion of the plural second rollers 141' results in one-eighth turn of the second transmission shaft 15'. Consequently, the reduction ratio of the speed reducer 1' is 8.

Figure 24:
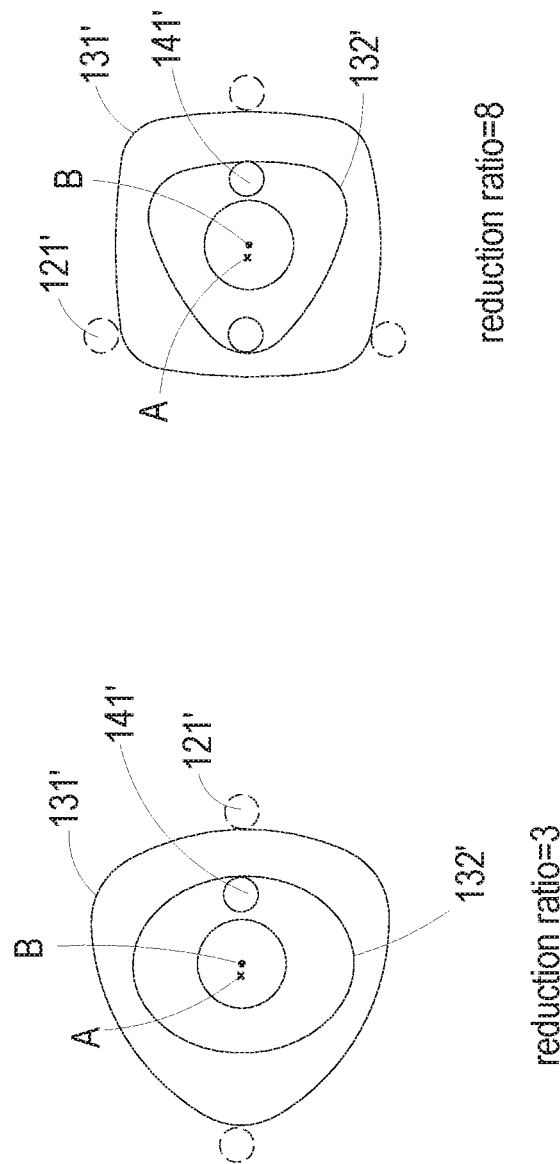
FIG. 24 schematically illustrates two examples of the speed reducer of the FIG. 21 in the first operating situation, in which the numbers of the outer teeth of the convex structure are 3 and 4, respectively.
Figure 25:
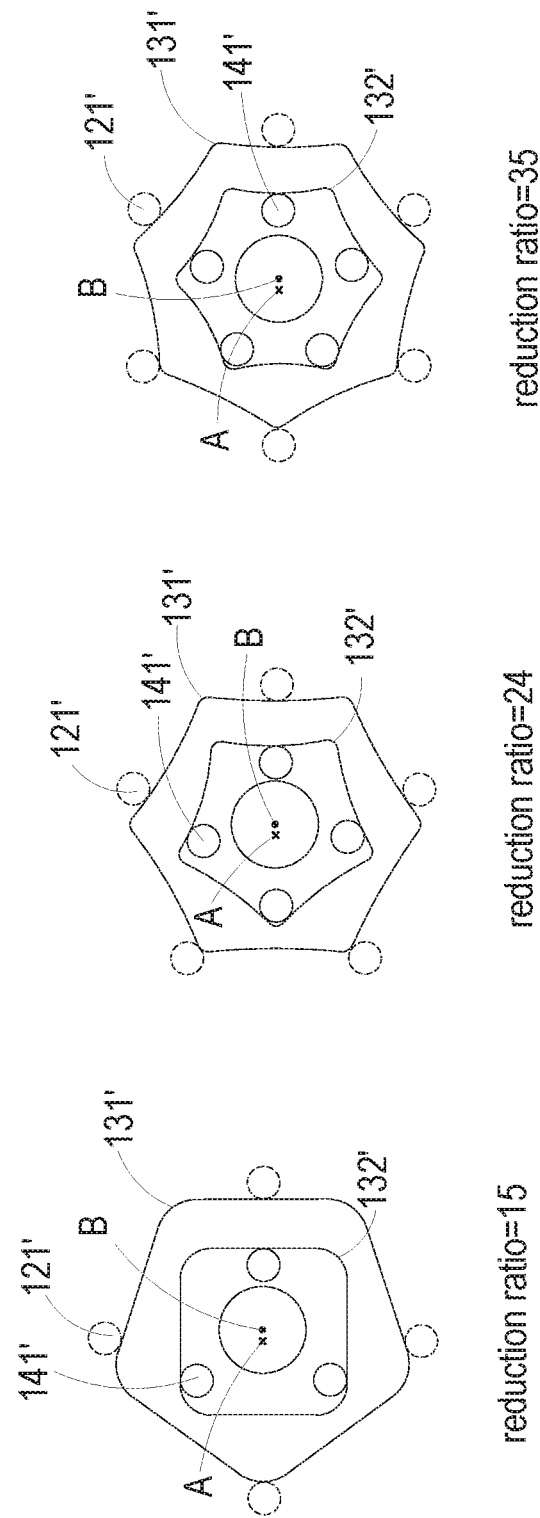
FIG. 25 schematically illustrates three examples of the speed reducer of FIG. 21 in the first operating situation, in which the numbers of the outer teeth of the convex structure are 5, 6 and 7, respectively.

In the first operating situation, if the number of the outer teeth of the convex structure 131' is N, the reduction ratio of the speed reducer 1' is equal to N×(N−2). FIG. 24 schematically illustrates two examples of the speed reducer of FIG. 21 in the first operating situation, in which the numbers of the outer teeth of the convex structure are 3 and 4, respectively. If the number of the outer teeth is 3 and the number of the inner teeth is 2, the reduction ratio of the speed reducer 1' is equal to 3 (i.e., 3×1=3). If the number of the outer teeth is 4 and the number of the inner teeth is 3, the reduction ratio of the speed reducer 1' is equal to 8 (i.e., 4×2=8). FIG. 25 schematically illustrates three examples of the speed reducer of FIG. 21 in the first operating situation, in which the numbers of the outer teeth of the convex structure are 5, 6 and 7, respectively. If the number of the outer teeth is 5 and the number of the inner teeth is 4, the reduction ratio of the speed reducer 1' is equal to 15 (i.e., 5×3=15). If the number of the outer teeth is 6 and the number of the inner teeth is 5, the reduction ratio of the speed reducer 1' is equal to 24 (i.e., 6×4=24). If the number of the outer teeth is 7 and the number of the inner teeth is 6, the reduction ratio of the speed reducer 1' is equal to 35 (i.e., 7×5=35). FIG. 26 schematically illustrates three examples of the speed reducer of FIG. 21 in the first operating situation, in which the numbers of the outer teeth of the convex structure are 8, 9 and 10, respectively. If the number of the outer teeth is 8 and the number of the inner teeth is 7, the reduction ratio of the speed reducer 1' is equal to 48 (i.e., 8×6=48). If the number of the outer teeth is 9 and the number of the inner teeth is 8, the reduction ratio of the speed reducer 1' is equal to 63 (i.e., 9×7=63). If the number of the outer teeth is 10 and the number of the inner teeth is 9, the reduction ratio of the speed reducer 1' is equal to 80 (i.e., 10×8=80). FIG. 27 schematically illustrates two examples of the speed reducer of FIG. 21 in the first operating situation, in which the numbers of the outer teeth of the convex structure are 20 and 30, respectively. If the number of the outer teeth is 20 and the number of the inner teeth is 19, the reduction ratio of the speed reducer 1' is equal to 360 (i.e., 20×18=360). If the number of the outer teeth is 30 and the number of the inner teeth is 29, the reduction ratio of the speed reducer 1' is equal to 840 (i.e., 30×28=840).

From the above descriptions, the pushing action of the speed reducer 1' is similar to the conventional harmonic drive reducer. Consequently, in comparison with the RV reducer, the speed reducer 1' has simplified structure and less number of components, and is easily assembled and cost-effective. Moreover, for achieving a high reduction ratio (e.g., 840), the gap between every two adjacent teeth of the gear of the conventional harmonic drive reducer is very small. Consequently, it is difficult to produce the conventional harmonic drive reducer with high reduction ratio. In other words, the reduction ratio cannot be largely increased. In contrast, if the number of the outer teeth of the convex structure 131' is 30 and the number of the inner teeth of the concave structure 132' is 29, the speed reducer 1' can achieve the reduction ratio of 840. Moreover, the rotating wheel 13' can be easily produced, and the reduction ratio of the speed reducer 1' is largely increased. Moreover, due to the wall region between the concave structure 132' and the convex structure 131' of the rotating wheel 13' of the speed reducer 1', the overall rigidity of the speed reducer 1' is increased to withstand high impact and the use life of the speed reducer 1' is prolonged. Consequently, the problems of the conventional harmonic drive reducer (e.g., the deformation of the flex spline and the teeth difference friction) can be solved.

Figure 28:
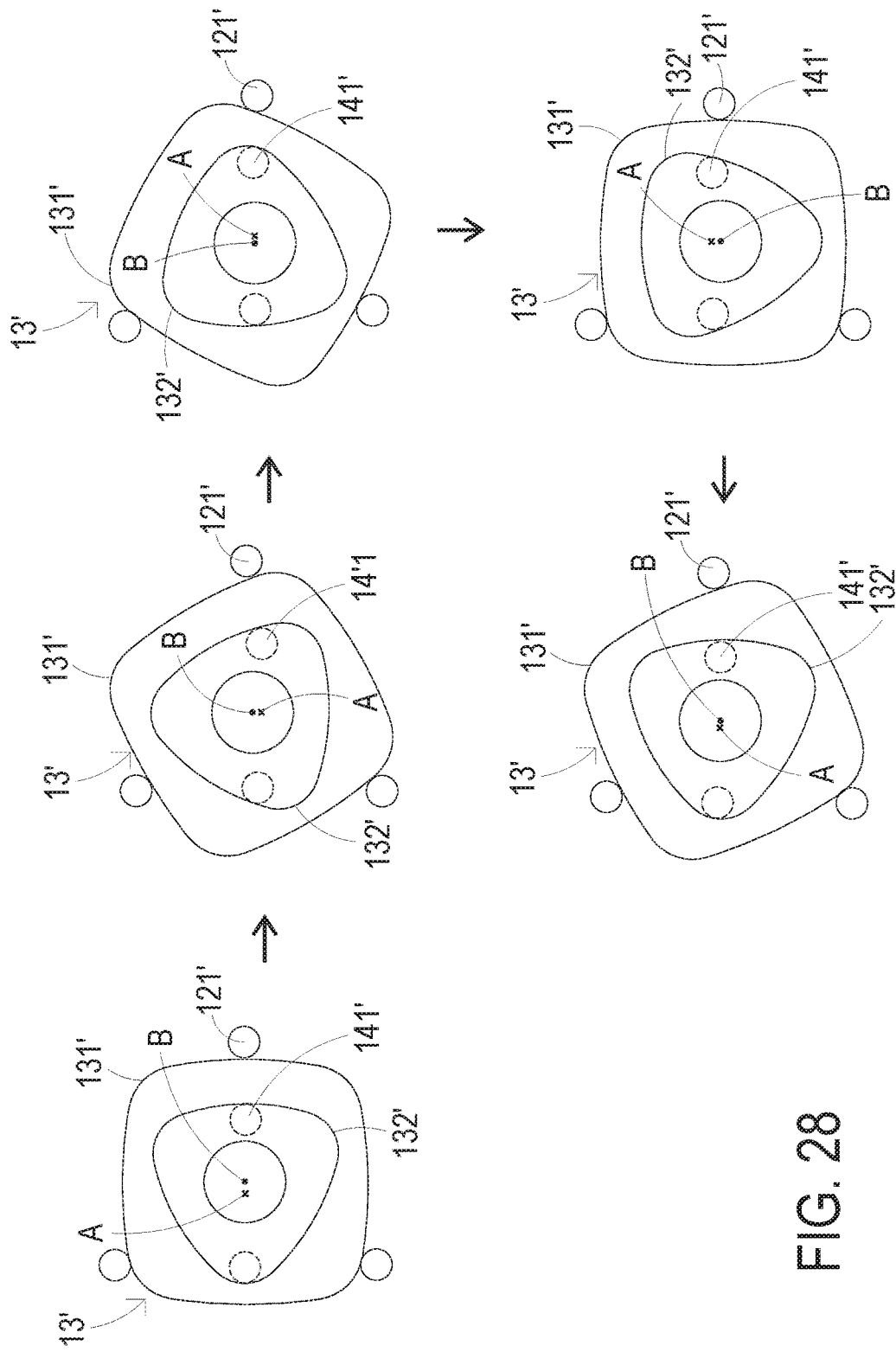
FIG. 28 schematically illustrates the sequential actions of the speed reducer of FIG. 21 in the second operating situation.

In the second operating situation of the speed reducer 1', the number of the outer teeth of the convex structure 131' is at least one more than the number of the inner teeth of the concave structure 132', the first roller assembly 12' is rotated, and the second roller assembly 14' is not rotated. For example, in case that the number of the outer teeth of the convex structure 131' is N, the number of the inner teeth of the concave structure 132' is equal to (N−1), the number of the first rollers 121' is equal to (N−1), and the number of the second rollers 141' is equal to (N−2). In the second operating situation, the rotating direction of the power input end and the rotating direction of the power output end are identical. Moreover, the reduction ratio of the speed reducer 1 is equal to (N−1)×(N−1), wherein N is an integer greater than 2. FIG. 28 schematically illustrates the sequential actions of the speed reducer of FIG. 21 in the second operating situation. For example, the number of the outer teeth of the convex structure 131' is 4, and the number of the inner teeth of the concave structure 132' is 3. In FIG. 28, the time interval between every two adjacent actions is equal to the time period of rotating one-fourth turn of the first transmission shaft 10'. Under this circumstance, the reduction ratio of the speed reducer 1' is (4−1)×(4−1)=9.

Figure 29:
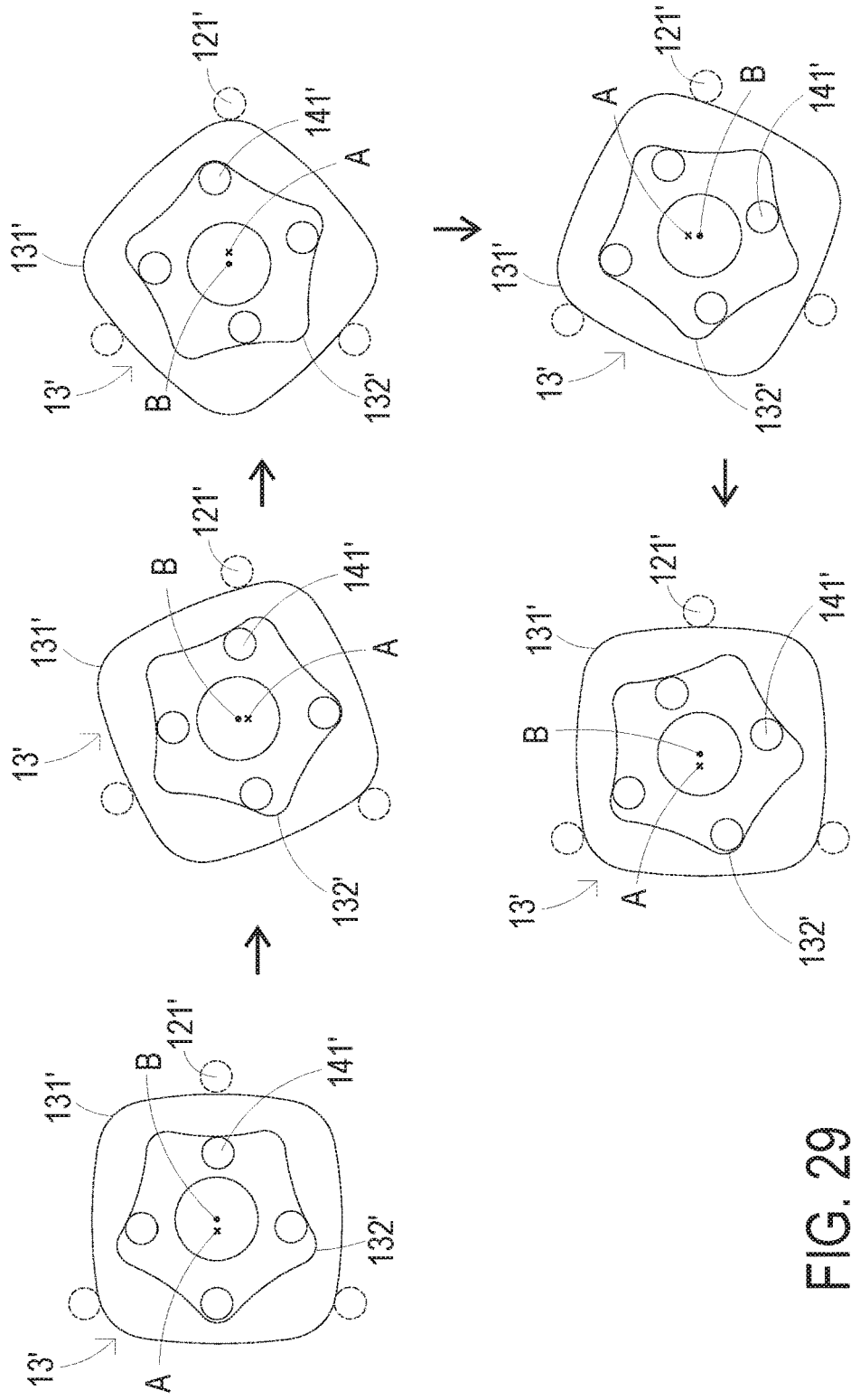
FIG. 29 schematically illustrates the sequential actions of the speed reducer of FIG. 21 in the third operating situation.

In the third operating situation of the speed reducer 1', the number of the inner teeth of the concave structure 132' is at least one more than the number of the outer teeth of the convex structure 131', the first roller assembly 12' is not rotated, and the second roller assembly 14' is rotated. For example, in case that the number of the outer teeth of the convex structure 131' is N, the number of the inner teeth of the concave structure 132' is equal to (N+1), the number of the first rollers 121' is equal to (N−1), and the number of the second rollers 141' is equal to N. In the third operating situation, the rotating direction of the power input end and the rotating direction of the power output end are identical. Moreover, the reduction ratio of the speed reducer 1' is equal to N×N, wherein N is an integer greater than 1. FIG. 29 schematically illustrates the sequential actions of the speed reducer of FIG. 21 in the third operating situation. For example, the number of the outer teeth of the convex structure 131' is 4, and the number of the inner teeth of the concave structure 132' is 5. In FIG. 29, the time interval between every two adjacent actions is equal to the time period of rotating one-fourth turn of the first transmission shaft 10'. Under this circumstance, the reduction ratio of the speed reducer 1' is 4×4=16.

Figure 30:
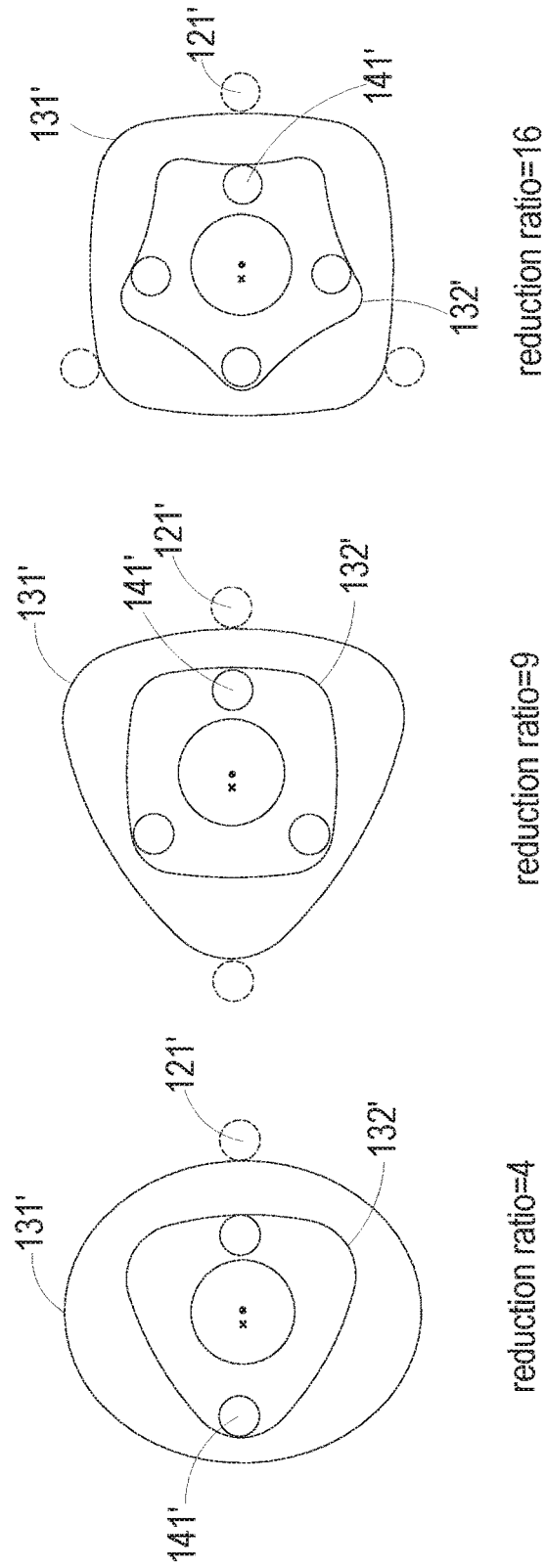
FIG. 30 schematically illustrates three examples of the speed reducer of FIG. 21 in the third operating situation, in which the numbers of the outer teeth of the convex structure are 2, 3 and 4, respectively.
Figure 31:
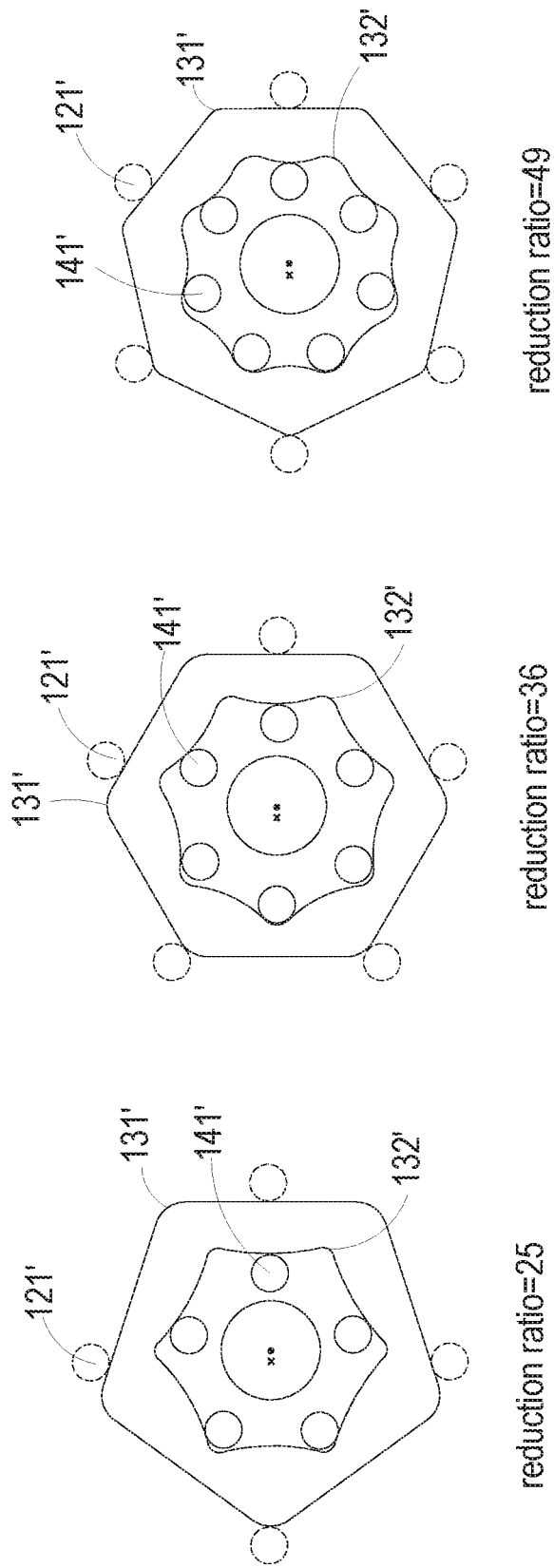
FIG. 31 schematically illustrates three examples of the speed reducer of FIG. 21 in the third operating situation, in which the numbers of the outer teeth of the convex structure are 5, 6 and 7, respectively.

In the third operating situation, if the number of the outer teeth of the convex structure 131' is N, the reduction ratio of the speed reducer 1' is equal to N×N. FIG. 30 schematically illustrates three examples of the speed reducer of FIG. 21 in the third operating situation, in which the numbers of the outer teeth of the convex structure are 2, 3 and 4, respectively. For example, if the number of the outer teeth is 2 and the number of the inner teeth is 3, the reduction ratio of the speed reducer 1' is equal to 4 (i.e., 2×2=4). If the number of the outer teeth is 3 and the number of the inner teeth is 4, the reduction ratio of the speed reducer 1' is equal to 9 (i.e., 3×3=9). If the number of the outer teeth is 4 and the number of the inner teeth is 5, the reduction ratio of the speed reducer 1' is equal to 16 (i.e., 4×4=16). FIG. 31 schematically illustrates three examples of the speed reducer of FIG. 21 in the third operating situation, in which the numbers of the outer teeth of the convex structure are 5, 6 and 7, respectively. If the number of the outer teeth is 5 and the number of the inner teeth is 6, the reduction ratio of the speed reducer 1' is equal to 25 (i.e., 5×5=25). If the number of the outer teeth is 6 and the number of the inner teeth is 7, the reduction ratio of the speed reducer 1' is equal to 36 (i.e., 6×6=36). If the number of the outer teeth is 7 and the number of the inner teeth is 8, the reduction ratio of the speed reducer 1' is equal to 49 (i.e., 7×7=49).

Figure 32:
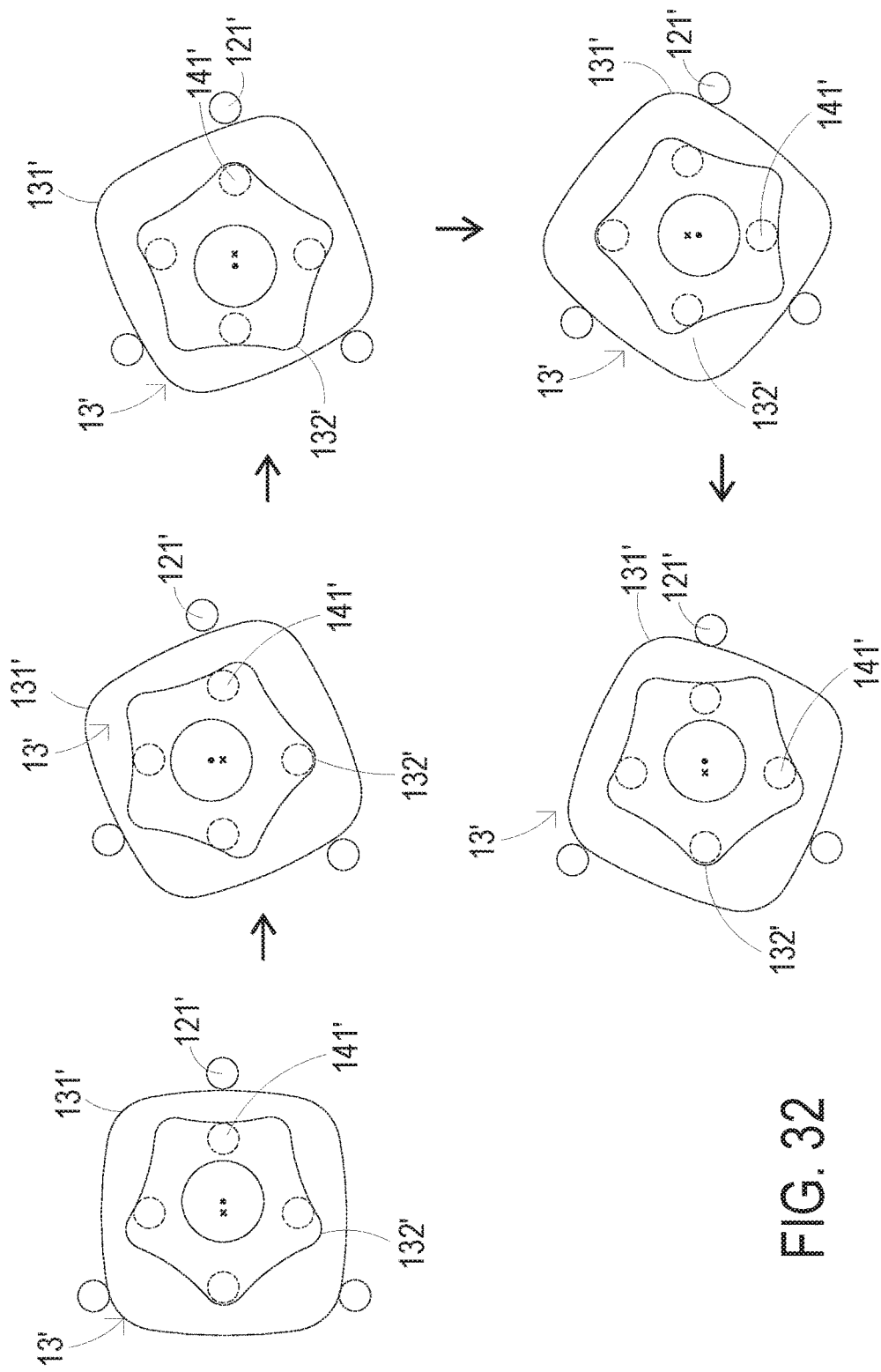
FIG. 32 schematically illustrates the sequential actions of the speed reducer of FIG. 21 in the fourth operating situation.

In the fourth operating situation of the speed reducer 1', the number of the inner teeth of the concave structure 132' is at least one more than the number of the outer teeth of the convex structure 131', the first roller assembly 12' is rotated, and the second roller assembly 14' is not rotated. For example, in case that the number of the outer teeth of the convex structure 131' is N, the number of the inner teeth of the concave structure 132' is equal to (N+1), the number of the first rollers 121' is equal to (N−1), and the number of the second rollers 141' is equal to N. In the fourth operating situation, the rotating direction of the power input end and the rotating direction of the power output end are different. Moreover, the reduction ratio of the speed reducer 1' is equal to (N+1)×(N−1), wherein N is an integer greater than 2. FIG. 32 schematically illustrates the sequential actions of the speed reducer of FIG. 21 in the fourth operating situation. For example, the number of the outer teeth of the convex structure 131' is 4, and the number of the inner teeth of the concave structure 132' is 5. In FIG. 32, the time interval between every two adjacent actions is equal to the time period of rotating one-fourth turn of the first transmission shaft 10'. Under this circumstance, the reduction ratio of the speed reducer 1' is (4+1)×(4−1)=15.

As mentioned above, the number difference between the number of the outer teeth of the convex structure 131' and the number of the inner teeth of the concave structure 132' is one. The parameters of the speed reducer 1' in the four operating situations are listed in the following table, wherein the situation 1 indicates that the first roller assembly 12' is not rotated and the second roller assembly 14' is rotated, the situation 2 indicates that the first roller assembly 12' is rotated and the second roller assembly 14' is not rotated, the situation 3 indicates that the first roller assembly 12' is not rotated and the second roller assembly 14' is rotated, and the situation 4 indicates that the first roller assembly 12' is rotated and the second roller assembly 14' is not rotated.

|  | Situation 1 | Situation 2 | Situation 3 | Situation 4 |
|---|---|---|---|---|
| Number of outer teeth | N | N | N | N |
| Number of inner teeth | $N-1$ | $N-1$ | $N+1$ | $N+1$ |
| Number of first rollers | $N-1$ | $N-1$ | $N-1$ | $N-1$ |
| Number of second rollers | $N-2$ | $N-2$ | N | N |
| Reduction ratio | $N \times (N-2)$ | $(N-1) \times (N-1)$ | $N \times N$ | $(N+1) \times (N-1)$ |
| Rotating directions of power input end and power output end | Different | Identical | Identical | Different |

It is noted that the number difference between the number of the outer teeth of the convex structure 131' and the number of the inner teeth of the concave structure 132' may be more than one. Regardless of the number difference, the speed reducer 1' can be designed to have the above four operating situations. Consequently, the speed reducer 1' can have various reduction ratios.

In the first operating situation of the speed reducer 1', the following presuppositions are made: the first roller assembly 12' is not rotated, the second roller assembly 14' is rotated, and the number of the outer teeth of the convex structure 131' minus the number of the inner teeth of the concave structure 132' is K. Under this circumstance, the rotating direction of the power input end and the rotating direction of the power output end are different. In case that the number of the outer teeth of the convex structure 131' is N, the reduction ratio is equal to $|-N \times (N-K-1)/K|$, wherein N is an integer greater than 2 and the difference (N−K) is greater than 1.

Figure 33:
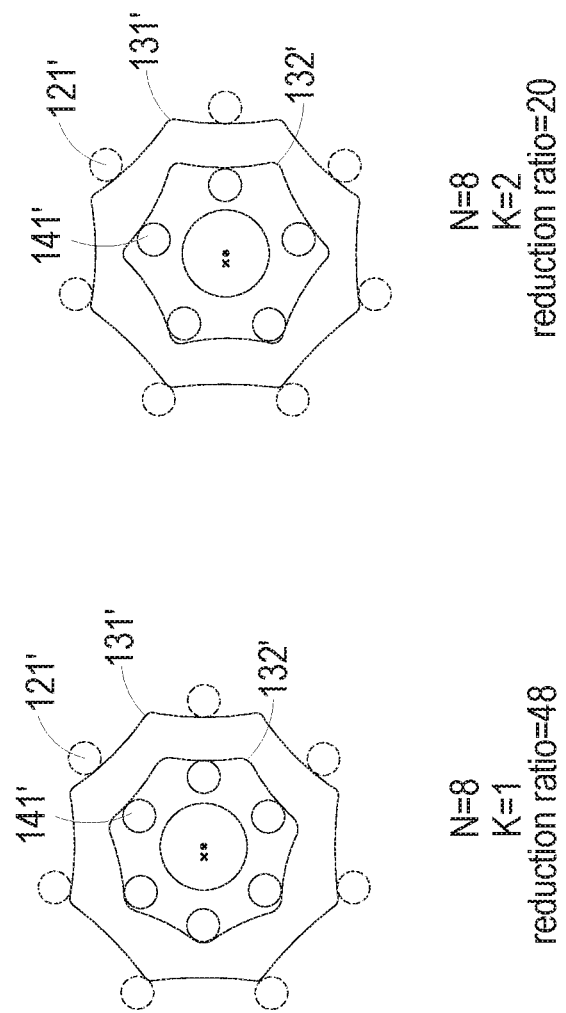
FIG. 33 schematically illustrates two examples of the speed reducer of FIG. 21 in the first operating situation, in which N=8 (K=1, 2)
Figure 34:
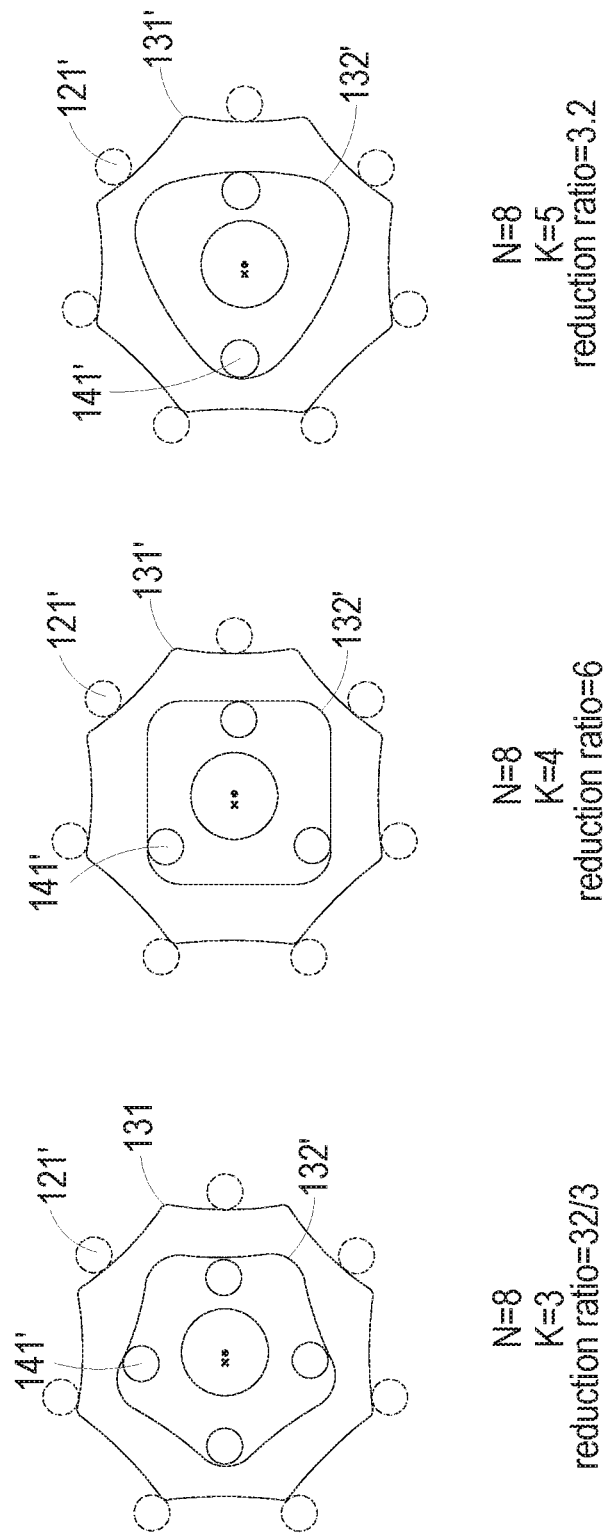
FIG. 34 schematically illustrates three examples of the speed reducer of FIG. 21 in the first operating situation, in which N=8 (K=3, 4, 5)

FIG. 33 schematically illustrates two examples of the speed reducer of FIG. 21 in the first operating situation, in which N=8 (K=1, 2). If the number N of the outer teeth is 8 and the number difference between the outer teeth and the inner teeth is 1 (i.e., K=1), the reduction ratio of the speed reducer 1' is equal to $|-8 \times (8-1-1)/1|=48$. If the number N of the outer teeth is 8 and the number difference between the outer teeth and the inner teeth is 2 (i.e., K=2), the reduction ratio of the speed reducer 1' is equal to $|-8 \times (8-2-1)/2|=20$. FIG. 34 schematically illustrates three examples of the speed reducer of FIG. 21 in the first operating situation, in which N=8 (K=3, 4, 5). If the number N of the outer teeth is 8 and the number difference between the outer teeth and the inner teeth is 3 (i.e., K=3), the reduction ratio of the speed reducer 1' is equal to $|-8 \times (8-3-1)/3|=32/3$. If the number N of the outer teeth is 8 and the number difference between the outer teeth and the inner teeth is 4 (i.e., K=4), the reduction ratio of the speed reducer 1' is equal to $|-8 \times (8-4-1)/4|=6$. If the number N of the outer teeth is 8 and the number difference between the outer teeth and the inner teeth is 5 (i.e., K=5), the reduction ratio of the speed reducer 1' is equal to $|-8 \times (8-5-1)/5|=3.2$.

In the third operating situation of the speed reducer 1', the following presuppositions are made: the first roller assembly 12' is not rotated, the second roller assembly 14' is rotated, and the number of the outer teeth of the convex structure 131' minus the number of the inner teeth of the concave structure 132' is equal to K, wherein K is negative. Under this circumstance, the rotating direction of the power input end and the rotating direction of the power output end are identical. In case that the number of the outer teeth of the convex structure 131' is N, the reduction ratio is equal to $|-N \times (N-K-1)/K|$, wherein N is an integer greater than 1 and the difference (N−K) is greater than 2.

Figure 35:
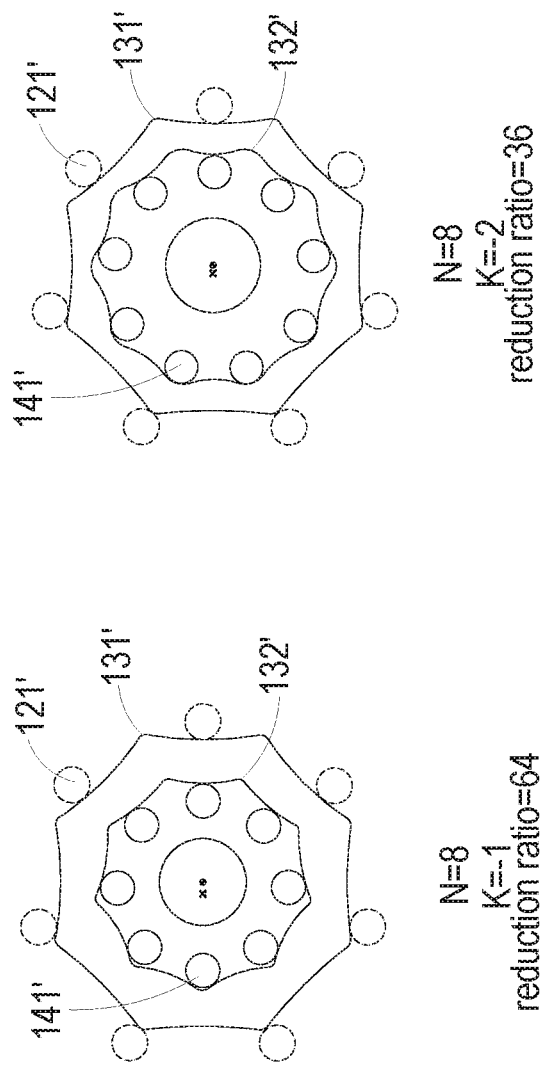
FIG. 35 schematically illustrates two examples of the speed reducer of FIG. 21 in the third operating situation, in which N=8 (K=−1, −2)
Figure 36:
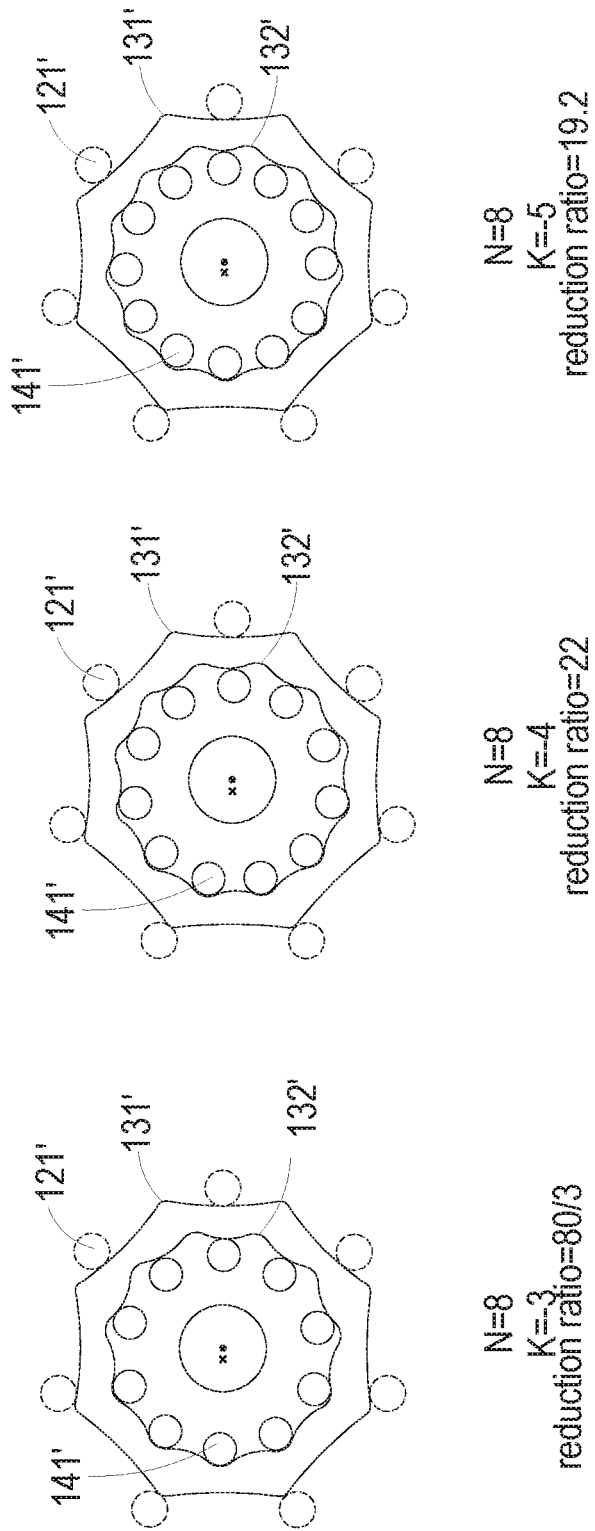
FIG. 36 schematically illustrates three examples of the speed reducer of FIG. 21 in the third operating situation, in which N=8 (K=−3, −4, −5)

FIG. 35 schematically illustrates two examples of the speed reducer of FIG. 21 in the third operating situation, in which N=8 (K=−1, −2). If the number N of the outer teeth is 8 and the number difference between the outer teeth and the inner teeth is −1 (i.e., K=−1), the reduction ratio of the speed reducer 1' is equal to $|-8 \times (8+1-1)/(-1)|=64$. If the number N of the outer teeth is 8 and the number difference between the outer teeth and the inner teeth is −2 (i.e., K=−2), the reduction ratio of the speed reducer 1' is equal to $|-8 \times (8+2-1)/(-2)|=36$. FIG. 36 schematically illustrates three examples of the speed reducer of FIG. 21 in the third operating situation, in which N=8 (K=−3, −4, −5). If the number N of the outer teeth is 8 and the number difference between the outer teeth and the inner teeth is −3 (i.e., K=−3), the reduction ratio of the speed reducer 1' is equal to $|-8 \times (8+3-1)/(-3)|=80/3$. If the number N of the outer teeth is 8 and the number difference between the outer teeth and the inner teeth is −4 (i.e., K=−4), the reduction ratio of the speed reducer 1' is equal to $|-8 \times (8+4-1)/(-4)|=22$. If the number N of the outer teeth is 8 and the number difference between the outer teeth and the inner teeth is −5 (i.e., K=−5), the reduction ratio of the speed reducer 1' is equal to $|-8 \times (8+5-1)/(-5)|=19.2$.

In the first operating situation or the third operating situation of the speed reducer 1', the reduction ratio is equal to $|-N \times (N-K-1)/K|$, wherein N is an integer greater than 2 in the first operating situation or N is an integer greater than 1 in the third operating situation. Since the number of the outer teeth of the convex structure 131' and the number of the inner teeth of the concave structure 132' are greater than two and these two numbers are different, K is an integer that is not equal to 0. Moreover, the number difference (N−K) is greater than 1 in the first operating situation, or the number difference (N−K) is greater than 2 in the third operating situation. In case that the term $-N \times (N-K-1)/K$ is positive, the rotating direction of the power input end and the rotating direction of the power output end are identical. Whereas, in case that the term $-N \times (N-K-1)/K$ is negative, the rotating direction of the power input end and the rotating direction of the power output end are different.

Figure 37:
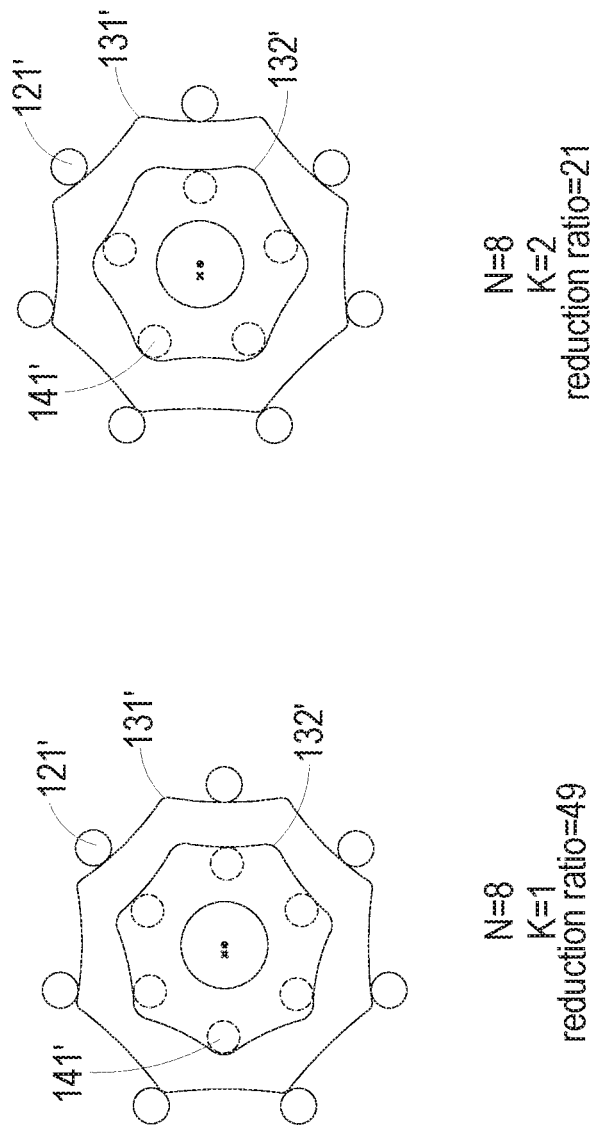
FIG. 37 schematically illustrates two examples of the speed reducer of FIG. 21 in the second operating situation, in which N=8 (K=1, 2)
Figure 38:
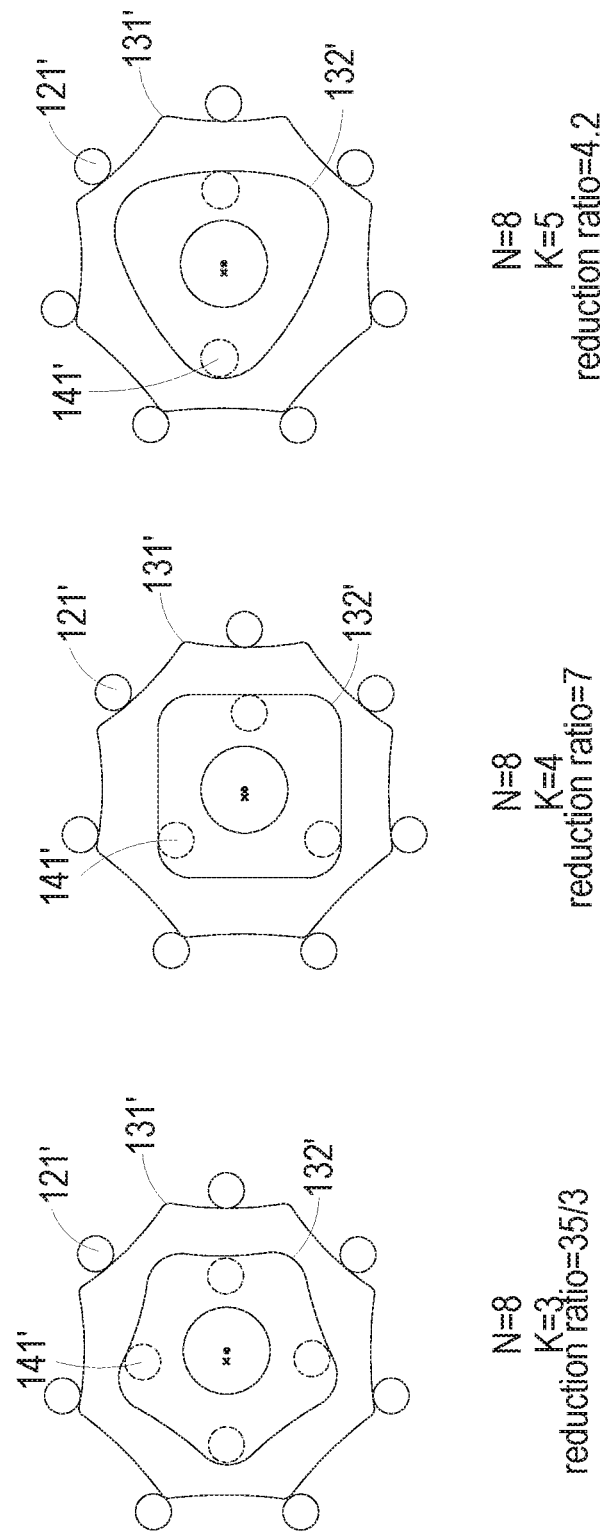
FIG. 38 schematically illustrates three examples of the speed reducer of FIG. 21 in the second operating situation, in which N=8 (K=3, 4, 5)

In the second operating situation of the speed reducer 1', the following presuppositions are made: the first roller assembly 12' is rotated, the second roller assembly 14' is not rotated, and the number of the outer teeth of the convex structure 131' minus the number of the inner teeth of the concave structure 132' is K. Under this circumstance, the rotating direction of the power input end and the rotating direction of the power output end are identical. In case that the number of the outer teeth of the convex structure 131' is N, the reduction ratio of the speed reducer 1' is equal to $|(N-1) \times (N-K)/K|$, wherein N is an integer greater than 2 and the difference (N−K) is greater than 1. FIG. 37 schematically illustrates two examples of the speed reducer of FIG. 21 in the second operating situation, in which N=8 (K=1, 2). If the number N of the outer teeth is 8 and the number difference between the outer teeth and the inner teeth is 1 (i.e., K=1), the reduction ratio of the speed reducer 1' is equal to $|(8-1)\times(8-1)/1|=49$. If the number N of the outer teeth is 8 and the number difference between the outer teeth and the inner teeth is 2 (i.e., K=2), the reduction ratio of the speed reducer 1' is equal to $|(8-1)\times(8-2)/2|=21$. FIG. 38 schematically illustrates three examples of the speed reducer of FIG. 21 in the second operating situation, in which N=8 (K=3, 4, 5). If the number N of the outer teeth is 8 and the number difference between the outer teeth and the inner teeth is 3 (i.e., K=3), the reduction ratio of the speed reducer 1' is equal to $|(8-1)\times(8-3)/3|=35/3$. If the number N of the outer teeth is 8 and the number difference between the outer teeth and the inner teeth is 4 (i.e., K=4), the reduction ratio of the speed reducer 1' is equal to $|(8-1)\times(8-4)/4|=7$. If the number N of the outer teeth is 8 and the number difference between the outer teeth and the inner teeth is 5 (i.e., K=5), the reduction ratio of the speed reducer 1' is equal to $|(8-1)\times(8-5)/5|=4.2$.

In the fourth operating situation of the speed reducer 1', the following presuppositions are made: the first roller assembly 12' is rotated, the second roller assembly 14' is not rotated, and the number of the outer teeth of the convex structure 131' minus the number of the inner teeth of the concave structure 132' is equal to K, wherein K is negative. Under this circumstance, the rotating direction of the power input end and the rotating direction of the power output end are different. In case that the number of the outer teeth of the convex structure 131' is N, the reduction ratio is equal to $|(N-1)\times(N-K)/K|$, wherein N is an integer greater than 1 and the difference (N-K) is greater than 2.

Figure 39:
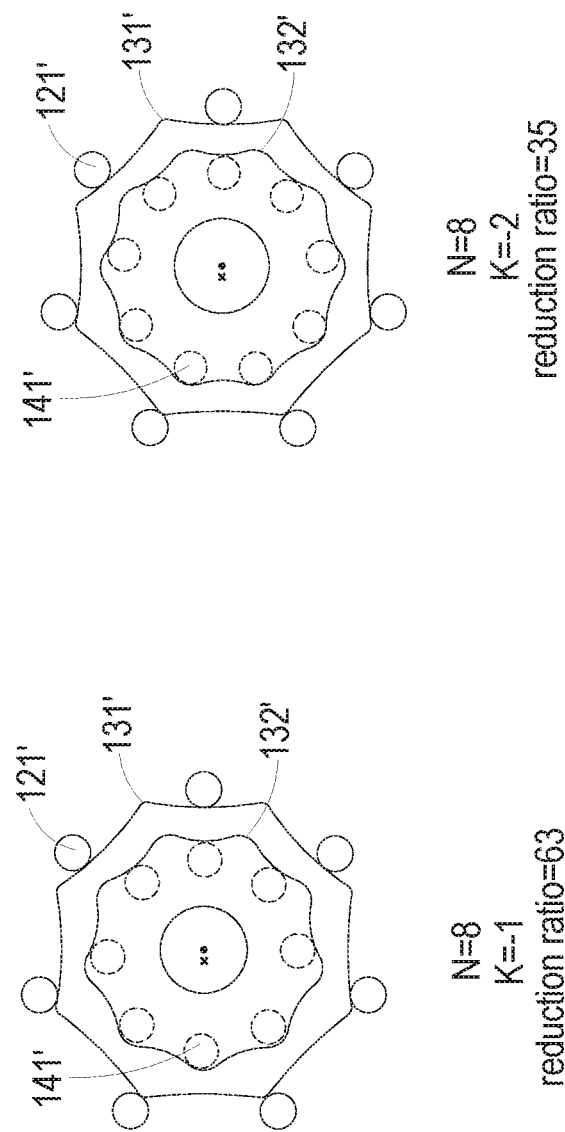
FIG. 39 schematically illustrates two examples of the speed reducer of FIG. 21 in the fourth operating situation, in which N=8 (K=−1, −2)
Figure 40:
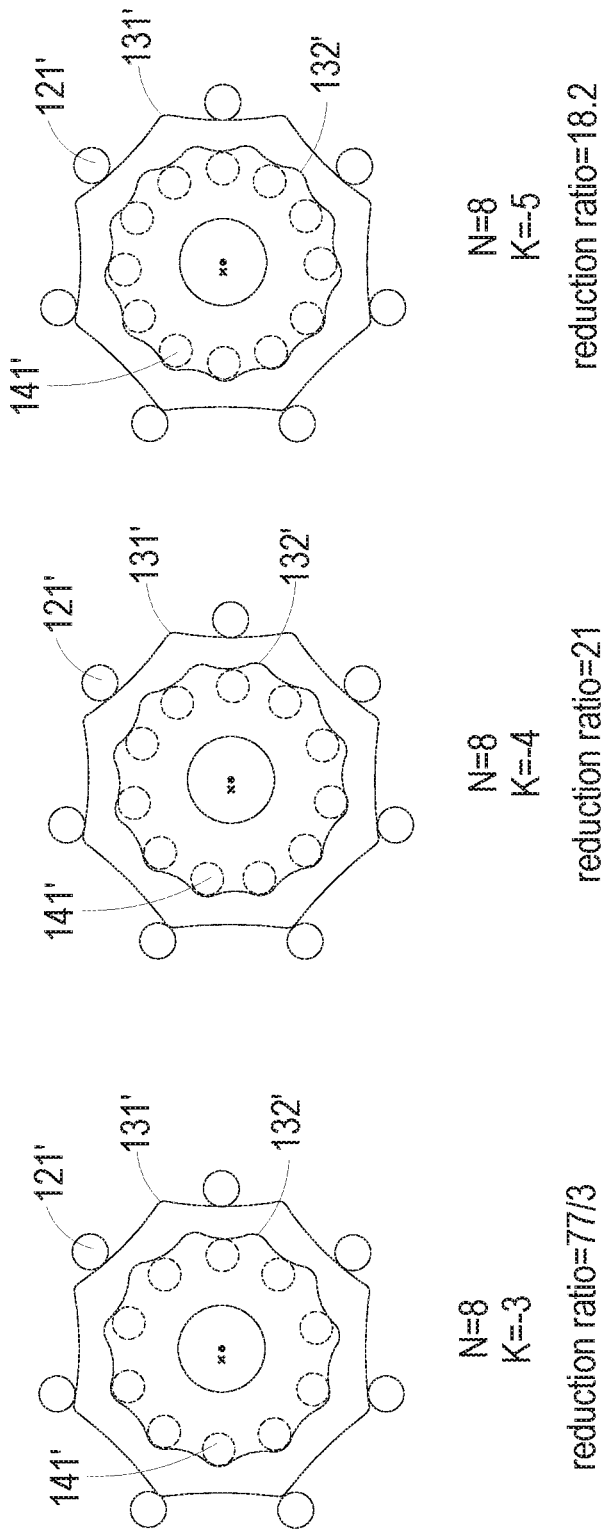
FIG. 40 schematically illustrates three examples of the speed reducer of FIG. 21 in the fourth operating situation, in which N=8 (K=−3, −4, −5).

FIG. 39 schematically illustrates two examples of the speed reducer of FIG. 21 in the fourth operating situation, in which N=8 (K=-1, -2). If the number N of the outer teeth is 8 and the number difference between the outer teeth and the inner teeth is -1 (i.e., K=-1), the reduction ratio of the speed reducer 1' is equal to $|(8-1)\times(8+1)/(-1)|=63$. If the number N of the outer teeth is 8 and the number difference between the outer teeth and the inner teeth is -2 (i.e., K=-2), the reduction ratio of the speed reducer 1' is equal to $|(8-1)\times(8+2)/(-2)|=35$. FIG. 40 schematically illustrates three examples of the speed reducer of FIG. 21 in the fourth operating situation, in which N=8 (K=-3, -4, -5). If the number N of the outer teeth is 8 and the number difference between the outer teeth and the inner teeth is -3 (i.e., K=-3), the reduction ratio of the speed reducer 1' is equal to $|(8-1)\times(8+3)/(-3)|=77/3$. If the number N of the outer teeth is 8 and the number difference between the outer teeth and the inner teeth is -4 (i.e., K=-4), the reduction ratio of the speed reducer 1' is equal to $|(8-1)\times(8+4)/(-4)|=21$. If the number N of the outer teeth is 8 and the number difference between the outer teeth and the inner teeth is -5 (i.e., K=-5), the reduction ratio of the speed reducer 1' is equal to $|(8-1)\times(8+5)/(-5)|=18.2$.

In the second operating situation or the fourth operating situation of the speed reducer 1', the reduction ratio is equal to $|(N-1)\times(N-K)/K|$, wherein N is an integer greater than 2 in the second operating situation or N is an integer greater than 1 in the fourth operating situation. Since the number of the outer teeth of the convex structure 131' and the number of the inner teeth of the concave structure 132' are greater than two and these two numbers are different, K is an integer that is not equal to 0. Moreover, the number difference (N-K) is greater than 1 in the second operating situation or the fourth operating situation. In case that the term $(N-1)\times(N-K)/K$ is positive, the rotating direction of the power input end and the rotating direction of the power output end are identical. Whereas, in case that the term $(N-1)\times(N-K)/K$ is negative, the rotating direction of the power input end and the rotating direction of the power output end are different.

As mentioned above, the speed reducer 1' is a two-stage hypocycloid-hypocycloid speed reducer. The reduction ratio of the speed reducer 1' is equal to $|-N\times(N-K-1)/K|$ or $|(N-1)\times(N-K)/K|$. In the above formulae for calculating the reduction ratio of the hypocycloid-hypocycloid speed reducer, the denominator is equal to the difference between the number of the outer teeth of the convex structure and the number of the inner teeth of the concave structure. In the above formula for calculating the reduction ratio of the epicycloid-hypocycloid speed reducer or the hypocycloid-epicycloid speed reducer, the denominator is equal to the sum between the number of the outer teeth of the convex structure and the number of the inner teeth of the concave structure. In the same condition where these three kinds of speed reducers have the same number of the outer teeth of the convex structure and the same number of the inner teeth of the concave structure, the hypocycloid-hypocycloid speed reducer has the highest reduction ratio.

It is noted that the architecture of the hypocycloid-hypocycloid speed reducer may be modified while retaining the teachings of the present invention. That is, the architecture of FIG. 21 or the architecture of FIG. 22 may be modified. For example, in another embodiment, the single rotating wheel 13' of FIG. 21 or FIG. 22 is replaced with two rotating wheels. The first rotating wheel and the second rotating wheel have circular outer peripheries. The first rotating wheel comprises a first main body. The first main body comprises a first concave structure. The first concave structure is located beside the plural first rollers 121'. The first concave structure is concavely formed in a middle region of a surface of the first main body. Moreover, the first concave structure comprises plural first inner teeth. The plural first inner teeth cooperate with the plural first rollers 121'. The number of the first rollers 121' is at least one less than the number of the first inner teeth of the first concave structure. The second rotating wheel comprises a second main body. The second main body comprises a second concave structure. The second concave structure is located beside the plural second rollers 141'. The second concave structure is concavely formed in a middle region of a surface of the second main body. Moreover, the second concave structure comprises plural second inner teeth. The plural second inner teeth cooperate with the plural second rollers 141'. The number of the second rollers 141' is at least one less than the number of the second inner teeth of the second concave structure. The uses of the two rotating wheels can also construct the hypocycloid-hypocycloid speed reducer.

In the speed reducer 1 or the speed reducer 1', the power input end (e.g., the first transmission shaft 10) is supported by two deep-groove ball bearings (not shown). Moreover, the axle center of the first transmission shaft 10 or 10' is supported by the deep-groove ball bearings, and the deep-groove ball bearings are located at two opposite sides of the rotating wheel 13 or 13'. Consequently, during rotation, the radial run-out of the first transmission shaft 10 or 10' is reduced, and the radial force of the rotating wheel 13 or 13' applied to the axle center is scattered. Moreover, since the size of the axle center is uniform, the portion of the first transmission shaft 10 or 10' where the rotating wheel 13 or 13' is not installed can have reduced diameter. Under this circumstance, a better hollow shaft can be used, and the applications of the speed reducer 1 or 1' are diversified. Moreover, the power input end (e.g., the first transmission shaft 10) of the speed reducer 1 or 1' is optionally equipped with a weight block (not shown). When the first transmission shaft 10 or 10' is rotated at the high speed, the eccentrically-driven rotating wheel 13 or 13' generates a radial force. Due to the weight block, the radial force of the rotating wheel 13 or 13' is balanced. Since the vibration caused by the first transmission shaft 10 or 10' in response to the unbalanced vibration is reduced, the operation of the speed reducer 1 or 1' is smoother. Optionally, the weight block has a protrusion structure (not shown). The protrusion structure has a circular shape, a square shape or any other appropriate shape. Moreover, the weight block can be assembled with the first transmission shaft 10 or 10' or integrally formed with the first transmission shaft 10 or 10'. Moreover, the weight block can be installed at any axial position of the first transmission shaft 10 or 10' according to the practical requirements.

In some embodiments, the speed reducer 1' includes a first transmission shaft 10', an eccentric wheel 11', a first roller assembly 12', a rotating wheel 13' and a second roller assembly 14'. The first transmission shaft 10' has a first end 100' and a second end 101'. The eccentric wheel 11' is eccentrically fixed on the second end 101' of the first transmission shaft 10'. The first roller assembly 12' includes a first wheel disc 120' and plural first rollers 121'. The first wheel disc 120' is arranged between the first end 100' and the second end 101' of the first transmission shaft 10'. The plural first rollers 121' are disposed on the first wheel disc 120'. The rotating wheel 13' includes a main body 130' and an axle hole 133'. The eccentric wheel 11' is rotatably disposed within the axle hole 133'. The main body 130' includes a convex structure 131' and a concave structure 132'. The convex structure 131' is protruded from an outer periphery of the main body 130' and has at least one outer tooth. The concave structure 132' is concavely formed in a surface of the main body 130' and includes at least one inner tooth. The second roller assembly 14' includes a second wheel disc 140' and plural second rollers 141'. The plural second rollers 141' are disposed on the second wheel disc 140'. The at least one outer tooth of the rotating wheel 13' is contacted with the at least one corresponding second rollers 141' of the second roller assembly 14'. The first rollers 121' of the first roller assembly 12' are contacted with the at least one corresponding inner tooth of the rotating wheel 13'. The number of at least one the outer tooth and the number of the at least one inner tooth are different, the number of the at least one first roller 121' is at least one less than the number of the at least one outer tooth, and the number of the at least one second roller 141' is at least one less than the number of the at least one inner tooth. Due to that the structures, operation and functions of this embodiment are the same as that of the above embodiments (see FIGS. 21 to 40), it is not redundantly described hereinafter.

From the above descriptions, the present invention provides a speed reducer. The speed reducer comprises a rotating wheel, a first roller assembly and a second roller assembly. The rotating wheel comprises a convex structure and a concave structure. The convex structure is contacted with plural first rollers of the first roller assembly. The concave structure is contacted with plural second rollers of the second roller assembly. The pushing action of the speed reducer of the present invention is similar to the conventional harmonic drive reducer. Consequently, the speed reducer of the present invention has simplified structure and less number of components, and is easily assembled and cost-effective. Moreover, due to the concave structure of the rotating wheel, the volume and weight of the overall speed reducer are reduced. Moreover, since the wall region of the rotating wheel is clamped by the plural first rollers and the plural second rollers, the gaps between the rotating wheel and the plural first rollers and the plural second rollers can be effectively controlled. Moreover, due to the wall region, the overall rigidity of the speed reducer is increased to withstand high impact, and the use life of the speed reducer is prolonged. The speed reducer of the present invention is an epicycloid-epicycloid speed reducer or a hypocycloid-hypocycloid speed reducer. Since the speed reducer of the present invention is designed to have four operating situations, the speed reducer can have various reduction ratios. That is, the speed reducer of the present invention can provide a high reduction ratio. In conclusion, the speed reducer of the present invention has the benefits of a RV reducer and a harmonic drive reducer.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A speed reducer, comprising:
   a first transmission shaft having a first end and a second end;
   an eccentric wheel eccentrically fixed on the second end of the first transmission shaft;
   a first roller assembly comprising a first wheel disc and plural first rollers, wherein the first wheel disc is arranged between the first end and the second end of the first transmission shaft, the plural first rollers are disposed on the first wheel disc;
   a rotating wheel comprising a main body and an axle hole, wherein the eccentric wheel is rotatably disposed within the axle hole, and the main body comprises a convex structure and a concave structure, wherein the convex structure is protruded from an outer periphery of the main body and has at least one outer tooth, and the at least one outer tooth is contacted with the corresponding first rollers, wherein the concave structure is concavely formed in a surface of the main body and comprises at least one inner tooth; and
   a second roller assembly comprising a second wheel disc and plural second rollers, wherein the plural second rollers are disposed on the second wheel disc, and the second rollers are contacted with the at least one corresponding inner tooth,
   wherein the number of the at least one outer tooth and the number of the at least one inner tooth are different, the number of the first rollers is at least one more than the number of the at least one outer tooth, and the number of the second rollers is at least one more than the number of the at least one inner tooth.

2. The speed reducer according to claim 1, wherein the plural first rollers and the at least one outer tooth are collaboratively formed as a first-stage cycloid structure, wherein the plural second rollers and the at least one inner tooth are collaboratively formed as a second-stage cycloid structure, wherein the first-stage cycloid structure and the second-stage cycloid structure are both epicycloid structures.

3. The speed reducer according to claim 1, wherein the first roller assembly is not rotated but the second roller assembly is rotated, or the first roller assembly is rotated but the second roller assembly is not rotated.

4. The speed reducer according to claim 3, wherein if the first roller assembly is not rotated but the second roller assembly is rotated and the number of the at least one outer tooth minus the number of the at least one inner tooth is K, a reduction ratio of the speed reducer is equal to $|N\times(N-K+1)/K|$, wherein N is the number of the at least one outer tooth, and N is an integer greater than 1, wherein K is an integer not equal to 0, and (N−K) is greater than 1.

5. The speed reducer according to claim 4, wherein the speed reducer further comprises a second transmission shaft, and the second wheel disc is fixed on the second transmission shaft, wherein the first transmission shaft is employed as a power input end, and the second transmission shaft assembly is employed as a power output end, wherein if K is positive, a rotating direction of the power input end and a rotating direction of the power output end are identical, wherein if K is negative, the rotating direction of the power input end and the rotating direction of the power output end are different.

6. The speed reducer according to claim 3, wherein if the first roller assembly is rotated but the second roller assembly is not rotated and the number of the at least one outer tooth minus the number of the inner teeth is K, a reduction ratio of the speed reducer is equal to $|-(N+1)\times(N-K)/K|$, wherein N is the number of the at least one outer tooth, and N is an integer greater than 1, wherein K is an integer not equal to 0, and (N−K) is greater than 1.

7. The speed reducer according to claim 6, wherein the speed reducer further comprises a second transmission shaft, and the second wheel disc is fixed on the second transmission shaft, wherein the first transmission shaft is employed as a power input end, and the first roller assembly is employed as a power output end, wherein if K is positive, a rotating direction of the power input end and a rotating direction of the power output end are different, wherein if K is negative, the rotating direction of the power input end and the rotating direction of the power output end are identical.

8. A speed reducer, comprising:
a first transmission shaft having a first end and a second end;
an eccentric wheel eccentrically fixed on the second end of the first transmission shaft;
a first roller assembly comprising a first wheel disc and at least one first roller, wherein the first wheel disc is arranged between the first end and the second end of the first transmission shaft, the at least one first roller is disposed on the first wheel disc;
a rotating wheel comprising a main body and an axle hole, wherein the eccentric wheel is rotatably disposed within the axle hole, and the main body comprises a convex structure and a concave structure, wherein the convex structure is protruded from an outer periphery of the main body and has plural outer teeth, and the plural outer teeth are contacted with the at least one corresponding first roller, wherein the concave structure is concavely formed in a surface of the main body and comprises plural inner teeth; and
a second roller assembly comprising a second wheel disc and at least one second roller, wherein the at least one second roller is disposed on the second wheel disc, and the at least one second roller is contacted with the corresponding inner teeth,
wherein the number of the outer teeth and the number of the inner teeth are different, the number of the at least one first roller is at least one less than the number of the outer teeth, and the number of the at least one second roller is at least one less than the number of the inner teeth.

9. The speed reducer according to claim 8, wherein the at least one first roller and the plural outer teeth are collaboratively formed as a first-stage cycloid structure, wherein the at least one second roller and the plural inner teeth are collaboratively formed as a second-stage cycloid structure, wherein the first-stage cycloid structure and the second-stage cycloid structure are both hypocycloid structures.

10. The speed reducer according to claim 8, wherein the first roller assembly is not rotated but the second roller assembly is rotated, or the first roller assembly is rotated but the second roller assembly is not rotated.

11. The speed reducer according to claim 10, wherein if the first roller assembly is not rotated but the second roller assembly is rotated and the number of the outer teeth minus the number of the inner teeth is K, a reduction ratio of the speed reducer is equal to $|-N\times(N-K-1)/K|$, wherein N is the number of the outer teeth, and N is an integer greater than 2, wherein K is a positive integer, and (N−K) is greater than 1.

12. The speed reducer according to claim 11, wherein the speed reducer further comprises a second transmission shaft, and the second wheel disc is fixed on the second transmission shaft, wherein the first transmission shaft is employed as a power input end, and the second transmission shaft is employed as a power output end, wherein a rotating direction of the power input end and a rotating direction of the power output end are different.

13. The speed reducer according to claim 10, wherein if the first roller assembly is not rotated but the second roller assembly is rotated and the number of the outer teeth minus the number of the inner teeth is K, a reduction ratio of the speed reducer is equal to $|-N\times(N-K-1)/K|$, wherein N is the number of the outer teeth, and N is an integer greater than 2, wherein K is a negative integer, and (N−K) is greater than 2.

14. The speed reducer according to claim 13, wherein the speed reducer further comprises a second transmission shaft, and the second wheel disc is fixed on the second transmission shaft, wherein the first transmission shaft is employed as a power input end, and the second transmission shaft is employed as a power output end, wherein a rotating direction of the power input end and a rotating direction of the power output end are identical.

15. The speed reducer according to claim 10, wherein if the first roller assembly is rotated but the second roller assembly is not rotated and the number of the outer teeth minus the number of the inner teeth is K, a reduction ratio of the speed reducer is equal to $|(N-1)\times(N-K)/K|$, wherein N is the number of the outer teeth, and N is an integer greater than 2, wherein K is a positive integer, and (N−K) is greater than 1.

16. The speed reducer according to claim 15, wherein the speed reducer further comprises a second transmission shaft, and the second wheel disc is fixed on the second transmission shaft, wherein the first transmission shaft is employed as a power input end, and the first roller assembly is employed as a power output end, wherein a rotating direction of the power input end and a rotating direction of the power output end are identical.

17. The speed reducer according to claim 10, wherein if the first roller assembly is rotated but the second roller assembly is not rotated and the number of the outer teeth minus the number of the inner teeth is K, a reduction ratio of the speed reducer is equal to $|(N-1)\times(N-K)/K|$, wherein N is the number of the outer teeth, and N is an integer greater than 1, wherein K is a negative integer, and (N−K) is greater than 2.

18. The speed reducer according to claim 17, wherein the speed reducer further comprises a second transmission shaft, and the second wheel disc is fixed on the second transmission shaft, wherein the first transmission shaft is employed as a power input end, and the first roller assembly is employed as a power output end, wherein a rotating direction of the power input end and a rotating direction of the power output end are different.

19. A speed reducer, comprising:
- a first transmission shaft;
- a first roller assembly comprising a first wheel disc and plural first rollers, wherein the first wheel disc is disposed on the first transmission shaft, the plural first rollers are disposed on the first wheel disc;
- a rotating wheel comprising a main body and an axle hole, wherein an eccentric wheel is rotatably disposed within the axle hole, and the rotating wheel comprises plural outer teeth and plural inner teeth, wherein the plural outer teeth are protruded from the main body, the plural inner teeth are concavely formed in a surface of the main body, the plural outer teeth are contacted with the corresponding first rollers; and
- a second roller assembly comprising a second wheel disc and plural second rollers, wherein the plural second rollers are disposed on the second wheel disc, the second rollers are contacted with the corresponding inner teeth,
- wherein the number of the outer teeth and the number of the inner teeth are different, wherein the number of the first rollers is at least one more than the number of the outer teeth and the number of the second rollers is at least one more than the number of the inner teeth, or the number of the first rollers is at least one less than the number of the outer teeth and the number of the second rollers is at least one less than the number of the inner teeth.

20. The speed reducer according to claim 19, wherein the first roller assembly is not rotated but the second roller assembly is rotated, or the first roller assembly is rotated but the second roller assembly is not rotated.

* * * * *